US009087375B2

(12) United States Patent
Sutou

(10) Patent No.: US 9,087,375 B2
(45) Date of Patent: Jul. 21, 2015

(54) IMAGE PROCESSING DEVICE, IMAGE PROCESSING METHOD, AND PROGRAM

(75) Inventor: Yasuhiro Sutou, Tokyo (JP)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 13/417,689

(22) Filed: Mar. 12, 2012

(65) Prior Publication Data

US 2012/0249536 A1    Oct. 4, 2012

(30) Foreign Application Priority Data

Mar. 28, 2011 (JP) ................... 2011-070634
Mar. 28, 2011 (JP) ................... 2011-070635
Mar. 28, 2011 (JP) ................... 2011-070636

(51) Int. Cl.
*H04N 13/00* (2006.01)
*G06T 7/00* (2006.01)

(52) U.S. Cl.
CPC ............. *G06T 7/002* (2013.01); *G06T 7/0022* (2013.01); *H04N 13/0011* (2013.01); *G06T 2207/10012* (2013.01); *G06T 2207/10024* (2013.01); *G06T 2207/20021* (2013.01); *H04N 13/0037* (2013.01); *H04N 2013/0081* (2013.01)

(58) Field of Classification Search
CPC ........... G06T 2207/10012; G06T 2207/10024; G06T 2207/20021; G06T 7/002; G06T 7/0022; H04N 13/0011; H04N 13/0037; H04N 2013/0081
See application file for complete search history.

(56) References Cited

U.S. PATENT DOCUMENTS

| 2005/0008220 | A1* | 1/2005 | Miyazaki ................ 382/154 |
| 2006/0029272 | A1* | 2/2006 | Ogawa .................... 382/154 |
| 2006/0050338 | A1* | 3/2006 | Hattori ...................... 359/9 |
| 2011/0116706 | A1* | 5/2011 | Baik ....................... 382/154 |
| 2011/0273537 | A1* | 11/2011 | Lin et al. ................... 348/43 |
| 2012/0008857 | A1* | 1/2012 | Choi ....................... 382/154 |
| 2012/0014590 | A1* | 1/2012 | Martinez-Bauza et al. .. 382/154 |
| 2013/0342529 | A1* | 12/2013 | Fujisawa et al. ........... 345/419 |

FOREIGN PATENT DOCUMENTS

| JP | 2005-275482 A | 10/2005 |
| JP | 2006-164297 A | 6/2006 |
| JP | 2007535829 A | 12/2007 |
| JP | 2009122842 A | 6/2009 |
| JP | 4410007 | 11/2009 |
| JP | 2010197198 A | 9/2010 |

OTHER PUBLICATIONS

Zhang Zhengyou et al: A robust technique for matching two uncalibrated images through the recovery of the unknown epipolar geometry.INRIA Sophia-Antipolis, 2004 route des Lucioles B.P. 93. F-06902 Sophia-Antipolis Cedex, France , revised Dec. 1994.

* cited by examiner

*Primary Examiner* — Thai Tran
*Assistant Examiner* — Stephen Smith
(74) *Attorney, Agent, or Firm* — Sony Corporation

(57) ABSTRACT

An image processing device includes: a horizontal parallax detecting unit that compares a standard pixel constituting a standard image with a first reference pixel located at the same height position as the standard pixel and a second reference pixel located at a height position different from the first reference pixel out of pixels constituting the reference image in the standard image and the reference image in which the same subject is drawn at horizontal positions different from each other and that detects a horizontal parallax of the standard pixel on the basis of the comparison result.

9 Claims, 39 Drawing Sheets

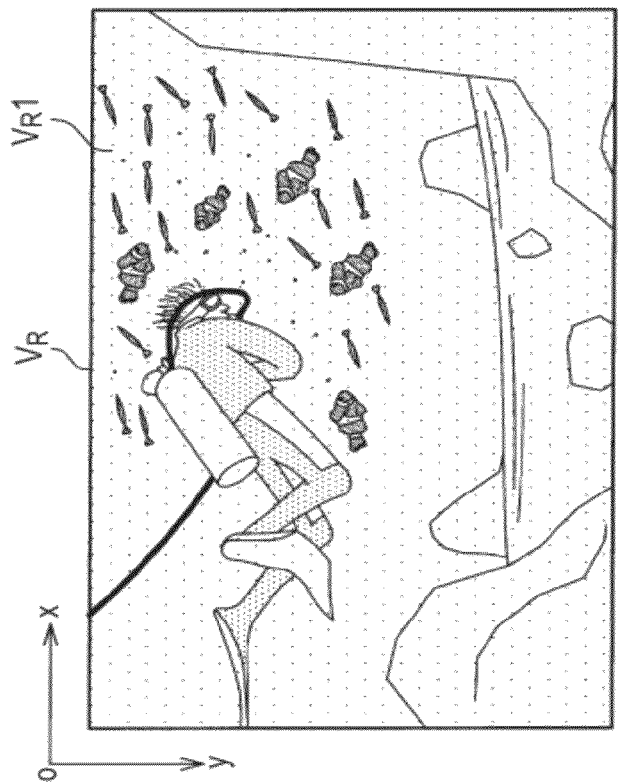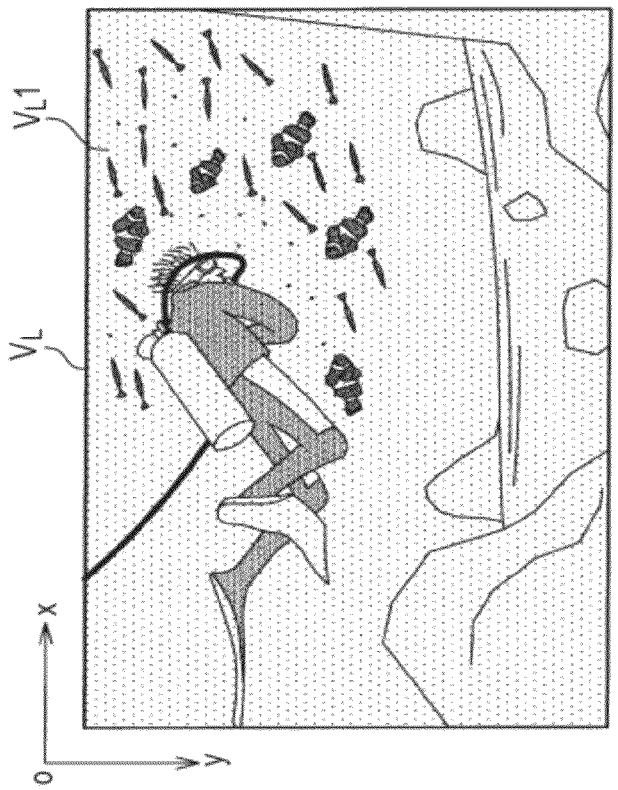

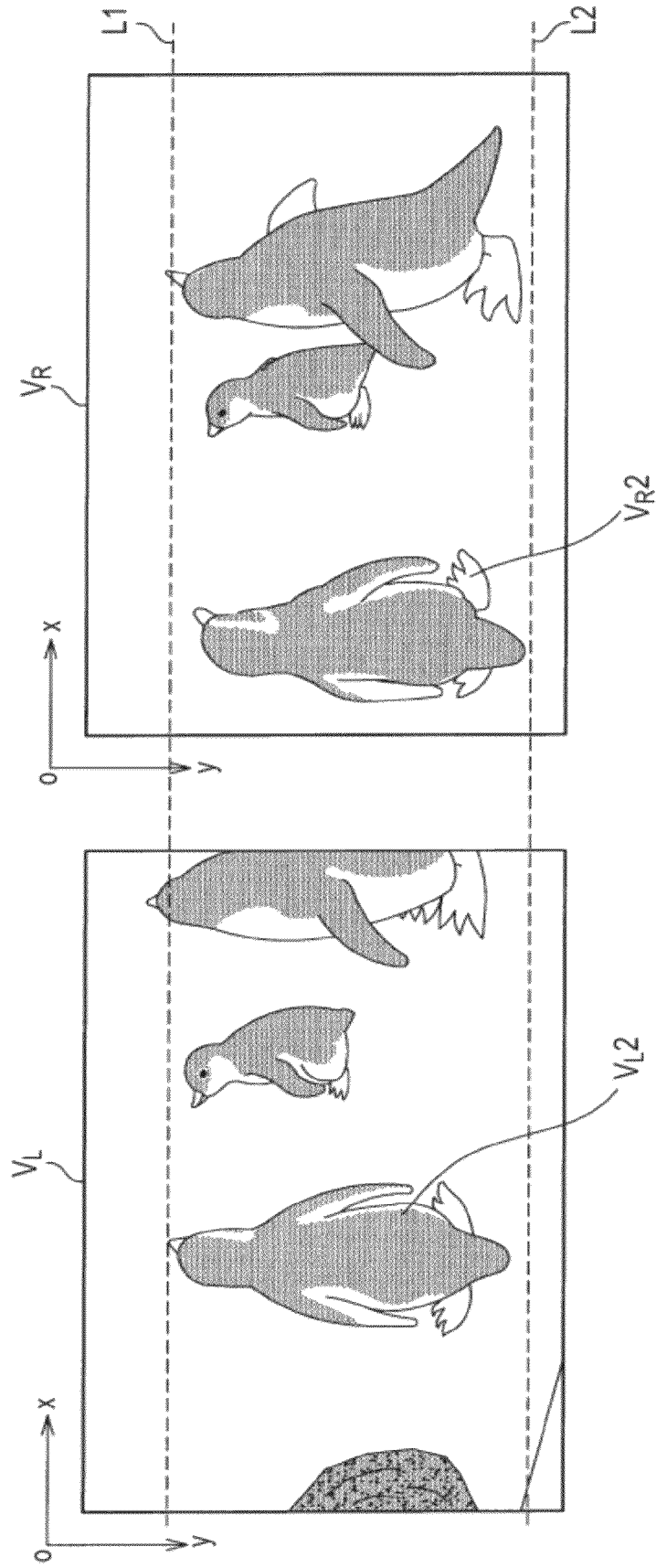

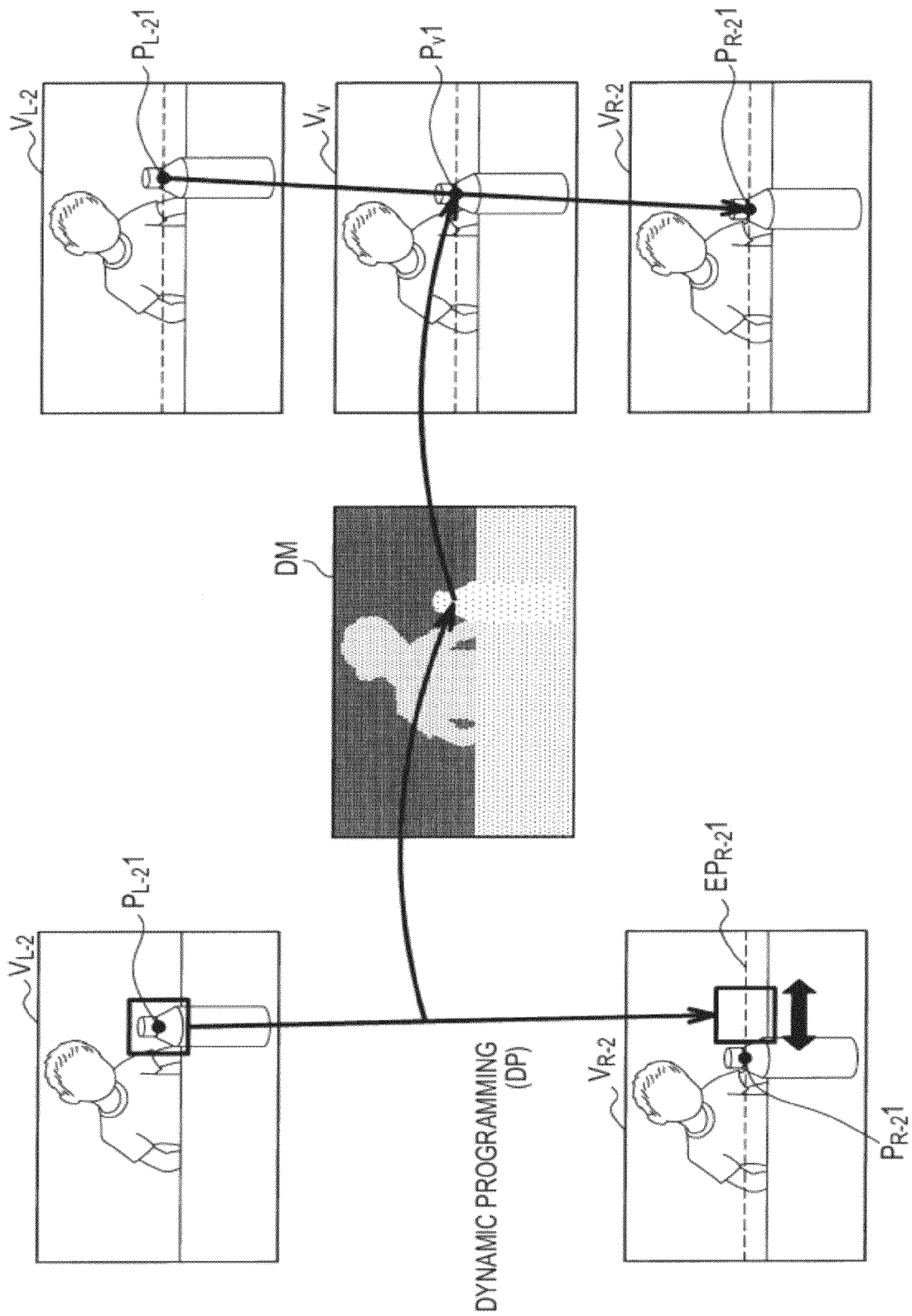

COLOR HISTOGRAM

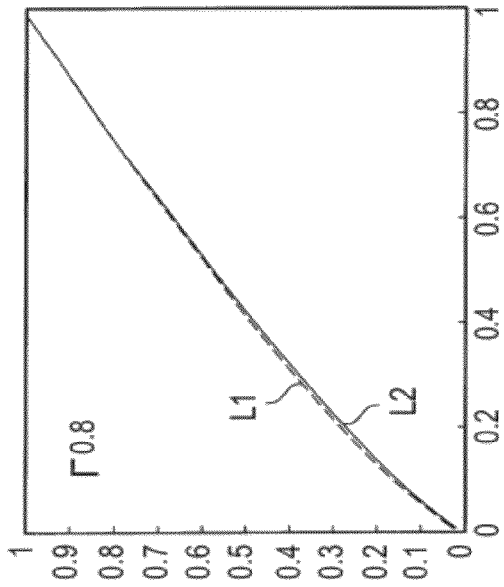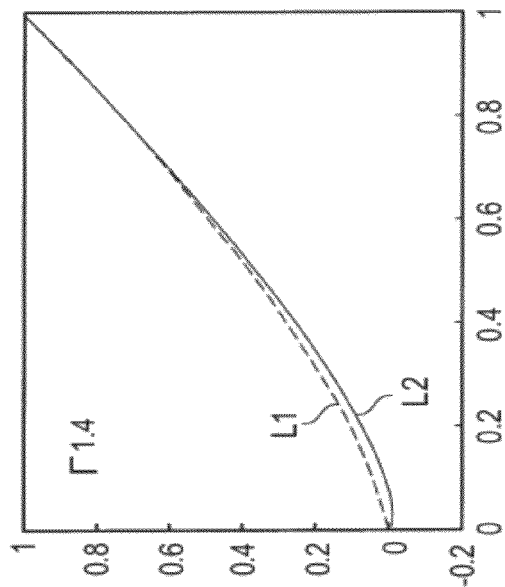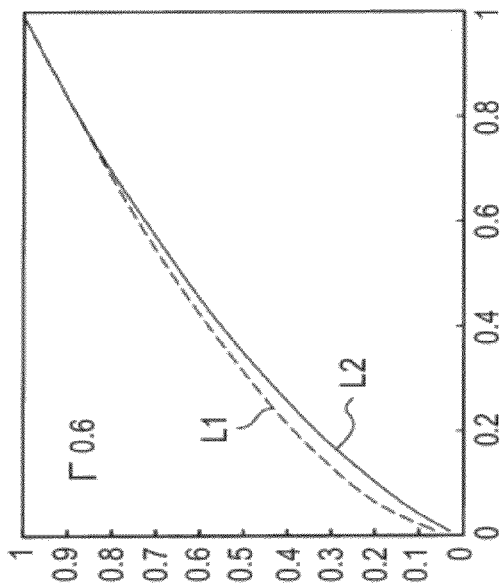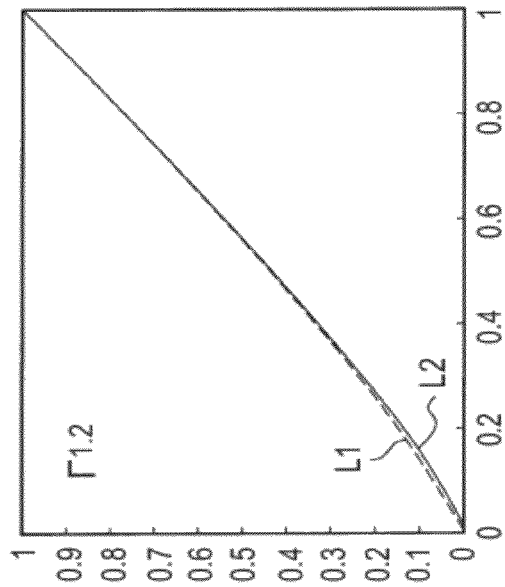

FIG.33

|  |  | J,0 |  | J,j |
|---|---|---|---|---|
|  |  | S,0 |  |  |
| 0,-j | 0,-s | 0,0 | 0,s | 0,j |
|  |  | -S,0 |  |  |
|  |  | -J,0 |  |  |

R (top), L (left)

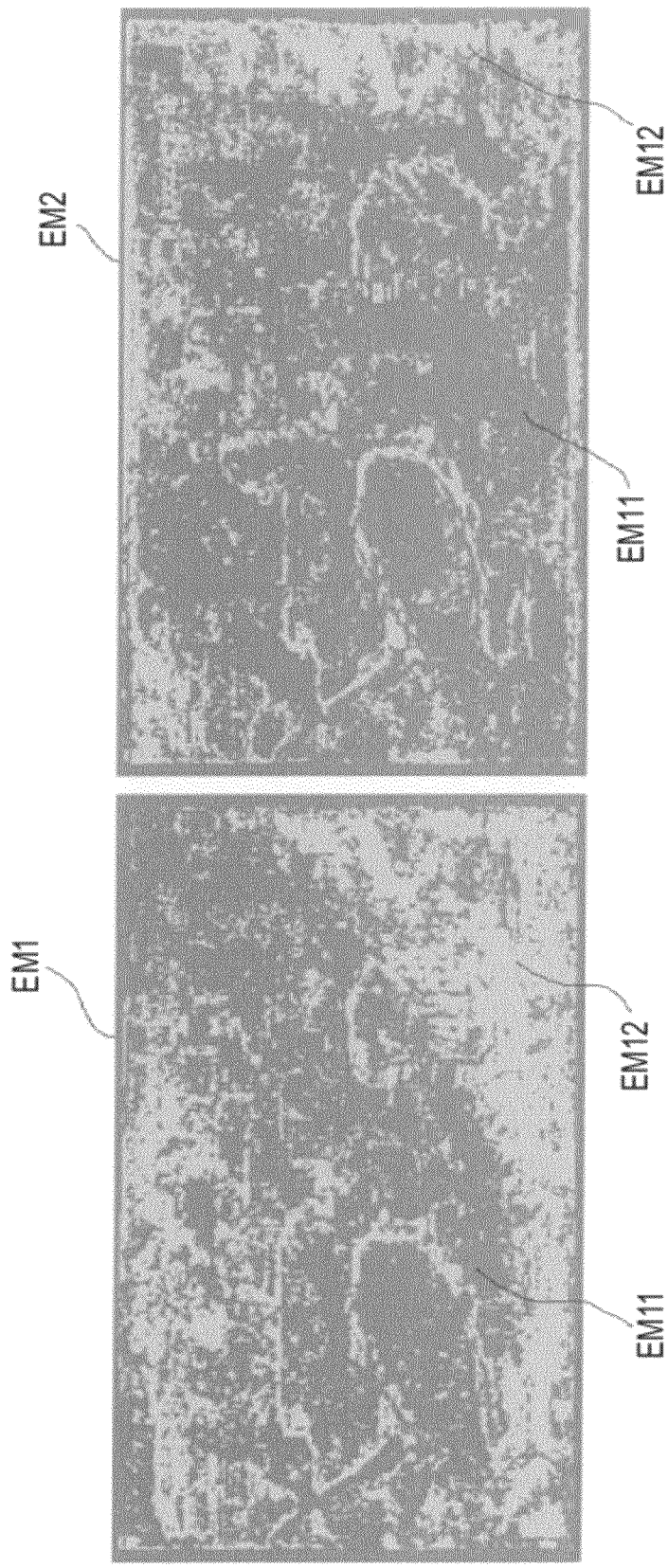

IMAGE PROCESSING DEVICE, IMAGE PROCESSING METHOD, AND PROGRAM

CROSS-REFERENCE TO RELATED APPLICATION

The present application claims priority from Japanese Patent Application Nos. JP 2011-070636, JP 2011-070635, and JP 2011-070634 all filed in the Japanese Patent Office on Mar. 28, 2011, the entire contents of which are incorporated herein by reference.

FIELD

The present disclosure relates to an image processing device, an image processing method, and a program.

BACKGROUND

Autostereoscopic displays have been known which can stereoscopically display an image without the use of glasses dedicated to a stereoscopic view. An autostereoscopic display acquires plural images in which the same subject is drawn at different horizontal positions. The autostereoscopic display compares subject images which are parts having the subject drawn therein with each other out of the plural images and detects a disparity in horizontal position between the subject images, that is, a horizontal parallax. The autostereoscopic display creates plural multi-view images on the basis of the detected horizontal parallax and the acquired images and stereoscopically displays the multi-view images. A local matching method disclosed in JP-A-2006-164297 and a global matching method disclosed in Japanese Patent No. 4410007 are known as the method of allowing the autostereoscopic display to detect the horizontal parallax.

SUMMARY

However, the local matching method has a problem in that robustness and precision in parallax detection are low. On the contrary, the global matching method has a problem in that the robustness in parallax detection is high when the quality of an image acquired by the autostereoscopic display is high, that is, when there is no disparity in vertical position (no vertical disparity) between the subject images, but the robustness and precision in parallax detection are very low when there is a disparity in vertical position (a vertical disparity) between the subject images.

It is therefore desirable to provide an image processing device, an image processing method, and a program which can detect a horizontal parallax with high robustness and precision.

An embodiment of the present disclosure is directed to an image processing device including: a horizontal parallax detecting unit that compares a standard pixel constituting a standard image with a first reference pixel located at the same height position as the standard pixel and a second reference pixel located at a height position different from the first reference pixel out of pixels constituting the reference image in the standard image and the reference image in which the same subject is drawn at horizontal positions different from each other and that detects a horizontal parallax of the standard pixel on the basis of the comparison result.

The horizontal parallax detecting unit may calculate a first estimation value for estimating a difference between a feature quantity in a standard area including the standard pixel and a feature quantity in a first reference area including the first reference pixel and a second estimation value for estimating a difference between the feature quantity in the standard area and a feature quantity in a second reference area including the second reference pixel and may detect the horizontal parallax of the standard pixel on the basis of the first estimation value and the second estimation value.

The image processing device may further include: a correction executing unit that corrects the standard image and the reference image before detecting the horizontal parallax; and a correction reliability calculating unit that calculates a reliability of correction in the correction executing unit, and the horizontal parallax detecting unit may calculate the first estimation value and the second estimation value on the basis of the reliability calculated by the correction reliability calculating unit.

The horizontal parallax detecting unit may calculate a variation of the feature quantity of the standard pixel per unit time and calculates the first estimation value and the second estimation value on the basis of the calculated variation.

The horizontal parallax detecting unit may create a mosaic image by lowering the resolution of the standard image, may calculate a difference between the feature quantity of the standard pixel in the standard image and the feature quantity of the standard pixel in the mosaic image, and may calculate the first estimation value and the second estimation value on the basis of the calculated difference.

The horizontal parallax detecting unit may create a DP map in which a node includes as its components the horizontal position of the standard pixel and the horizontal parallax of the standard pixel and the node has as its score the estimation value having the smaller absolute value of the difference estimated by the use of the first estimation value and the second estimation value out of the first estimation value and the second estimation value, may calculate an accumulated cost from a start point to the corresponding node on the basis of the difference in feature quantity between the standard pixel and a pixel in a peripheral area of the standard pixel, the difference in feature quantity between a standard corresponding pixel located at the same position as the standard pixel and a pixel in a peripheral area of the standard corresponding pixel out of the pixels constituting the reference image, and the score of the node, may calculate the shortest path in which the accumulated cost from the start point to an end point is the minimum, and may detect the horizontal parallax of the standard pixel on the basis of the calculated shortest path.

The difference in height position between the second reference pixel and the first reference pixel may be restricted within a predetermined range.

The image processing device may further include: a second horizontal parallax detecting unit that detects the horizontal parallax of the standard pixel through the use of a detection method other than the detection method used by the horizontal parallax detecting unit which is a first horizontal parallax detecting unit; and a disparity map integrating unit that calculates reliabilities of the horizontal parallax of the standard pixel detected by the first horizontal parallax detecting unit and the horizontal parallax of the standard pixel detected by the second horizontal parallax detecting unit and that creates a disparity map indicating the horizontal parallax having the higher reliability for the standard pixel.

The disparity map integrating unit may calculate the reliabilities of the horizontal parallax of the standard pixel detected by the first horizontal parallax detecting unit and the horizontal parallax of the standard pixel detected by the second horizontal parallax detecting unit through the use of different estimation methods, respectively.

Another embodiment of the present disclosure is directed to an image processing method including: comparing a standard pixel constituting a standard image with a first reference pixel located at the same height position as the standard pixel and a second reference pixel located at a height position different from the first reference pixel out of pixels constituting the reference image in the standard image and the reference image in which the same subject is drawn at horizontal positions different from each other; and detecting a horizontal parallax of the standard pixel on the basis of the comparison result.

Still another embodiment of the present disclosure is directed to a program causing a computer to perform a horizontal parallax detecting function of: comparing a standard pixel constituting a standard image with a first reference pixel located at the same height position as the standard pixel and a second reference pixel located at a height position different from the first reference pixel out of pixels constituting the reference image in the standard image and the reference image in which the same subject is drawn at horizontal positions different from each other; and detecting a horizontal parallax of the standard pixel on the basis of the comparison result.

According to the embodiments of the above-mentioned present disclosure, since the second reference pixel located at a height position different from that of the standard pixel in addition to the first reference pixel located at the same height position as the standard pixel is also considered at the time of detecting the horizontal parallax of the standard pixel, it is possible to detect the horizontal parallax robust to the geometric disparity (vertical disparity). As a result, according to the embodiments of the present disclosure, it is possible to detect a horizontal parallax with high robustness and precision.

BRIEF DESCRIPTION OF THE DRAWINGS

FIGS. 2A and 2B are diagrams illustrating a color disparity between input images.

FIGS. 3A and 3B are diagrams illustrating a geometric disparity between input images.

FIG. 4 is a diagram illustrating a situation where a parallax map (disparity map) and a multi-view image are created.

FIGS. 12A to 12D are diagrams illustrating gamma curves of an image subjected to color calibration and an image not subjected to color calibration for comparison with each other.

FIG. 33 is a diagram illustrating an update table used to update an F-matrix.

FIGS. 44A and 44B are diagrams illustrating a reliability map.

DETAILED DESCRIPTION

Hereinafter, embodiments of the present disclosure will be described in detail with reference to the accompanying drawings. In the specification and drawings, elements having substantially the same functions will be referenced by the same reference signs and description thereof will not be repeated.

The description is made in the following order.
1. Processes to be Performed by Autostereoscopic Display
2. Configuration of Image processing device
2-1. Configuration of Color Calibration Unit
2-2. Configuration of Geometric Calibration Unit
2-3. Configuration of Parallax Detecting Unit
3. Processes to be Performed by Image processing device <1. Processes to be Performed by Autostereoscopic Display>

The inventor of the present disclosure intensively studied an Autostereoscopic display that can stereoscopically display an image without the use of glasses dedicated to a stereoscopic view and attained an image processing device according to this embodiment. Here, a stereoscopic display means to stereoscopically display an image by causing a viewer to recognize a binocular parallax.

Figure 1:
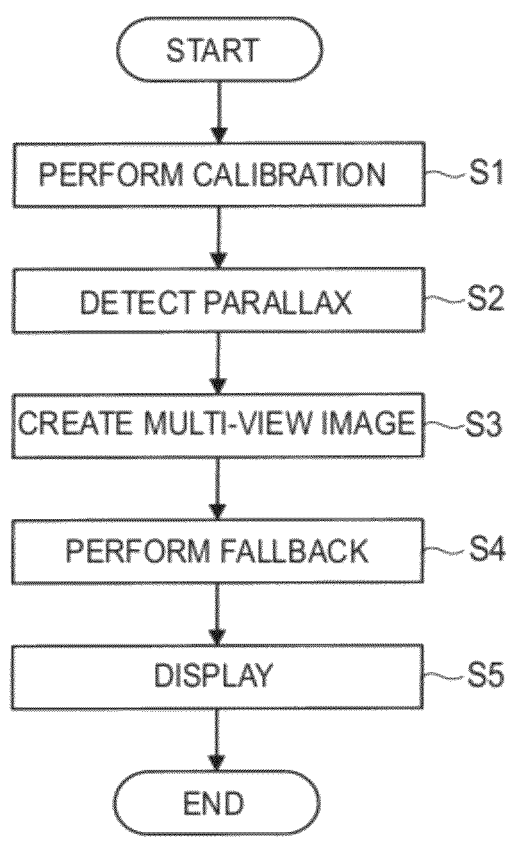
FIG. 1 is a flowchart schematically illustrating the flow of processes in an autostereoscopic display.

Processes to be performed by an autostereoscopic display including an image processing device will be first described below with reference to the flowchart shown in FIG. 1.

In step S1, the autostereoscopic display acquires input images $V_L$ and $V_R$ of a current frame. FIGS. 2A and 2B and FIGS. 3A and 3B show examples of the input images $V_L$ and $V_R$. In this embodiment, the most upper-left pixel of the input images $V_L$ and $V_R$ is defined as an origin, the horizontal direction thereof is defined as an x axis, and the vertical direction thereof is defined as an y axis. The right direction is the positive direction of the x axis and the down direction is the positive direction of the y axis. Each pixel has coordinate information (x, y) and color information (brightness (color value), chroma, and hue). Hereinafter, a pixel in the input image $V_L$ (and an image obtained by performing calibration on the input image $V_L$) is also referred to as a "left coordinate point" and a pixel in the input image $V_R$ (and an image obtained by performing calibration on the input image $V_R$) is also referred to as a "right coordinate point".

As shown in FIGS. 2A and 2B and FIGS. 3A and 3B, in the input images $V_L$ and $V_R$, the same subject (for example, sea, fishes, and penguins) is drawn at different horizontal positions (x coordinates).

A color disparity is present between the input images $V_L$ and $V_R$ shown in FIGS. 2A and 2B. That is, the same subject is painted with different colors between the input image $V_L$ and the input image $V_R$. For example, a subject image $V_L1$ and a subject image $V_R1$ show the same sea, but are different in color. On the other hand, the input images $V_L$ and $V_R$ shown in FIGS. 3A and 3B have a geometric disparity therebetween. That is, the same subject is drawn at different height positions (y coordinates). For example, a subject image $V_L2$ and a subject image $V_R2$ show the same penguin but the y coordinate of the subject image $V_L2$ and the y coordinate of the subject image $V_R2$ are different from each other. Straight lines L1 and L2 are drawn in FIGS. 3A and 3B for the purpose of easy understanding of the geometric disparity.

Therefore, the autostereoscopic display reduces such disparities by performing color calibration and geometric calibration. That is, the color calibration is a process of correcting a color disparity between the input images $V_L$ and $V_R$ and the geometric calibration is a process of correcting a geometric disparity between the input images $V_L$ and $V_R$.

In step S2, the autostereoscopic display detects a parallax on the basis of calibrated images $V_{L-2}$ and $V_{R-2}$ which are the input images $V_L$ and $V_R$ completely subjected to color calibration and geometric calibration. The situation of parallax detection is shown in FIG. 4.

As shown in FIG. 4, the autostereoscopic display calculates a horizontal parallax d1 (difference in x coordinate) between a coordinate point $P_{L-2}1$ in the calibrated image $V_{L-2}$ and the points in an epipolar line $EP_{R-2}1$ and sets the more optimal, that is, the horizontal parallax d1 from the coordinate point $P_{R-2}1$, as the horizontal parallax d1 of the coordinate point $P_{L-2}1$. Here, the epipolar line $EP_{R-2}1$ is a straight line which is drawn in the calibrated image $V_{R-2}$, has the same y coordinate as the coordinate point $P_{L-2}1$, and extends in the horizontal direction. This detection is possible because the autostereoscopic display performs calibration in advance to reduce the geometric disparity between the calibrated image $V_{L-2}$ and the calibrated image $V_{R-2}$.

The autostereoscopic display creates a parallax map (disparity map) DM by calculating the horizontal parallax d1 for all the pixels in the calibrated image $V_{L-2}$. The parallax map DM describes the horizontal parallax d1 for all the pixels in the calibrated image $V_{L-2}$. In FIG. 4, the degree of the horizontal parallax d1 is expressed by the contrasting density.

In step S3, the autostereoscopic display creates plural multi-view images $V_V$ on the basis of the parallax map DM and the calibrated images $V_{L-2}$ and $V_{R-2}$. For example, the multi-view image $V_V$ shown in FIG. 4 is an image interpolated between the calibrated image $V_{L-2}$ and the calibrated image $V_{R-2}$. Therefore, the pixel $P_V1$ indicating the same point as a point in a subject indicated by the pixel $P_{L-2}1$ is present between the pixel $P_{L-2}1$ and the pixel $P_{R-2}1$.

Here, the multi-view images $V_V$ are images stereoscopically displayed by the autostereoscopic display and correspond to different points of view (positions of a viewer's eyes). That is, the multi-view images $V_V$ recognized with the viewer's eyes vary depending on the positions of the viewer's eyes. For example, since the right eye and the left eye of the viewer are located at different positions, they recognize different multi-view images $V_V$. Accordingly, the viewer can stereoscopically view the multi-view images $V_V$. When the point of view of the viewer is changed with the movement of the viewer but the multi-view image $V_V$ corresponding to the changed point of view is present, the viewer can stereoscopically view the multi-view images $V_V$. In this way, as the number of multi-view images $V_V$ increases, the viewer can stereoscopically view the multi-view images $V_V$ at more positions. As the number of multi-view images $V_V$ increases, a reverse view, that is, a phenomenon that a multi-view image $V_V$ to be recognized with the viewer's right eye is recognized with the viewer's left eye, less occurs. By creating plural multi-view images $V_V$, it is possible to express a motion parallax.

In step S4, the autostereoscopic display performs a fallback. This process is schematically a process of correcting the multi-view images $V_V$ again depending on the details. In step S5, the autostereoscopic display stereoscopically displays the multi-view images $V_V$.

<2. Configuration of Image Processing Device>

Figure 5:
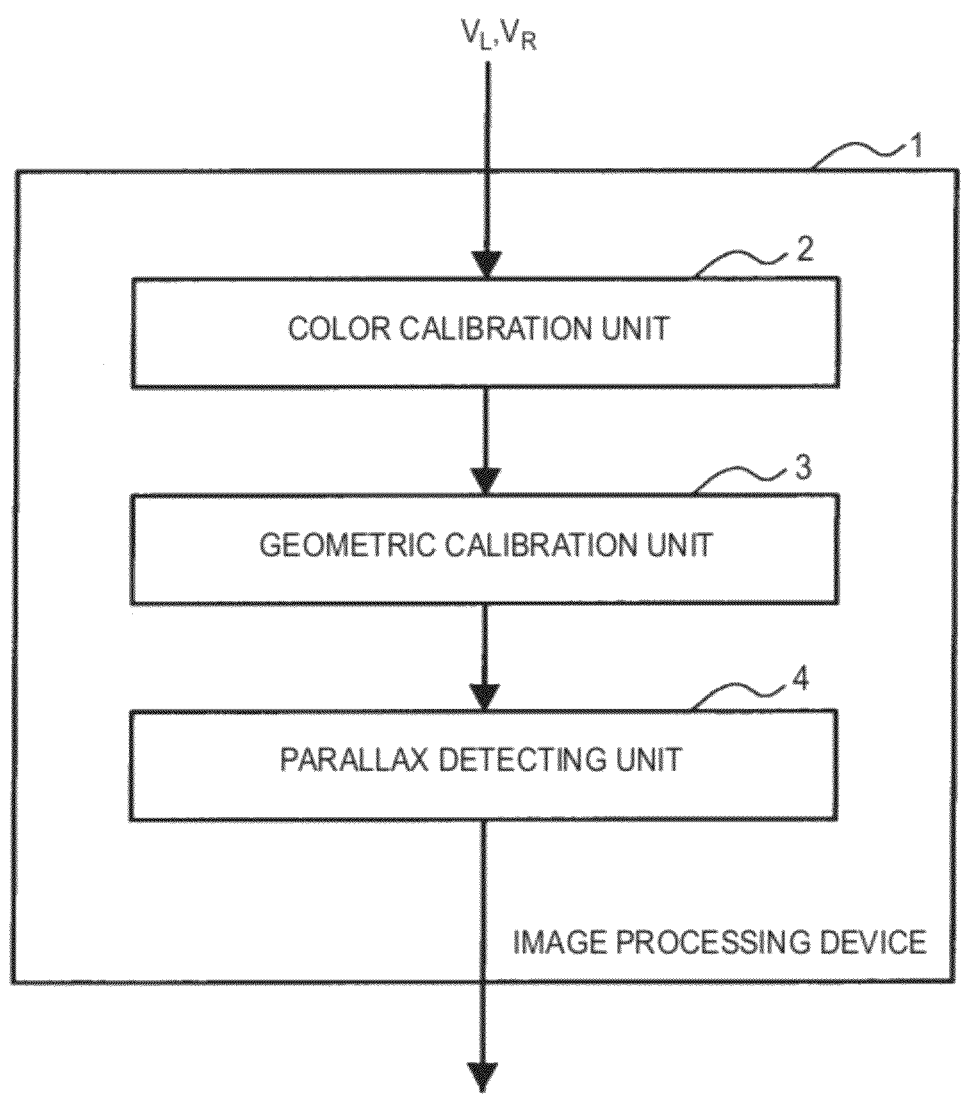
FIG. 5 is a block diagram illustrating the configuration of an image processing device according to an embodiment of the present disclosure.

The configuration of an image processing device 1 according to this embodiment will be described below with reference to the accompanying drawings. As shown in FIG. 5, the image processing device 1 includes a color calibration unit 2, a geometric calibration unit 3, and a parallax detecting unit 4. The color calibration unit 2 performs the above-mentioned color calibration on the input images $V_L$ and $V_R$ of the current frame and the geometric calibration unit 3 performs the above-mentioned geometric calibration on the color-calibrated images $V_{L-1}$ and $V_{R-1}$ which are the input images $V_L$ and $V_R$ subjected to the color calibration. The parallax detecting unit 4 performs the above-mentioned parallax detection on the calibrated images $V_{L-2}$ and $V_{R-2}$. Therefore, the image processing device 1 performs the processes of steps S1 to S2 out of the processes performed by the autostereoscopic display.

<2-1. Configuration of Color Calibration Unit>

Figure 6:
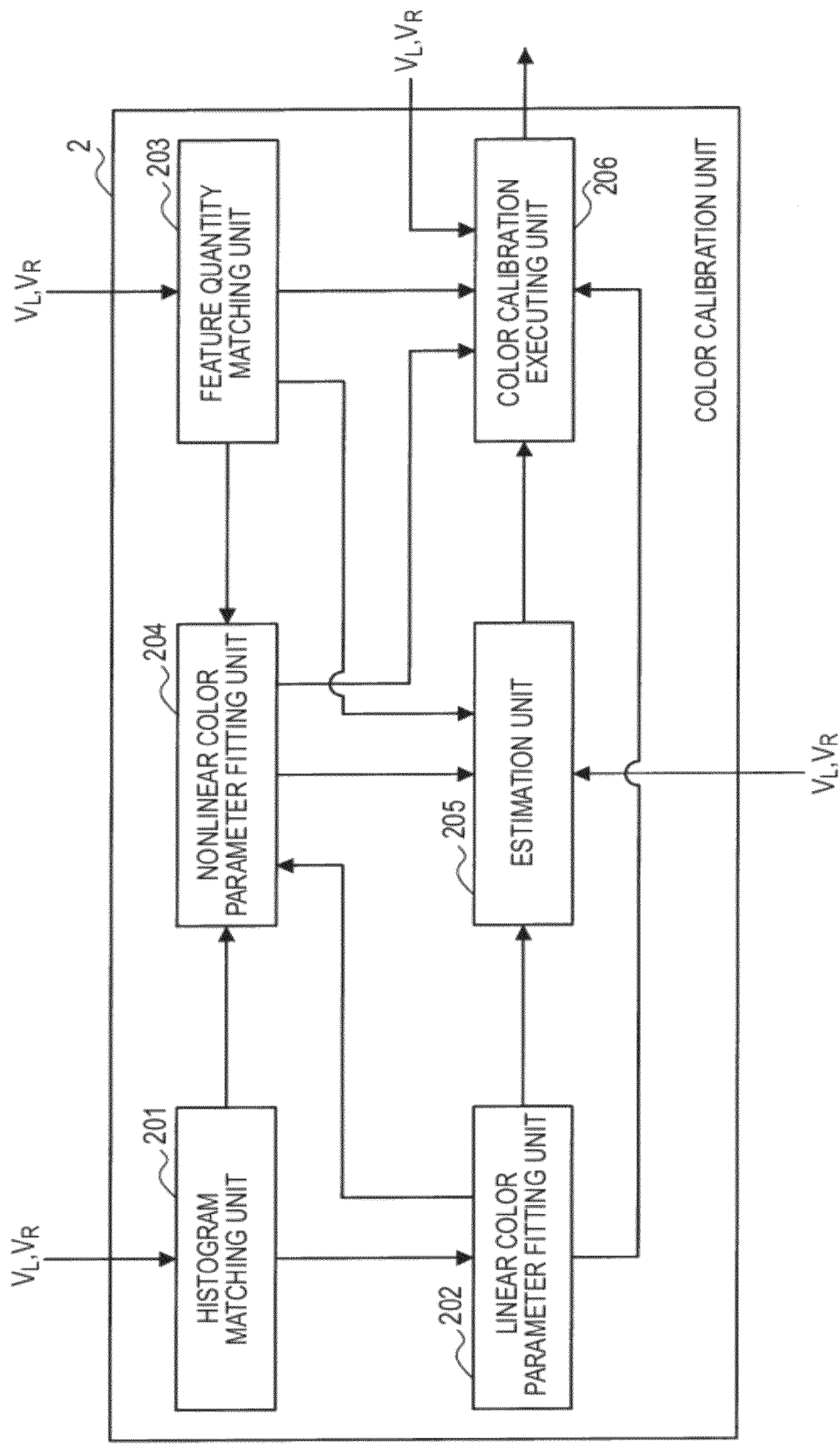
FIG. 6 is a block diagram illustrating the configuration of a color calibration unit.

The configuration of the color calibration unit 2 will be described below with reference to FIG. 6. As shown in FIG. 6, the color calibration unit 2 includes a histogram matching unit 201, a linear color parameter fitting unit 202, a feature quantity matching unit 203, a nonlinear color parameter fitting unit 204, an estimation unit 205, and a color calibration executing unit 206.

[Configuration of Histogram Matching Unit]

Figure 7:
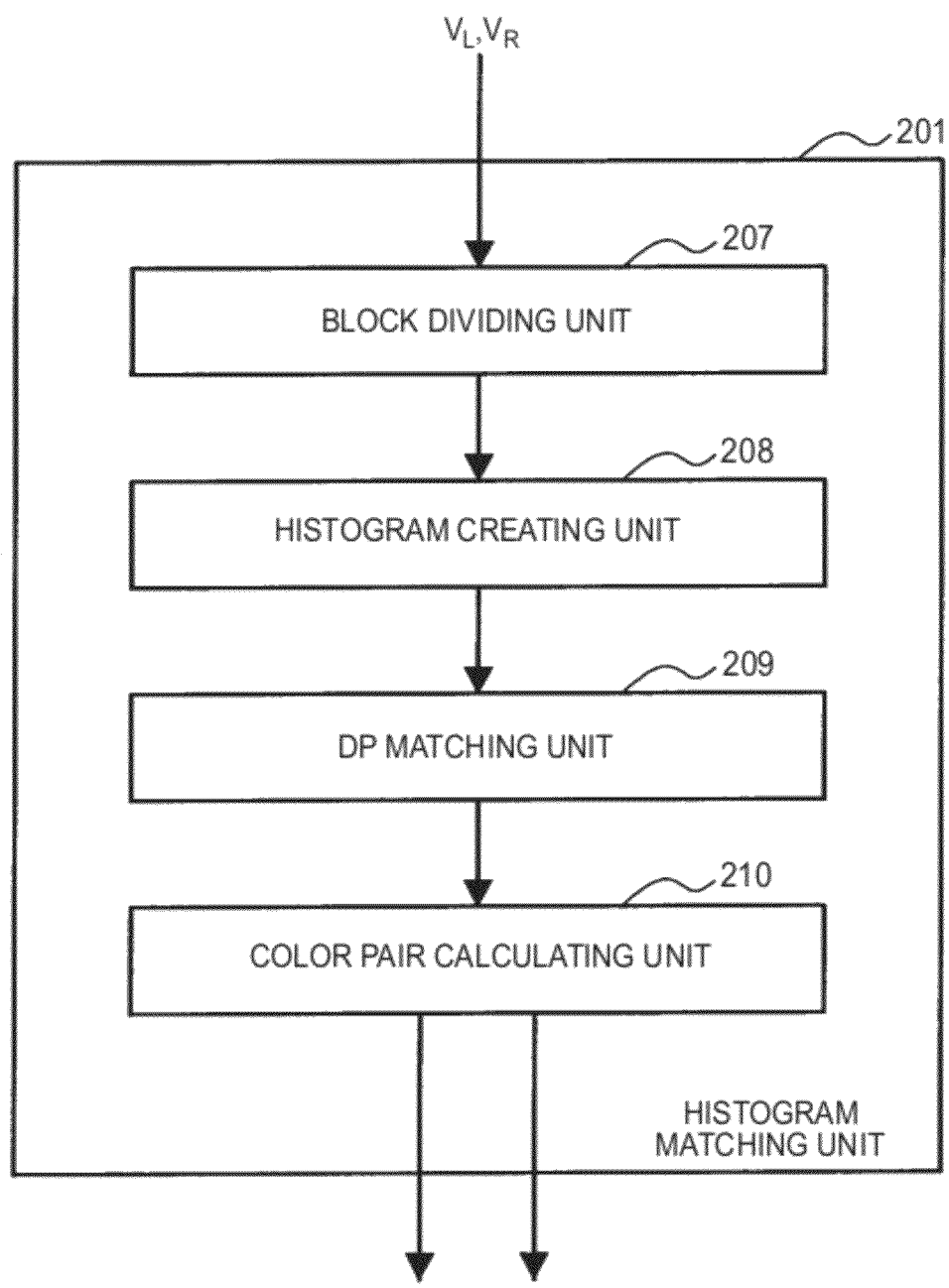
FIG. 7 is a block diagram illustrating the configuration of a histogram matching unit.

As shown in FIG. 7, the histogram matching unit 201 includes a block dividing unit 207, a histogram creating unit 208, a DP (Dynamic Programming) matching unit 209, and a color pair calculating unit 210.

Figure 8B:
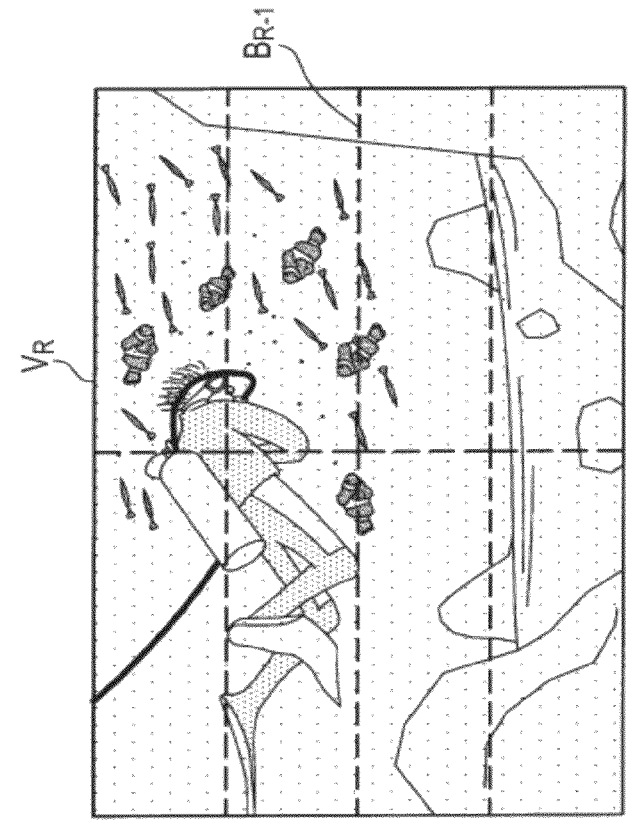
FIGS. 8A and 8B are diagrams illustrating a situation where an input image is divided in plural blocks.
Figure 8A:
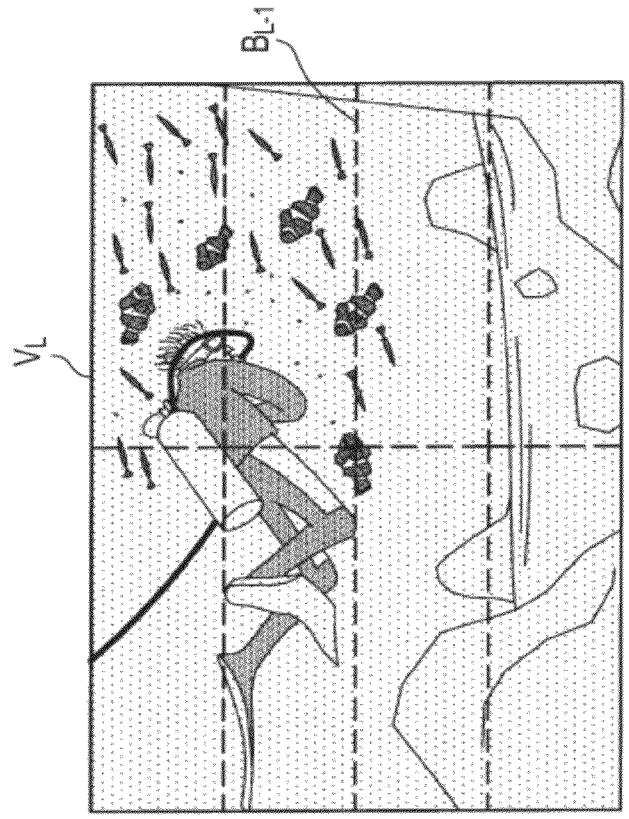

As shown in FIG. 8A, the block dividing unit 207 divides an input image $V_L$ into eight pixel blocks $B_{L-1}$. Here, each pixel block $B_{L-1}$ is rectangular and has the same size. The block dividing unit 207 extracts a pixel serving as the central point of each pixel block $B_{L-1}$ and sets the coordinate of the extracted pixel as the coordinate of the corresponding pixel block $B_{L-1}$.

Similarly, as shown in FIG. 8B, the block dividing unit 207 divides an input image $V_R$ into eight pixel blocks $B_{R-1}$. Here, each pixel block $B_{R-1}$ has the same shape and size as the pixel blocks $B_{L-1}$. The block dividing unit 207 extracts a pixel serving as the central point of each pixel block $B_{R-1}$ and sets the coordinate of the extracted pixel as the coordinate of the corresponding pixel block $B_{R-1}$. Accordingly, the pixel blocks $B_{R-1}$ having the same coordinate are present in the respective pixel block $B_{L-1}$. In other words, the pixel blocks $B_{L-1}$ and the pixel blocks $B_{R-1}$ correspond to each other in one-to-one correspondence. Therefore, the block dividing unit 207 correlates the pixel blocks $B_{L-1}$ and the pixel blocks $B_{R-1}$ with each other. The numbers of pixel blocks $B_{L-1}$ and $B_{R-1}$ are not limited to eight.

The block dividing unit 207 lowers the grayscale of the pixel blocks $B_{L-1}$ and $B_{R-1}$ to 64 grayscales. The grayscale of the pixel blocks $B_{L-1}$ and $B_{R-1}$ is not limited to 64 grayscales. The grayscale of the original input images $V_L$ and $V_R$ is not particularly limited, but is, for example, 1024 grayscales. The block dividing unit 207 outputs block information on the pixel blocks $B_{L-1}$ and $B_{R-1}$ to the histogram creating unit 208.

Figure 9A:
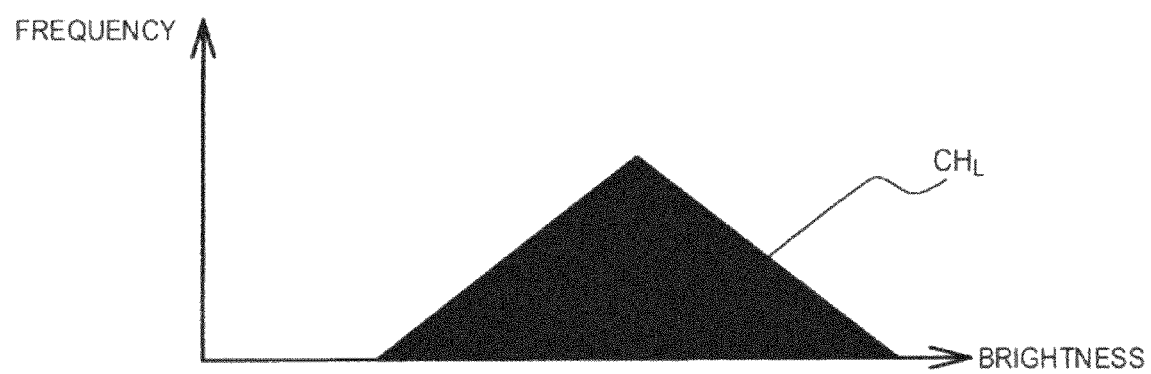
FIGS. 9A and 9B are diagrams illustrating a color histogram created for each block.
Figure 9B:
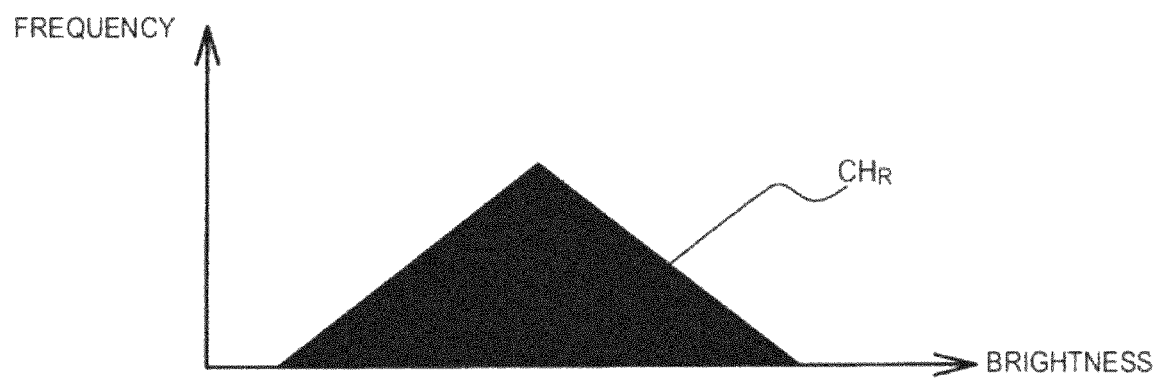

The histogram creating unit 208 performs the following processes on the basis of the block information. That is, the histogram creating unit 208 creates a color histogram $CH_L$ for each pixel block $B_{L-1}$, as shown in FIG. 9A. The color histogram $CH_L$ represents the brightness distribution in each pixel block $B_{L-1}$, that is, the correspondence between the brightness and the number of pixels (frequency) having the brightness. Here, the brightness is expressed by integer values of 0 to 63. Similarly, the histogram creating unit 208 creates a color histogram $CH_R$ for each pixel block as shown in FIG. 9B. The color histogram $CH_R$ represents the brightness distribution in each pixel block $B_{R-1}$, that is, the correspondence between the brightness and the number of pixels (frequency) having the brightness. Since the pixel blocks $B_{L-1}$ and the pixel blocks $B_{R-1}$ correspond to each other in a one-to-one manner, the color histogram $CH_L$ and the color histogram $CH_R$ correspond to each other in a one-to-one manner. Therefore, the histogram creating unit 208 correlates the color histogram $CH_L$ and the color histogram $CH_R$ with each other. The histogram creating unit 208 creates color histogram information on the color histograms $CH_L$ and $CH_R$ and outputs the created color histogram information to the DP matching unit 209.

Figure 10:
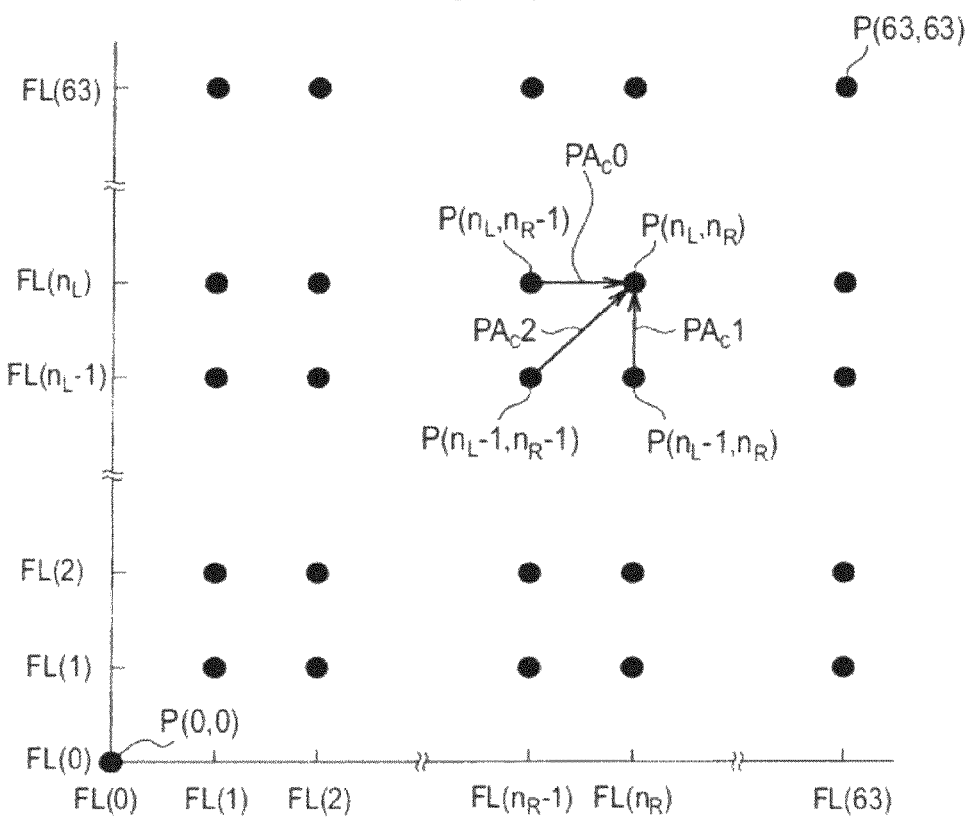
FIG. 10 is a color correspondence detecting DP map used for color histogram matching.

The DP matching unit 209 (the matching unit) performs the following processes for each group f a pixel block $B_{L-1}$ and a pixel block $B_{R-1}$ corresponding to the pixel block $B_{L-1}$ on the basis of the color histogram information. That is, the DP matching unit 209 first creates a color correspondence detecting DP map as shown in FIG. 10. The vertical axis of the color correspondence detecting DP map represents the frequency for the brightness in the pixel block $B_{L-1}$. For example, $FL(n_L)$ represents the frequency of brightness $n_L$ (where $n_L$ is an integer of 0 to 63). On the other hand, the horizontal axis of the color correspondence detecting DP map represents the frequency for the brightness in the pixel block $B_{R-1}$. For example, $FL(n_R)$ represents the frequency of brightness $n_R$ (where $n_R$ is an integer of 0 to 63). A node indicating the frequencies $FL(n_L)$ and $FL(n_R)$ is expressed by $P(n_L, n_R)$.

The DP matching unit 209 sets a node $P(0, 0)$ as a start point and a node $P(63, 63)$ as an end point and defines the accumulated cost from the start point to the node $P(n_L, n_R)$ as follows.

$$DFI(n_L,n_R)_0 = DFI(n_L,n_R-1) + |FL(n_L) - FL(n_R)| \quad (1)$$

$$DFI(n_L,n_R)_1 = DFI(n_L-1,n_R) + |FL(n_L) - FL(n_R)| \quad (2)$$

$$DFI(n_L,n_R)_2 = DFI(n_L-1,n_R-1) + |FL(n_L) - FL(n_R)| \quad (3)$$

Here, $DFI(n_L, n_R)_0$ represents the accumulated cost to the node $P(n_L, n_R)$ via a path $PA_C0$, $DFI(n_L, n_R)_1$ represents the accumulated cost to the node $P(n_L, n_R)$ via a path $PA_C1$, and $DFI(n_L, n_R)_2$ represents the accumulated cost to the node $P(n_L, n_R)$ via a path $PA_C2$. $DFI(n_L, n_R-1)$ represents the accumulated cost from the start point to the node $P(n_L, n_R-1)$. $DFI(n_L-1, n_R)$ represents the accumulated cost from the start point to the node $P(n_L-1, n_R)$. $DFI(n_L-1, n_R-1)$ represents the accumulated cost from the start point to the node $P(n_L-1, n_R-1)$.

The DP matching unit 209 calculates the shortest path, that is, a path in which the accumulated cost from the start point to the end point is the minimum, by calculating the accumulated cost from the start point to the nodes including the end point and tracking back the patch having the minimum accumulated cost from the end point to the start point. The nodes in the shortest path represent pairs of brightness similar to each other. For example, when the shortest path passes through the node $P(n_L, n_R)$, the brightness $n_L$ and the brightness $n_R$ are similar to each other. The Dp matching unit 209 creates shortest path information on the shortest path calculated for each group of pixel block $B_{L-1}$ and pixel block $B_{R-1}$ and outputs the created shortest path information to the color pair calculating unit 210.

The color pair calculating unit 210 calculates a color pair for each group of pixel block $B_{L-1}$ and pixel block $B_{R-1}$ on the basis of the shortest path information. That is, the color pair calculating unit 210 calculates a pair of brightness indicated by the nodes in the shortest path, that is, a pair of brightness similar to each other, as a color pair. The color pair calculating unit 210 calculates 250 color pairs for each pixel block $B_{L-1}$ and calculates 2000 color pairs in total. The color pair calculating unit 210 creates color pair information on the calculated color pairs and outputs the created color pair information to the linear color parameter fitting unit 202 and the nonlinear color parameter fitting unit 204.

Accordingly, since the histogram matching unit 201 lowers the grayscale of the pixel blocks $B_{L-1}$ and $B_{R-1}$ to be lower than the grayscale of the input images $V_L$ and $V_R$, it is possible to reduce the amount of data such as the histograms $CH_L$ and $CH_R$. Since plural types of brightness of the input images $V_L$ and $V_R$ are classified into one brightness by lowering the grayscale, the accuracy of the color calibration is considered to be lowered. Therefore, the histogram matching unit 201 covers the lowering in accuracy by calculating the color pairs from the plural pixel blocks $B_{L-1}$ and $B_{R-1}$, that is, increasing the number of color pairs.

[Configuration of Linear Color Parameter Fitting Unit]

Figure 11:
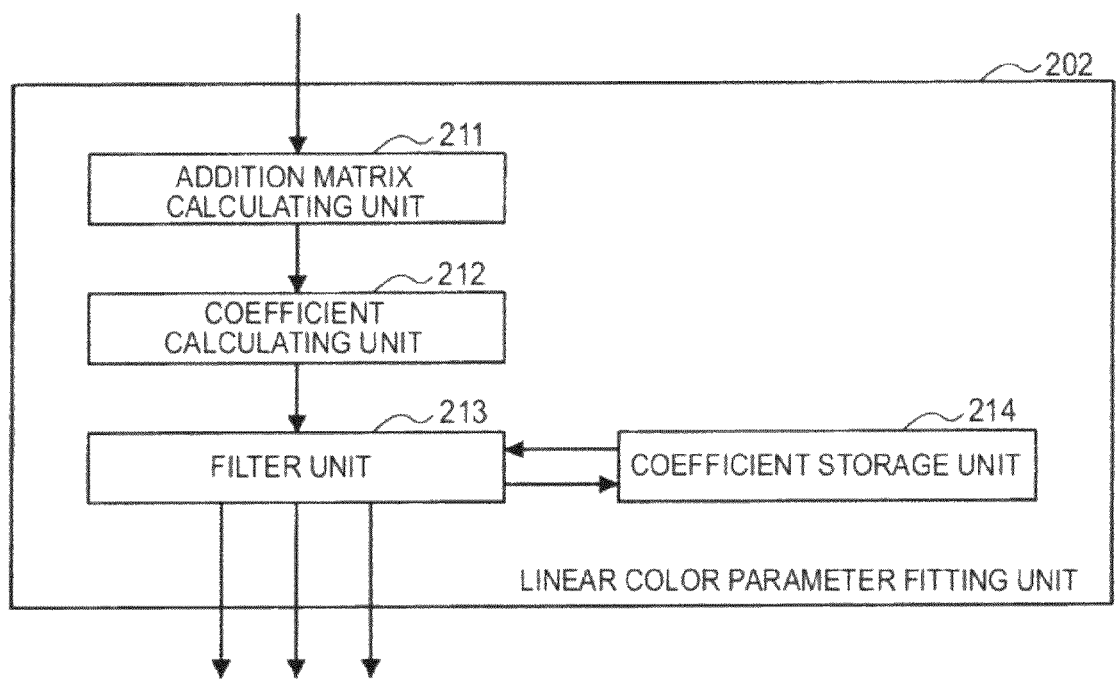
FIG. 11 is a block diagram illustrating the configuration of a linear color parameter fitting unit.

The linear color parameter fitting unit 202 includes an addition matrix calculating unit 211, a coefficient calculating unit 212, a filter unit 213, and a coefficient storage unit 214, as shown in FIG. 11.

The linear color parameter fitting unit 202 calculates a model formula representing the correspondence between the brightness of the input image $V_L$ and the brightness of the input image $V_R$ on the basis of the color pair information through the use of a linear operation. The model formula will be first described.

When it is assumed that the gamma values of the input images $V_L$ and $V_R$ are close to 1, the brightness of the input image $V_L$ is expressed as follows by the use of the brightness of the input image $V_R$.

$$L=(1+\alpha)r^{(1+\gamma)} \cdot 255 \tag{4}$$

$$r=R/255 \tag{5}$$

Here, L represents the brightness of the input image $V_L$ and R represents the brightness of the input image $V_R$. In addition, $\alpha$ represents the gain of the autostereoscopic display and $\gamma$ represents the gamma value of the autostereoscopic display. That is, the brightness of the input images $V_L$ and $V_R$ is restricted with the gain and the gamma value. In this way, it is possible to obtain a dullness-free image. Expression (6) can be obtained by Tailor-expanding Expression (4).

$$L \approx w_0 \cdot R + \sum_{i=1} w_i \cdot R \cdot \log(r)^i \tag{6}$$

Here, $w_i$ (where i is an integer equal to or greater than 0) represents a coefficient, that is, a color correction coefficient. Expression (6) is a model formula. Expression (7) obtained by adding an offset term $w_a$ to Expression (6) can more accurately follow the variation in brightness of the input images $V_L$ and $V_R$ than Expression (6). Therefore, the linear color parameter fitting unit 202 employs Expression (6) or Expression (7) as a model formula (that is, an approximation).

$$L \approx w_0 \cdot R + \sum_{i=1} w_i \cdot R \cdot \log(r)^i + w_a = g_1(R, coef(w)) \tag{7}$$

Here, coef(w) represents the color correction coefficients $w_i$ and $w_a$.

Processes to be performed by the above-mentioned elements will be described below. The addition matrix calculating unit 211 calculates the matrix expressed by Expression (8) for all the color pairs.

$$\begin{pmatrix} 1.0 \\ L \\ L \cdot \log(l) \\ \dots \\ L \cdot \log(l)^{n1-1} \end{pmatrix} ( 1.0 \quad L \quad L \cdot \log(l) \quad \dots \quad L \cdot \log(l)^{n1-1} ) \tag{8}$$

$$l = L/255.0$$

Here, n1 is an integer equal to or greater than 2 and an increase in value of n1 causes an increase in the number of coefficients to be calculated and an improvement in accuracy of the model formula. The value of n1 is determined depending on desired accuracy and processing speed and is, for example, in the range of 2 to 5.

The addition matrix calculating unit 211 calculates an addition matrix $M_1$ expressed by Expression (9) by adding all the calculated matrixes.

$$M_1 = \sum \begin{pmatrix} 1.0 \\ L \\ L \cdot \log(l) \\ \dots \\ L \cdot \log(l)^{n1-1} \end{pmatrix} ( 1.0 \quad L \quad L \cdot \log(l) \quad \dots \quad L \cdot \log(l)^{n1-1} ) \tag{9}$$

The addition matrix calculating unit 211 creates addition matrix information on the calculated addition matrix $M_1$ and outputs the created addition matrix information to the coefficient calculating unit 212 along with the color pair information.

The coefficient calculating unit 212 (the model formula calculating unit) calculates a matrix expressed by Expression (10) for all the color pairs on the basis of the color pair information.

$$R(1.0 \, L \, L \cdot \log(l) \dots L \cdot \log(l)^{n1-1}) \tag{10}$$

The coefficient calculating unit 212 calculates a coefficient calculating matrix A expressed by Expression (11) by adding all the calculated matrixes.

$$A = \Sigma R(1.0 \, L \, L \cdot \log(l) \dots L \cdot \log(l)^{n1-1}) \tag{11}$$

Then, the coefficient calculating unit 212 calculates first initial values $coef(w)_1$ of the color correction coefficients $w_i$ and $w_a$ on the basis of Expression (12).

$$(w_a w_0 w_1 \dots w_{nl-1}) = coef(w)_1 = M_1^{-1} A \tag{12}$$

The coefficient calculating unit 212 creates first initial value information on the calculated first initial value $coef(w)_1$ and outputs the created first initial value information to the filter unit 213.

The filter unit 213 calculate second initial values $coef(w)_2$ of the color correction coefficients $w_i$ and $w_a$ on the basis of the first initial value information acquired from the coefficient calculating unit 212, the linear correction coefficient information of the previous frame (the frame previous just to the current frame) acquired from the coefficient storage unit 214, and Expression (13).

$$coef(w)_2 = (1-w_b) \cdot coef(w)_1 + w_b \cdot oldcoef(linear) \tag{13}$$

Here, oldcoef(linear) represents a linear correction coefficient of the previous frame, that is, the color correction coefficients $w_i$ and $w_a$ of the previous frames, $w_b$ represents a weight indicating by what to apply the linear correction coefficient oldcoef(linear) of the previous frame to the second initial value coef(w)$_2$. As the value of the weight $w_b$ becomes greater (the weight increases), the linear correction coefficient oldcoef(linear) more greatly acts on the second initial value coef(w)$_2$. The value of the weight $w_b$ is, for example, in the range of 0.5 to 0.9.

The filter unit 213 applies an IIR filter to the second initial value coef(w)2. The filter unit 213 sets the resultant color correction coefficient wi and wa as a linear correction coefficient coef(linear) and outputs linear correction coefficient information on the linear correction coefficient coef(linear) to the coefficient storage unit 214, the nonlinear color parameter fitting unit 204, the estimation unit 205, and the color calibration executing unit 206.

The coefficient storage unit 214 stores the linear correction coefficient information supplied from the filter unit 213 and outputs the stored linear correction coefficient information to the filter unit 213 as the linear correction coefficient information of the previous frame to the filter unit 213 when calculating the second initial value coef(w)2 of the next frame.

FIGS. 12A to 12D show the gamma curve L1 of the input images $V_L$ and $V_R$ corrected by the use of the linear correction coefficient coef(linear) and the gamma curve L2 of the input images $V_L$ and $V_R$ not corrected for each gamma value for comparison with each other. That is, FIG. 12A shows an example of γ=0.6, FIG. 12B shows an example of γ=0.8, FIG. 12C shows an example of γ=1.2, and FIG. 12D shows an example of γ=1.4. In FIGS. 12A to 12D, Expression (6) is employed as the model formula and n1=2 is set. According to FIGS. 12A to 12D, the color calibration unit 2 can correct the brightness while substantially maintaining the brightness or saturation of the input images $V_L$ and $V_R$ by performing the color calibration using the linear correction coefficient coef (linear).

[Configuration of Feature Quantity Matching Unit]

The feature quantity matching unit 203 shown in FIG. 6 extracts color pairs by matching the brightness of the input images $V_L$ and $V_R$ of the current frame with each other. Specifically, the feature quantity matching unit 203 extracts feature points having brightness higher than a predetermined value (for example, in the range of 32 to 1024) from the input images $V_L$ and $V_R$. Then, the feature quantity matching unit 203 performs the following processes on the respective feature points of the input image $V_L$. That is, the feature quantity matching unit 203 extracts a feature point having the most similar brightness (that is, the smallest absolute value of the difference in brightness) out of the feature points of the input image $V_R$ (that is, in which the absolute value of the difference in x coordinate is in the range of 64 to 256 and the absolute value of the difference in y coordinate is in the range of 8 to 64) present around the feature points of the input image $V_L$, and sets the extracted feature point and the feature point of the input image $V_L$ as a pair of feature points, that is, as the color pair. Then, the feature quantity matching unit 203 creates color pair information on the extracted color pair and outputs the created color pair information to the nonlinear color parameter fitting unit 204 and the estimation unit 205.

[Configuration of Nonlinear Color Parameter Fitting Unit]

The nonlinear color parameter fitting unit 204 calculates the color correction coefficients $w_i$ and $w_a$ through the use of a nonlinear operation on the basis of the color pair information supplied from the histogram matching unit 201 and the feature quantity matching unit 203 and the linear correction coefficient information supplied from the linear color parameter fitting unit 202.

Figure 13:
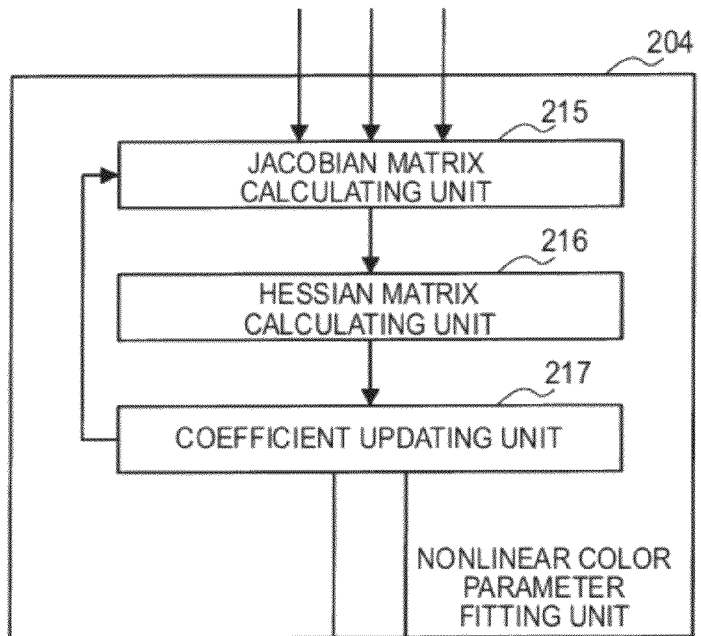
FIG. 13 is a block diagram illustrating the configuration of a nonlinear color parameter fitting unit.

Specifically, the nonlinear color parameter fitting unit 204 includes a Jacobian matrix calculating unit 215, a Hessian matrix calculating unit 216, and a coefficient updating unit 217, as shown in FIG. 13.

The Jacobian matrix calculating unit 215 calculates a Jacobian matrix $J_1$ expressed by Expression (14) on the basis of the linear correction coefficient information supplied from the linear color parameter fitting unit 202 and the color pair information supplied from the histogram matching unit 201 and the feature quantity matching unit 203.

$$J_1 = f_{e1}(L, R, coef(w)) \cdot d_{coef} f_{e1}(L, R, coef(w)) \qquad (14)$$

$$= f_{e1}(L, R, coef(w)) \cdot \begin{pmatrix} \frac{\partial f_{e10}}{\partial w_a} & \frac{\partial f_{e10}}{\partial w_1} & \cdots & \frac{\partial f_{e10}}{\partial w_{n1-1}} \\ \cdots & \cdots & \cdots & \cdots \\ \frac{\partial f_{e1m}}{\partial w_a} & \frac{\partial f_{e1m}}{\partial w_1} & \cdots & \frac{\partial f_{e1m}}{\partial w_{n1-1}} \end{pmatrix}$$

Here, L represents the brightness of the input image $V_L$, R represents the brightness of the input image $V_R$, and coef(w) represents the color correction coefficients $w_i$ and $w_a$. In addition, $f_{e1}$(L, R, coef(w)) is an error function and is expressed by Expression (15). $f_{e10}$ to $f_{e1m}$ are obtained by substituting different color pair information into the error function $f_{e1}$(L, R, coef(w)).

$$f_{e1}(L,R,coef(w))=\text{RobustFunc}(L-g_1(R,coef(w))) \qquad (15)$$

Here, since $g_1$(R, coef(w)) is an expression approximating the brightness of the input image $V_L$ by the use of the brightness of the input image $V_R$ and the color correction coefficients $w_i$ and $w_a$ as expressed by Expression (7) the value of (L−$g_1$(R, coef(w))) represents the error between the actual value of the input image $V_L$ and the approximate value. RobustFunc is a function for normalizing an error to a value in the range of 0 to 1 and is expressed, for example, by Expression (16).

$$\text{RobustFunc}(error)=w_c \cdot error/(error \times w_c+1) \qquad (16)$$

Here, $w_c$ represents a coefficient (weight) and is, for example, in the range of 0.1 to 8.0. In Expression (15), the error is (L−$g_1$(R, coef(w))), but the error may have a different value such as ($g_1$(L, coef(w))−$g_1$(R, coef(w))). Here, $g_1$(L, coef(w)) is a value obtained by approximating the brightness of the input image $V_R$ by the use of the brightness of the input image $V_L$ and the color correction coefficient $w_i$ and $w_a$, and is expressed by Expressions 7-1 and 7-2.

$$R \approx w_0 \cdot L + \sum_{i=1} w_i \cdot L \cdot \log(l)^i + w_a = g_1(L, coef(w)) \qquad (7\text{-}1)$$

$$l = L/255 \qquad (7\text{-}2)$$

The Jacobian matrix calculating unit 215 creates Jacobian matrix information on the calculated Jacobian matrix J1 and outputs the created Jacobian matrix information to the Hessian matrix calculating unit 216.

When supplied with the nonlinear correction coefficient information from the coefficient updating unit 216 to be described later, the Jacobian matrix calculating unit 215 calculates the Jacobian matrix $J_1$ on the basis of the nonlinear correction coefficient coef(nonlinear) indicated by the nonlinear correction coefficient information and the color pair information. The Jacobian matrix calculating unit 215 creates the Jacobian matrix information on the calculated Jacobian matrix $J_1$ and outputs the created Jacobian matrix information to the Hessian matrix calculating unit 216.

The Hessian matrix calculating unit 216 calculated a Hessian matrix $H_1$ expressed by Expression (17) on the basis of the information supplied from the Jacobian matrix calculating unit 216.

$$H_1 = d_{coef} f(L,R,\text{coef}(w)) \cdot d_{coef} f(L,R,\text{coef}(w)) \qquad (17)$$

Then, the Hessian matrix calculating unit 216 creates Hessian matrix information on the calculated Hessian matrix $H_1$ and outputs the created Hessian matrix information to the coefficient updating unit 217 along with the information supplied from the Jacobian matrix calculating unit 215.

The coefficient updating unit 217 calculates the color correction coefficients $w_i$ and $w_a$ as the nonlinear correction coefficient coef(nonlinear) on the basis of the information supplied from the Hessian matrix calculating unit 216 and Expression (18).

$$\text{coef(nonlinear)} = (H_1 + w_d \cdot I)^{-1} \cdot J_1 + \text{coef}(w) \qquad (18)$$

Here, I represents the unit matrix, and $w_d$ represent a coefficient (weight) and is, for example, in the range of 1.0 to 0.0.

Then, the coefficient updating unit 217 creates nonlinear correction coefficient information on the calculated nonlinear correction coefficient coef(nonlinear) and determines whether the nonlinear correction coefficient coef(nonlinear) converges on a constant value. The coefficient updating unit 217 outputs the nonlinear correction coefficient information to the estimation unit 205 and the color calibration executing unit 206 when it is determined that the nonlinear correction coefficient coef(nonlinear) converges, and outputs the nonlinear correction coefficient information to the Jacobian matrix calculating unit 215 when it is determined that the nonlinear correction coefficient coef(nonlinear) does not converges. Thereafter, the nonlinear correction coefficient coef (nonlinear) is calculated again. Therefore, the nonlinear color parameter fitting unit 204 calculates the nonlinear correction coefficient coef(nonlinear) with the linear correction coefficient coef(linear) as an initial value and repeatedly calculates the nonlinear correction coefficient coef(nonlinear) until the nonlinear correction coefficient coef(nonlinear) converges on a constant value.

[Configuration of Estimation Unit]

Figure 14:
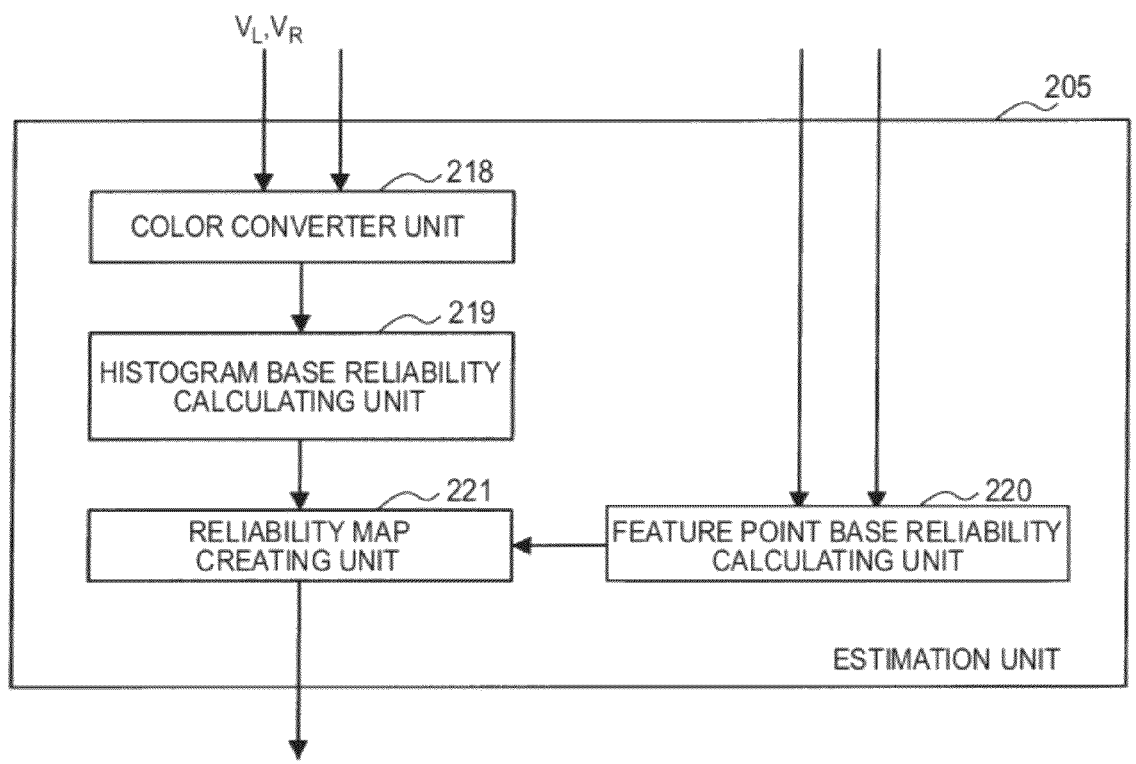
FIG. 14 is a block diagram illustrating the configuration of an estimation unit.

As shown in FIG. 14, the estimation unit 14 (the correction reliability calculating unit) includes a color converter unit 218, a histogram base reliability calculating unit 219, a feature point base reliability calculating unit 220, and a reliability map creating unit 221.

The color converter unit 218 acquires the input images $V_L$ and $V_R$ of the current frame. The color converter unit 218 corrects the brightness of the input image $V_R$ on the basis of the input images $V_L$ and $V_R$ and the linear correction coefficient information supplied from the linear color parameter fitting unit 202. Specifically, the color converter unit 218 calculates the value of $g_1(R, \text{coef})$ by substituting the brightness of the input image $V_R$ and the linear correction coefficient coef(linear) into $g_1(R, \text{coef})$ of Expression (7). Since the calculated value represents the brightness of the input image $V_L$ corresponding to the brightness of the input image $V_R$, the color converter unit 218 sets this value as the new brightness of the input image $V_R$. Accordingly, the difference between the brightness of the input image $V_L$ and the brightness of the input image $V_R$ is reduced. The color converter unit 218 outputs the input image $V_L$ and the corrected input image $V_R$ as linear-color-calibrated images $V_{L-1a}$ and $V_{R-1a}$ to the histogram base reliability calculating unit 219.

The histogram base reliability calculating unit 219 divides each of the linear-color-calibrated images $V_{L-1a}$ and $V_{R-1a}$ into eight pixel blocks $B_{L-1}$ and $B_{R-1}$. Here, the pixel blocks $B_{L-1}$ and $B_{R-1}$ are the same as created by the histogram matching unit 201. The histogram base reliability calculating unit 219 creates a corrected color histogram indicating the correspondence between the brightness and the number of pixels (frequency) having the brightness for each of the pixel blocks $B_{L-1}$ and $B_{R-1}$.

The histogram base reliability calculating unit 219 calculates the similarity between the corrected color histogram of the pixel blocks $B_{L-1}$ and the corrected color histogram of the pixel blocks $B_{R-1}$ by the use of normalized cross-correlation (NCC). The method of calculating the similarity is not particularly limited, but for example, interaction or Bhattacharyya may be used.

The histogram base reliability calculating unit 219 calculates the similarity for each of the pixel blocks $B_{L-1}$ and normalizes the similarity into the range of 0 to 1 by substituting the calculated similarity into, for example, error of Expression (16). The histogram base reliability calculating unit 219 sets the normalized value as the reliability of the linear correction coefficient coef(linear). The histogram base reliability calculating unit 219 creates linear correction coefficient reliability information on the calculated reliability of each pixel block $B_{L-1}$ and outputs the created linear correction coefficient reliability information to the reliability map creating unit 221.

The feature point base reliability calculating unit 220 classifies the feature points of the input image $V_L$ into the eight pixel blocks $B_{L-1}$ on the basis of the color pair information supplied from the feature quantity matching unit 203. Here, the pixel blocks $B_{L-1}$ are the same as created by the histogram matching unit 201. The feature point base reliability calculating unit 220 calculates the reliability of the nonlinear correction coefficient coef(nonlinear) for each pixel block $B_{L-1}$ on the basis of the nonlinear correction coefficient information supplied from the nonlinear color parameter fitting unit 204.

That is, the feature point base reliability calculating unit 220 calculates the errors of the feature points in the pixel blocks $B_{L-1}$ by the use of the above-mentioned error function $f_{e1}(L, R, \text{coef})$. That is, the feature point base reliability calculating unit 220 calculates the error by substituting the value of the color pair information into L and R of $f_{e1}(L, R, \text{coef})$ and substituting the value of the nonlinear correction coefficient coef(nonlinear) into coef. The feature point base reliability calculating unit 220 extracts the feature points of which the error is equal to or less than a predetermined value (for example, 0.5 to 8.0) and calculates the average value of the errors of the extracted feature points. The feature point base reliability calculating unit 220 sets the calculated average value as the reliability of the nonlinear correction coefficient coef(nonlinear). The feature point base reliability calculating unit 220 sets the reliability to zero when the number of feature points of which the error is equal to or less than a predetermined value is equal to or less than a predetermined value (for example, 0 to 8). Accordingly, the feature point base reliability calculating unit 220 calculates the reliability of the nonlinear correction coefficient coef(nonlinear) for each of the pixel blocks $B_{L-1}$. The feature point base reliability calculating unit 220 creates nonlinear correction coefficient reliability information on the calculated reliability of each of the pixel blocks $B_{L-1}$ and outputs the created nonlinear correction coefficient reliability information to the reliability map creating unit 221.

The reliability map creating unit 221 creates a color-calibration reliability map on the basis of the information supplied from the histogram base reliability calculating unit 219 and the feature point base reliability calculating unit 220. Specifically, the reliability map creating unit 221 compares the reliability of the nonlinear correction coefficient coef (nonlinear) with the reliability of the linear correction coefficient coef(linear) for each of the pixel blocks $B_{L-1}$ and sets the larger reliability as the reliability of the corresponding pixel block $B_{L-1}$. The reliability map creating unit 221 correlates the correction coefficient having the larger reliability with the corresponding pixel block $B_{L-1}$. Accordingly, the reliability map creating unit 221 creates the color-calibration reliability map in which the reliability and the correction coefficient are correlated with each pixel block $B_{L-1}$. The reliability map creating unit 221 creates reliability map information on the created color-calibration reliability map and outputs the created reliability map information to the color calibration executing unit 206 and the parallax detecting unit 4.

[Configuration of Color Calibration Executing Unit]

The color calibration executing unit 206 (the correction executing unit) shown in FIG. 6 acquires the input images $V_L$ and $V_R$ of the current frame. Then, the color calibration executing unit 206 determines which correction coefficient to use for each pixel block $B_{L-1}$ on the basis of the reliability map information. The color calibration executing unit 206 executes the color calibration for each pixel block $B_{L-1}$ on the basis of the linear correction coefficient information and the nonlinear correction coefficient information.

Specifically, the color calibration executing unit 206 extracts a pixel from each pixel block $B_{R-1}$, substitutes the brightness of the extracted pixel and the determined correction coefficient into the above-mentioned approximation $g_1(R, coef)$, and sets the result value as the brightness of the pixel. The color calibration executing unit 206 executes the color calibration by performing this process on all the pixels of the input image $V_R$. The color calibration executing unit 206 outputs the color-calibrated input images $V_L$ and $V_R$ as the color-calibrated input images $V_{L-1}$ and $V_{R-1}$ to the geometric calibration unit 3 shown in FIG. 5.

Figure 15A:
FIGS. 15A and 15B are diagrams illustrating a multi-view image created after performing color calibration and a multi-view image created without performing color calibration for comparison with each other.
Figure 15B:

FIG. 15A shows a multi-view image $V_V1$ created by the autostereoscopic display without performing the color calibration. Similarly, FIG. 15B shows a multi-view image $V_V2$ created by the autostereoscopic display after performing the color calibration. A subject image $V_V11$ in the multi-view image $V_V1$ is ruptured, but a subject image $V_V12$ in the multi-view image $V_V2$ is not ruptured. Accordingly, the autostereoscopic display can create a multi-view image without rupture by performing the color calibration.

[Advantages Due to Color Calibration Unit]

Advantages due to the color calibration unit 2 will be described below. In the following description, some advantages will be described in comparison with JP-T-2007-535829 and JP-A-2009-122842. In the technique described in JP-T-2007-535829, a histogram representing a color distribution is created for each image and these histograms are matched through the DP matching to create a color correspondence table. In the technique described in JP-T-2007-535829, the colors of each image are corrected on the basis of the color correspondence table. On the other hand, in the technique described in JP-A-2009-122842, a feature point (for example, a point where a person's shoulder is drawn) is extracted from plural images and a color-conversion model formula is calculated on the basis of the color correspondence between the feature points. In the technique described in JP-A-2009-122842, the colors of the images are corrected on the basis of the calculated model formula.

The color calibration unit 2 calculates a model formula for converting the brightness of an input image $V_R$ into the brightness of an input image $V_L$ on the basis of the color pair information. Here, the color pair information includes the brightness information of the pixels other than the feature point. The color calibration unit 2 applies the IIR filter to the model formula and thus can calculate a robust model formula, particularly, a temporally-robust model formula. Accordingly, the color calibration unit 2 can correct the color information with higher robustness.

The technique described in JP-A-2009-122842 has a problem in that the degree of accuracy is low because color conversion parameters are expressed by simple gains or polynomials. For example, the color conversion parameters do not express fully the variation of the gamma value. On the contrary, since the model formula according to this embodiment includes at least a gain and a gamma value as a parameter, the color calibration unit 2 can perform color calibration with high accuracy, that is, can correct the color information. Particularly, since Expression (7) includes an offset terms in addition, it is possible to correct the color information with higher accuracy.

The color calibration unit 2 divides the input images $V_L$ and $V_R$ into plural pixel blocks $B_{L-1}$ and $B_{R-1}$, respectively, and lowers the grayscale of the pixel blocks $B_{L-1}$ and $B_{R-1}$. The color calibration unit 2 creates the color histograms $CH_L$ and $CH_R$ for each of the pixel blocks $B_{L-1}$ and $B_{R-1}$ and creates the color pair information on the basis of the color histograms $CH_L$ and $CH_R$. Accordingly, since the color calibration unit 2 creates the color pair information on the basis of the pixel blocks $B_{L-1}$ and $B_{R-1}$ with the lower grayscale, it is possible to perform the color calibration (correct the color information) with a light processing load. Since the color calibration unit 2 matches the color histograms $CH_L$ and $CH_R$ with each other and calculates the color pair information on the basis of the matching result, it is possible to calculate the color pair information with higher accuracy. Particularly, since the color calibration unit 2 matches the color histograms $CH_L$ and $CH_R$ with each other through the use of the DP matching, it is possible to perform the matching with higher accuracy.

The technique described in JP-T-2007-535829 has a problem in that the amount of data of the histogram increases and the processing load becomes heavier with an increase in resolution of an image, because a histogram representing the color distribution of the overall image is created. On the contrary, since the color calibration unit 2 lowers the grayscale of the pixel blocks $B_{L-1}$ and $B_{R-1}$, it is possible to perform the color calibration (to correct the color information) with light processing load regardless of the resolution of the input images $V_L$ and $V_R$.

The color calibration unit 2 can cover the lowering in accuracy due to the lowering of the grayscale of the pixel blocks $B_{L-1}$ and $B_{R-1}$ by creating the color pair information for each pixel block $B_{L-1}$.

Since the color calibration unit 2 performs the nonlinear operation with the parameters calculated through the linear operation, that is, the color correction coefficients $w_i$ and $w_a$, as the initial values, it is possible to calculate a parameter, that is, a model formula, with higher accuracy.

Since the color calibration unit 2 calculates the reliability of the parameter calculated through the linear operation and the reliability of the parameter calculated calculated through the nonlinear operation and performs the color calibration on the basis of the parameter of which the reliability is higher, it is possible to correct the color information with high accuracy.

<2-2. Configuration of Geometric Calibration Unit>

Figure 16:
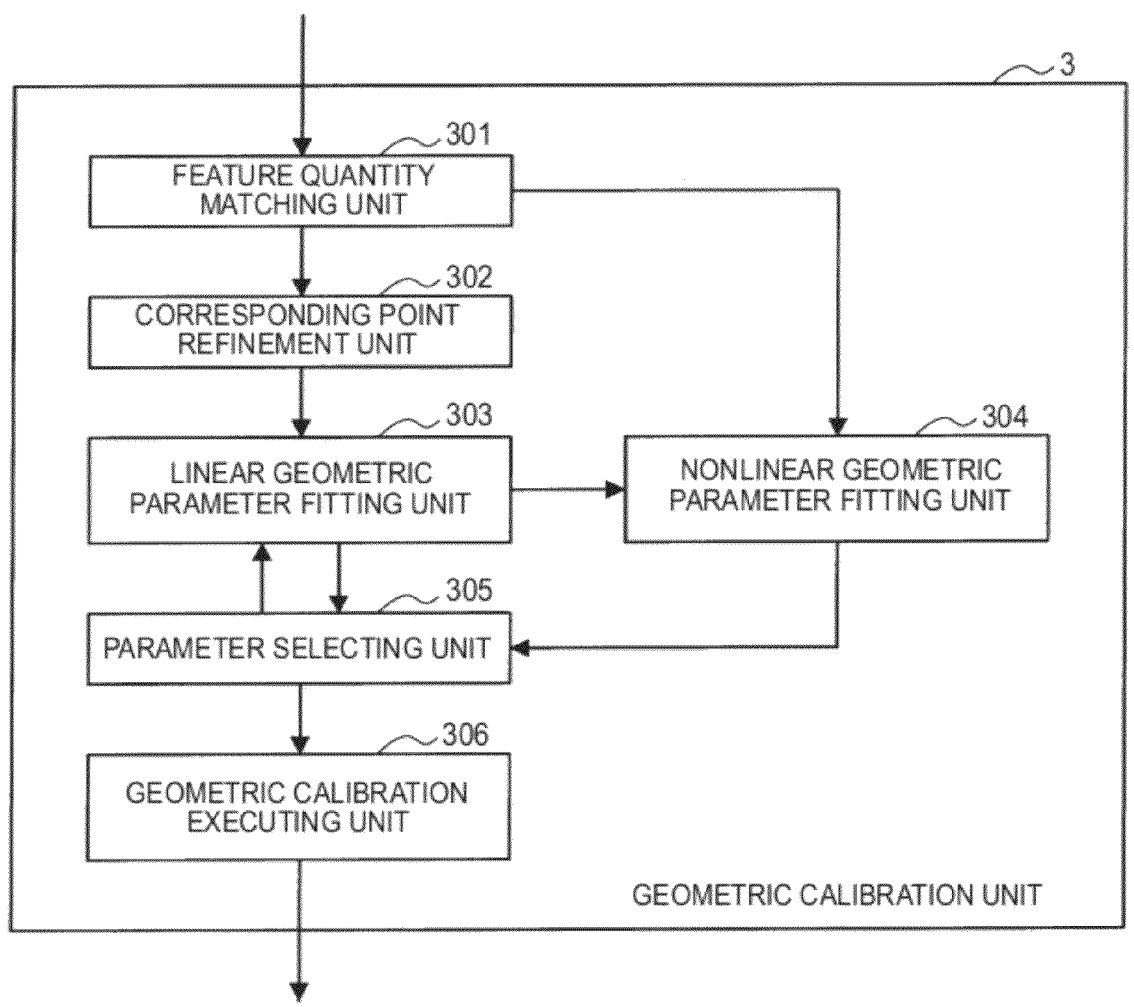
FIG. 16 is a block diagram illustrating the configuration of a geometric calibration unit.

The configuration of the geometric calibration unit 3 will be described below with reference to the accompanying drawings. As shown in FIG. 16, the geometric calibration unit includes a feature quantity matching unit 301, a corresponding point refinement unit 302, a linear geometric parameter fitting unit 303, a nonlinear geometric parameter fitting unit 304, a parameter selecting unit 305, and a geometric calibration executing unit 306.

[Configuration of Feature Quantity Matching Unit]

The feature quantity matching unit 301 calculate a feature quantity vector by matching the brightness of the color-calibrated images $V_{L-1}$ and $V_{R-1}$ with each other. Specifically, the feature quantity matching unit 301 divides the color-calibrated images $V_{L-1}$ and $V_{R-1}$ into 64 pixel blocks $B_{L-2}$ and $B_{R-2}$, respectively. Here, the respective pixel blocks $B_{L-2}$ and $B_{R-2}$ have a rectangular shape and has the same size. The feature quantity matching unit 301 extracts a pixel which is a central point of the respective pixel blocks $B_{L-2}$ and $B_{R-2}$ and sets the coordinates of the extracted pixels as the coordinates of the pixel blocks $B_{L-2}$ and $B_{R-2}$, respectively. Accordingly, the pixel blocks $B_{L-2}$ and the pixel blocks $B_{R-2}$ correspond to each other in a one-to-one manner. The feature quantity matching unit 301 extracts feature points having the brightness equal to or higher than a predetermined value (for example, 32 to 1024) for each of the pixel blocks $B_{L-2}$ and $B_{R-2}$. Hereinafter, the feature points of the color-calibrated image $V_{L-1}$ are also referred to as "left feature points" and the feature points of the color-calibrated image $V_{R-1}$ are also referred to as "right feature points". Then, the feature quantity matching unit 301 performs the following processes on the left feature points. That is, the feature quantity matching unit 301 extracts the feature point having the most similar brightness (that is, the smallest absolute value of the brightness difference) out of the right feature point (that is, of which the absolute value of the difference in x coordinate is in the range of 64 to 256 and the absolute value of the difference in y coordinate is in the range of 8 to 64) located around the left feature points and sets the right feature point and the left feature point as a feature point pair.

Figure 17:
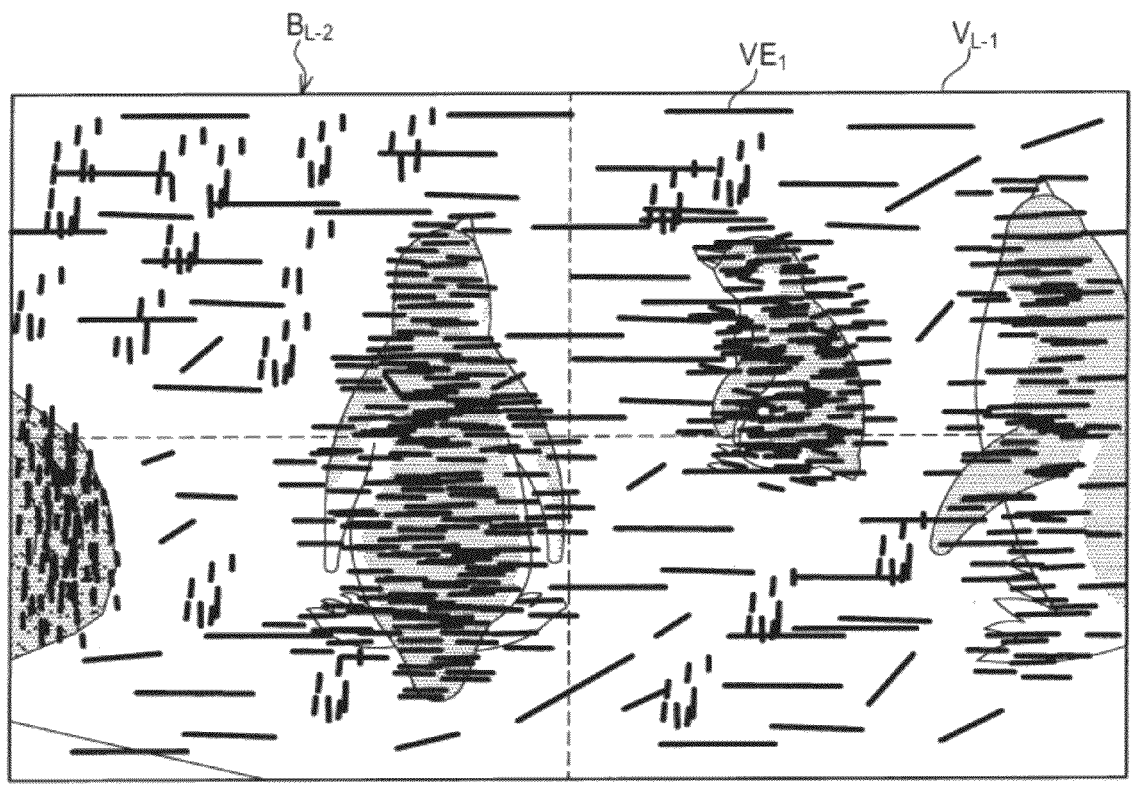
FIG. 17 is a diagram illustrating an input image subjected to a feature quantity matching process.

The feature quantity matching unit 301 calculates a feature quantity vector $VE_1$ on the basis of the feature point pairs. Here, the start point of the feature quantity vector $VE_1$ is the coordinate $(u_L, v_L)$ of the left feature point and the component thereof is $(u_R-u_L, v_R-v_L)$. $u_R$ is the x coordinate of the right feature point and $v_R$ is the y coordinate of the right feature point. FIG. 17 shows an example of the feature quantity vector $VE_1$ and the pixel block $B_{L-2}$. Here, the pixel block $B_{L-2}$ is obtained by dividing the color-calibrated image $V_{L-1}$ into four blocks.

As shown in FIG. 17, plural feature quantity vectors $VE_1$ having the same components are present in a part in which an object is drawn. The feature quantity matching unit 301 creates feature quantity vector information on the pixel blocks $B_{L-2}$ and $B_{R-2}$ and the feature quantity vectors $VE_1$ and outputs the created feature quantity vector information to the corresponding point refinement unit 302 and the nonlinear geometric parameter fitting unit 304. In this embodiment, since the geometric calibration is performed after the color calibration, the feature quantity matching unit 301 can match the brightness with high accuracy. Accordingly, the accuracy of the geometric calibration is improved. The geometric calibration may be performed before the color calibration. In this case, in the color calibration, it is possible to match the brightness with high accuracy and thus to improve the accuracy of the color calibration.

[Configuration of Corresponding Point Refinement Unit]

Figure 18:
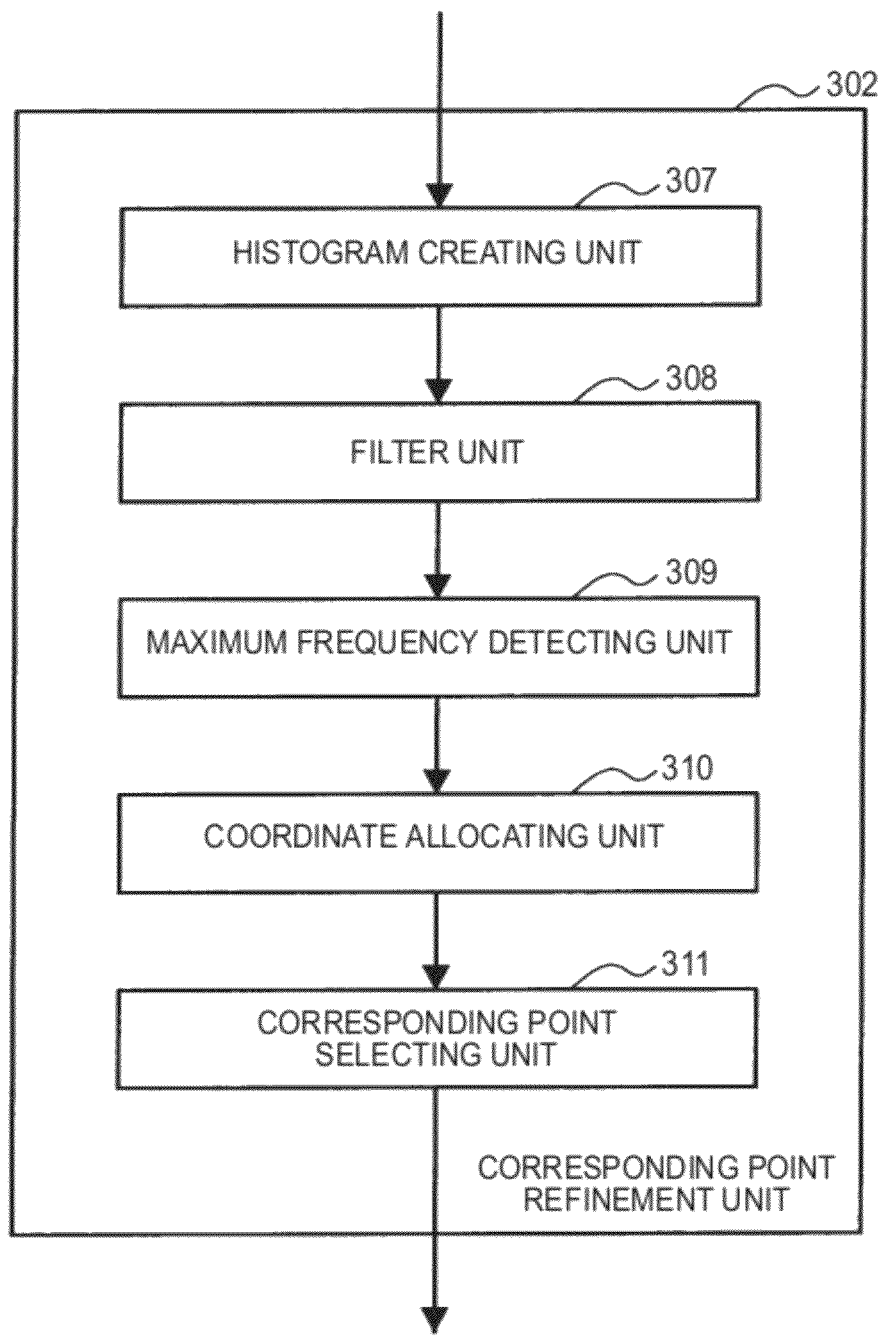
FIG. 18 is a block diagram illustrating the configuration of a corresponding point refinement unit.

The corresponding point refinement unit 302 includes a histogram creating unit 307, a filter unit 308, a maximum frequency detecting unit 309, a coordinate allocating unit 310, and a corresponding point selecting unit 311, as shown in FIG. 18.

Figure 19:
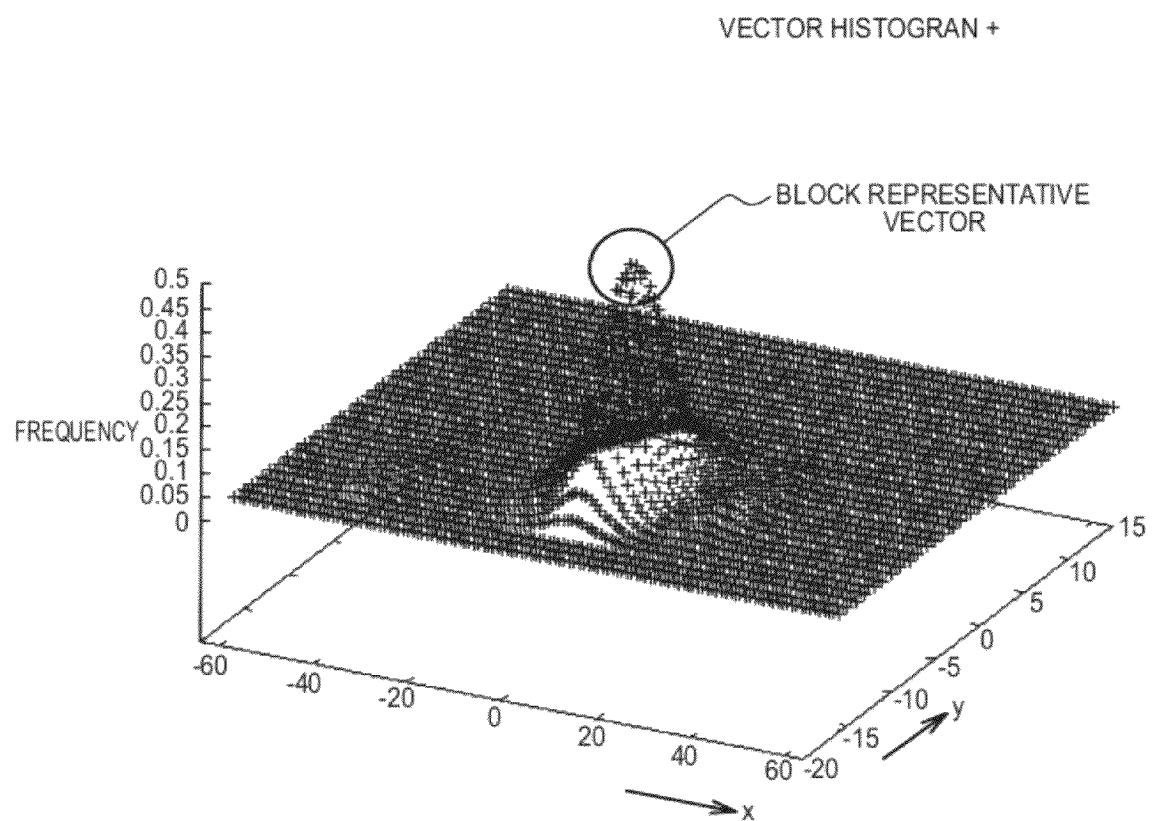
FIG. 19 is a histogram illustrating a frequency distribution of vectors in each block.

The histogram creating unit 307 creates a vector component histogram representing the frequency for each component of the feature quantity vector $VE_1$ for each pixel block $B_{L-2}$ on the basis of the feature quantity vector information. FIG. 19 shows an example of the vector component histogram. The x axis and the y axis represent the x component and the y component of the feature quantity vector $VE_1$, respectively, and the z axis represents the frequency for each component. When an object is drawn in the pixel block $B_{L-2}$, plural feature quantity vectors $VE_1$ having the same components are present in the part in which the object is drawn. Accordingly, in this case, the vector component histogram has a large peak. The histogram creating unit 307 creates vector component histogram information on the vector component histogram and outputs the created vector component histogram information to the filter unit 308.

The filter unit 308 smoothes the vector component histogram by applying a Gaussian filter to the vector component histogram information plural times. The filter unit 308 creates smoothed histogram information on the smoothed vector component histogram and outputs the created smoothed histogram information to the maximum frequency detecting unit 309 and the corresponding point selecting unit 311.

The maximum frequency detecting unit 309 specifies an x component and a y component having the maximum frequency from the vector component histograms on the basis of the smoothed histogram information. The maximum frequency detecting unit 309 sets the feature quantity vector $VE_1$ having the x component and y component as a representative vector $VE_2$ of the pixel block $B_{L-2}$ to which the feature quantity vector $VE_1$ belongs. Accordingly, the maximum frequency detecting unit 309 calculates the representative vector $VE_2$ for each pixel block $B_{L-2}$. The maximum frequency detecting unit 309 creates representative vector component information on the components of the representative vector $VE_2$ and outputs the created representative vector component information to the coordinate allocating unit 310.

Figure 20:
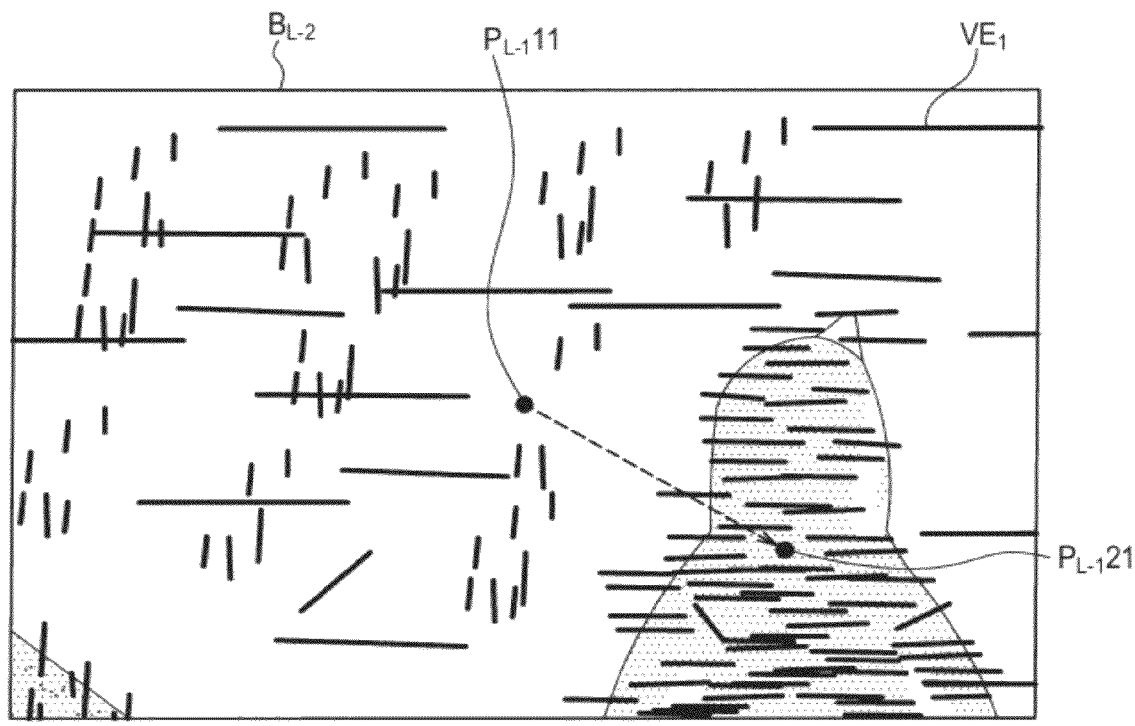
FIG. 20 is a diagram illustrating a situation of a mean shift process.
Figure 21:
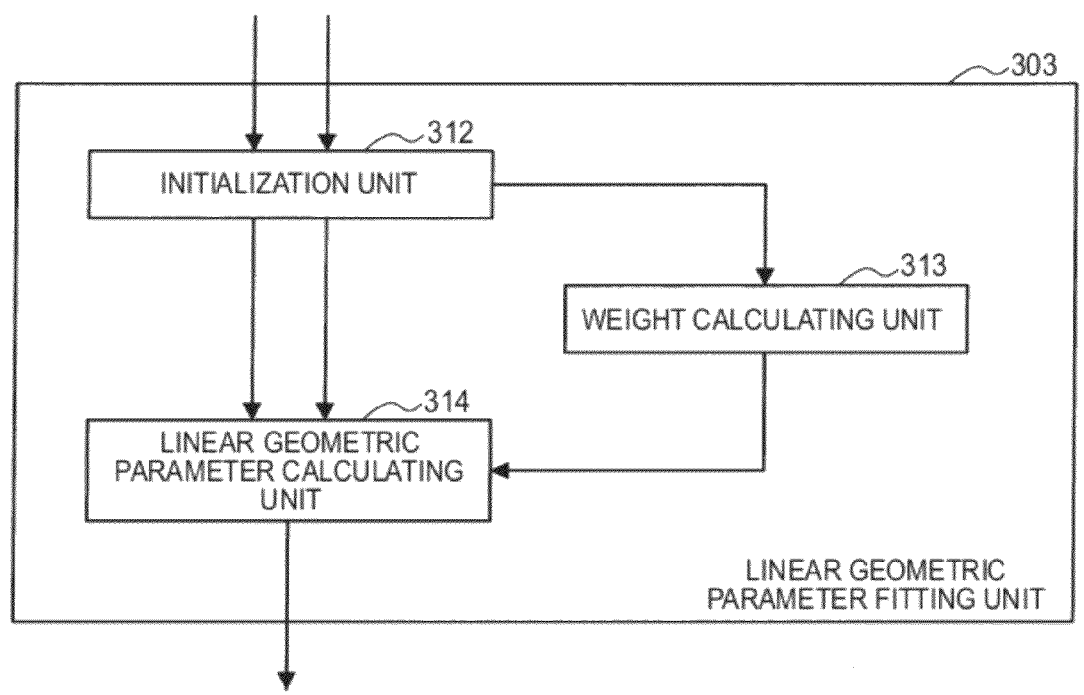
FIG. 21 is a block diagram illustrating the configuration of a linear geometric parameter fitting unit.

The coordinate allocating unit 310 determines the coordinates (the coordinates of the start points) of the representative vectors $VE_2$ on the basis of the representative vector component information. That is, the representative vector $VE_2$ is calculated from the vector component histogram, but the vector component histogram does not include the coordinate information of the respective feature quantity vectors $VE_1$. Accordingly, when the maximum frequency detecting unit 309 calculates the representative vector $VE_2$, the representative vector $VE_2$ does not include the coordinate information. Therefore, the coordinate allocating unit 310 determines the coordinate (the coordinate of the start point) of the respective representative vectors $VE_2$ on the basis of the representative vector information. Specifically, the coordinate allocating unit 310 repeatedly performs a mean shift process with the central point $P_{L-1}11$ of the pixel block $B_{L-2}$ as the initial value of the coordinate of the representative vector $VE_2$, as shown in FIG. 20. Here, the mean shift process is a process of calculating the average of the coordinate of the representative vector $VE_2$ and the coordinate of the feature quantity vector $VE_1$ having the same components as the representative vector VE$_2$ and setting the average as a new coordinate of the representative vector VE$_2$. Accordingly, by repeating the mean shift process, the coordinate of the representative vector VE$_2$ moves to an area in which the feature quantity vector VE$_1$ having the same components as the representative vector VE$_2$ are concentrated, that is, a concentrated area. The coordinate allocating unit 310 repeatedly performs the mean shift process (for example, 10 times) until the coordinate of the representative vector VE$_2$ converges. As a result, the coordinate allocating unit 310 determines the coordinate of the representative vector VE$_2$. At this time, the coordinate of the representative vector VE$_2$ is the central point P$_{L-1}$21 of the concentrated area. The coordinate allocating unit 310 creates representative vector information on the components and the coordinates of the representative vector VE$_2$ and outputs the representative vector information to the corresponding point selecting unit 311.

The corresponding point selecting unit 311 deletes (that is, cuts off weak contenders) the representative vectors of which the maximum frequency is less than a predetermined value (for example, 0.1 to 0.4) from the plural representative vectors VE$_2$ on the basis of the representative vector information and the smoothed histogram information. Accordingly, the corresponding point selecting unit 311 can exclude the representative vectors VE$_2$ having low reliability, for example, the representative vectors VE$_2$ calculated from the pixel blocks B$_{L-2}$ in which an object is not drawn. The corresponding point selecting unit 311 creates corresponding point selection information on the feature point pairs, that is, representative point pairs, constituting the selected representative vector VE$_2$ and outputs the created corresponding point selection information to the linear geometric parameter fitting unit 303. Hereinafter, out of the coordinate points of a representative point pair, the left coordinate point is also referred to as a left representative point and the right coordinate point is also referred to as a right representative point. The coordinate of the left representative point is the start point (u$_L$, v$_L$) of the representative vector and the coordinate of the right representative point is (u$_R$, v$_R$) obtained by adding the coordinate of the start point to the components of the representative vector.

In this way, the reason why the representative vector VE$_2$ is extracted from the feature quantity vector VE$_1$ is that the linear operation is weak to an outlier. That is, as described later, the linear geometric parameter fitting unit 303 calculates a transformation matrix F by performing the linear operation using the representative vector VE$_2$. The transformation matrix F is used to transform the coordinates of the color-calibrated images V$_{L-1}$ and V$_{R-1}$. On the other hand, the feature quantity vector VE$_1$ simply connects the feature points and thus the value (components) thereof is apt to be jagged (that is, uneven). Accordingly, when the linear operation using the feature quantity vector VE$_1$ is performed, the components of the transformation matrix F obtained through the linear operation is apt to be jagged. Therefore, in this embodiment, the representative vector VE$_2$ is extracted from the feature quantity vector VE$_1$.

[Configuration of Linear Geometric Parameter Fitting Unit]

The linear geometric parameter fitting unit 303 (the transformation matrix calculating unit) includes an initialization unit 312, a weight calculating unit 313, and a linear geometric parameter calculating unit 314.

The processes performed by the linear geometric parameter fitting unit 303 will be schematically described below. The linear geometric parameter fitting unit 303 calculates the transformation matrix F satisfying an epipolar restriction condition and a time axis restriction condition and calculates homography matrixes H$_L$ and H$_R$ by decomposing the transformation matrix F.

Here, the transformation matrix F is a 3×3 matrix and includes the homography matrixes HL and HR. The homography matrix HL is a matrix for transforming the coordinates the color-calibrated image V$_{L-1}$ and the homography matrix HR is a matrix for transforming the coordinates of the color-calibrated image V$_{R-1}$.

The epipolar restriction condition is a restriction that the left coordinate point approaches (preferably is multiplied by) the epipolar line obtained by transforming the right coordinate points with the transformation matrix F, in other words, a restriction that the inner product of an epipolar vector obtained by multiplying a vector u'(u$_R$, v$_R$, 1) by the transformation matrix F and a vector u(u$_L$, v$_L$, 1) is zero. Here, (u$_L$, v$_L$) represents the coordinate of the left coordinate points and (u$_R$, v$_R$) represents the coordinates of the right coordinate points.

The epipolar restriction condition is expressed by Expression (19).

$$u \cdot F \cdot u' = (u_L \quad v_L \quad 1) \cdot \begin{pmatrix} f_0 & f_1 & f_2 \\ f_3 & f_4 & f_5 \\ f_6 & f_7 & f_8 \end{pmatrix} \cdot \begin{pmatrix} u_R \\ v_R \\ 1 \end{pmatrix} = 0 \quad (19)$$

Here, f0 to f8 represent components of the transformation matrix F. The linear geometric parameter fitting unit 303 changes the epipolar restriction condition to a least-square problem expressed by Expression (20) by splitting Expression (19).

$$\text{minimize}(M \cdot F)^2 \quad (20)$$

Here, M represents an operational matrix and is expressed by Expression (21).

$$M = \begin{pmatrix} u_L u_R & v_L u_R & u_R & u_L v_R & v_L v_R & v_R & u_R & v_R & 1 \\ & & & \cdots & & & & & \\ u_L u_R & v_L u_R & u_R & u_L v_R & v_L v_R & v_R & u_R & v_R & 1 \end{pmatrix} \quad (21)$$

The coordinates of different representative point pairs are instituted into (u$_L$, v$_L$) and (u$_R$, v$_R$) of each column of the operational matrix M.

On the other hand, the time axis restriction condition is a restriction that the transformation matrix F$_n$ of the current frame is restricted to the transformation matrix F$_{n-1}$ of the previous frame, that is, a restriction that the correlation between the transformation matrix F$_n$ of the current frame and the transformation matrix F$_{n-1}$ of the previous frame is made to the maximum. Since the transformation matrix F is a unit vector, such an inner product serves as the correlation without any change.

Since the transformation matrix F calculated without using the time axis restriction condition often rattles in the time axis direction (the value varies depending on the start points), the rattle in the time axis direction of the transformation matrix F is reduced by calculating the transformation matrix F using the time axis restriction condition in this embodiment. Accordingly, the accuracy of the transformation matrix F is improved. The time axis restriction condition is expressed by Expression (22).

$$F_{n-1} \cdot F_n = 1 \quad (22)$$

Expression (22) of the time axis restriction condition can be replaced with a greatest-square problem expressed by Expression (23).

$$\text{maximize}(F_{n-1} \cdot F_n)^2 \qquad (23)$$

Therefore, the linear geometric parameter fitting unit 303 solves the mixed problem of the least-square problem expressed by Expression (20) and the greatest-square problem expressed by Expression (23), but cannot solve this mixed problem through the use of the linear operation.

On the other hand, if the inner product of the transformation matrix $F_n$ and the transformation matrix $F_{n-1}$ is 1, it means the same as the inner product of the transformation matrix $F_n$ and an orthogonal vector group $F'_{n-1}$ of the transformation matrix $F_{n-1}$ is 0. Accordingly, the greatest-square problem expressed by Expression (23) is replaced with the least-square problem expressed by Expression (24).

$$\text{minimize}(F'_{n-1} \cdot F_n)^2 \qquad (24)$$

Therefore, the epipolar restriction condition and the time axis restriction condition are ended to the least-square problem expressed by Expression (25).

$$\text{minimize}\begin{pmatrix} M \\ F'_{n-1} \end{pmatrix} \cdot F_n \Bigg)^2 \qquad (25)$$

However, since the transformation matrix $F_{n-1}$ has random values, it is not easy to directly calculate the orthogonal vector group $F'_{n-1}$ of the transformation matrix $F_{n-1}$.

On the other hand, the transformation matrix F is expressed as follows using the homography matrixes HL and HR.

$$F = HL \cdot F_0 \cdot HR \qquad (26)$$

Here, the matrix $F_0$ is a vector including only fixed values and is expressed by Expression (27).

$$F_0 = \begin{pmatrix} 0 & 0 & 0 \\ 0 & 0 & -1 \\ 0 & 1 & 0 \end{pmatrix} \qquad (27)$$

By multiplying the homography matrixes HL and HR in Expression (19) by the three-dimensional coordinates $(u_L, v_L, 1)$ and $(u_R, v_R, 1)$ of the representative point pairs, Expression (19) is transformed as follows.

$$(u'_L \; v'_L \; 1) \cdot F'_n \cdot \begin{pmatrix} u'_R \\ v'_R \\ 1 \end{pmatrix} = 0 \qquad (28)$$

Here, $(u'_L, v'_L, 1)$ and $(u'_R, v'_R, 1)$ are coordinates (transformation vectors) obtained by multiplying the three-dimensional coordinates $(u_L, v_L, 1)$ and $(u_R, v_R, 1)$ of the representative point pairs by the homography matrixes HL and HR (that is, transforming the coordinates with the homography matrixes HL and HR). Expression (25) can be rewritten as follows using Expression (28).

$$\text{minimize}\begin{pmatrix} M' \\ F'_0 \end{pmatrix} \cdot F'_n \Bigg)^2 \qquad (29)$$

Here, M' is a matrix obtained by changing the components of the operational matrix M to the values after the coordinate transformation and is expressed specifically by Expression (30).

$$M' = \begin{pmatrix} u'_L u'_R & v'_L u'_R & u'_R & u'_L v'_R & v'_L v'_R & v'_R & u'_R & v'_R & 1 \\ & & & \cdots & & & & & \\ u'_L u'_R & v'_L u'_R & u'_R & u'_L v'_R & v'_L v'_R & v'_R & u'_R & v'_R & 1 \end{pmatrix} \qquad (30)$$

The matrix $F'_0$ is an orthogonal vector group of the matrix $F_0$. Since the matrix $F_0$ is a matrix having nine components, eight orthogonal vectors of the matrix $F_0$ are present. Since the matrix $F_0$ has fixed values, the orthogonal vector group has fixed values. Therefore, the linear geometric parameter fitting unit 303 does not have to calculate the matrix $F'_0$. Specifically, the linear geometric parameter fitting unit 303 stores the matrix $F'_0$ in advance.

The linear geometric parameter fitting unit 303 does not use the time axis restriction condition without any change but uses the resultant obtained by multiplying the time axis restriction condition by a weight $w_e$. Expression (29) can be rewritten as follows using the weight $w_e$.

$$\text{minimize}\begin{pmatrix} M' \\ w_e \cdot F'_0 \end{pmatrix} \cdot F'_n \Bigg)^2 \qquad (31)$$

Accordingly, by solving the least-square problem of Expression (31), the linear geometric parameter fitting unit 303 calculates the matrix $F'_n$ (fixed-value corresponding vector) and also calculates the transformation matrix F. The linear geometric parameter fitting unit 303 calculates the homography matrixes HL and HR by the use of the transformation matrix F. The geometric disparity is reduced by transforming the left coordinate points of the color-calibrated image $V_{L-1}$ by the use of the homography matrix HL and transforming the right coordinate points of the color-calibrated image $V_{R-1}$ by the use of the homography matrixes HR. In this embodiment, the transformation matrix F satisfying the epipolar restriction condition and the time axis restriction condition is calculated in this way, but another restriction condition, for example, a restriction that the input images $V_L$ and $V_R$ are parallel to each other, may be added as the restriction condition. The configuration of the linear geometric parameter fitting unit 303 will be described below in detail.

[Configuration of Initialization Unit]

Figure 22:
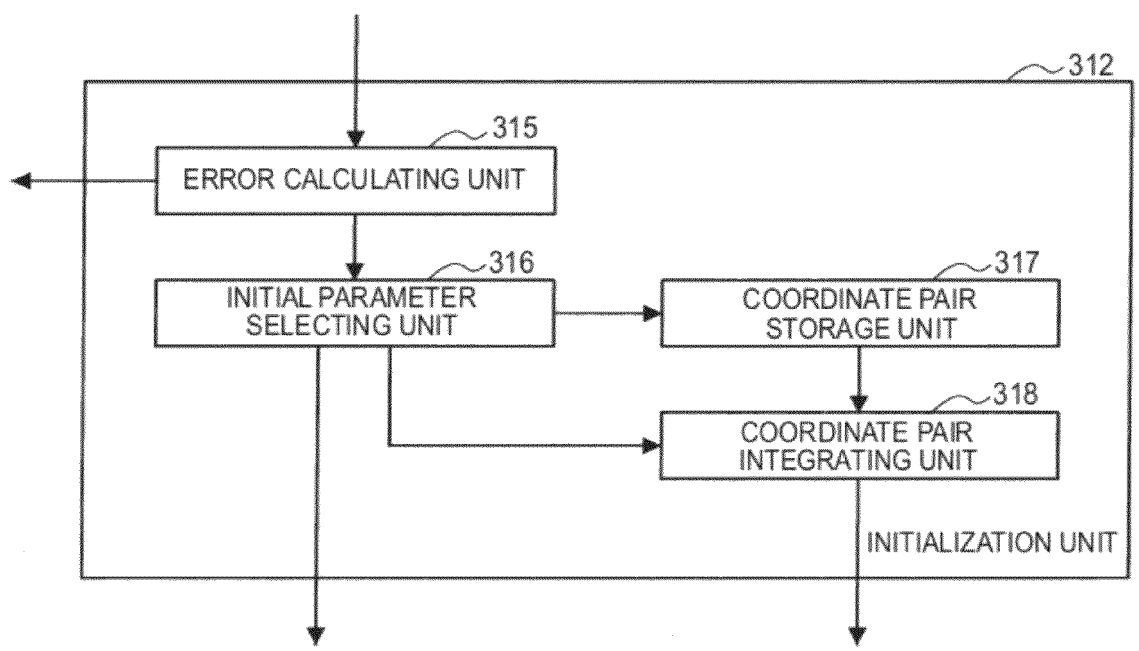
FIG. 22 is a block diagram illustrating the configuration of an initialization unit.

The initialization unit 312 includes an error calculating unit 315, an initial parameter selecting unit 316, a coordinate pair storage unit 317, and a coordinate pair integrating unit 318, as shown in FIG. 22.

The error calculating unit 315 calculates an error on the basis of the corresponding point selection information and parameter information supplied from the parameter selecting unit 305 to be described later. Here, the parameter information includes information on the homography matrixes $HL_{n-1}$ and $HR_{n-1}$ calculated in the previous frame.

Specifically, the error calculating unit 315 calculates error values e1 and e2 using Expressions (32) and (33).

$$e1 = \Sigma u \cdot HL_{n-1} \cdot F_0 \cdot HR_{n-1} \cdot u' \quad (32)$$

$$e2 = \Sigma u \cdot I \cdot F_0 \cdot I \cdot u' \quad (33)$$

Here, u and u' represent the three-dimensional coordinates of the representative point pair, that is, $(u_L, v_L, 1)$ and $(u_R, v_R, 1)$, and I represents a unit matrix. $\Sigma$ represents the summation of the values with respect to all the representative point pairs.

Expressions (32) and (33) correspond to Expression (19) of the epipolar restriction condition in which the homography matrixes HL and HR of the transformation matrix F are replaced with the homography matrixes $HL_{n-1}$ and $HR_{n-1}$ of the previous frame or the unit matrix I.

Therefore, as the error values e1 and e2 becomes smaller, the accuracy of the homography matrixes $HL_{n-1}$ and $HR_{n-1}$ and the unit matrix I as the homography matrixes HL and HR becomes better.

In general, when the same scene is continuous, the error value e1 is smaller than the error value e2. When a scene is changed, the error value e2 is smaller than the error value e1.

The error calculating unit 315 creates error value information on the calculated error values e1 and e2 and outputs the created error value information to the initial parameter selecting unit 316 along with the corresponding point selection information. The error calculating unit 315 selects the smaller of the error values and creates minimum error value information on the selected error value. The error calculating unit 315 outputs the minimum error value information and the corresponding point selection information to the weight calculating unit 313.

The initial parameter selecting unit 316 determines which of the homography matrixes $HL_{n-1}$ and $HR_{n-1}$ of the previous frame and the unit matrix I to use as the initial parameter on the basis of the error value information. Specifically, the initial parameter selecting unit 316 sets the matrix having the smaller error value as the homography matrix of the initial parameter.

The initial parameter selecting unit 316 creates initial parameter information on the selected initial parameter and outputs the created initial parameter information to the linear geometric parameter calculating unit 314. The initial parameter selecting unit 316 outputs the corresponding point selection information to the coordinate pair storage unit 317 and the coordinate pair integrating unit 318. The initial parameter selecting unit 316 outputs reset information to the coordinate pair storage unit 317 when the unit matrix is selected as the initial parameter.

The coordinate pair storage unit 317 stores the corresponding point selection information supplied from the initial parameter selecting unit 316 and outputs the corresponding point selection information corresponding to the previous four frames out of the stored corresponding point selection information to the coordinate pair integrating unit 318. The coordinate pair storage unit 317 deletes the corresponding point selection information when the reset information is supplied from the initial parameter selecting unit 316. When the reset information is supplied from the initial parameter selecting unit 316, there is high possibility to change a scene and it is thus preferable that the corresponding point selection information of the previous frame should not be used.

The coordinate pair integrating unit 318 integrates the corresponding point selection information supplied from the initial parameter selecting unit 316 and the coordinate pair storage unit 317. Accordingly, the coordinate pair integrating unit 318 integrates the corresponding point selection information corresponding to five frames at most. The coordinate pair integrating unit 318 outputs the integrated corresponding point selection information to the weight calculating unit 313 and the linear geometric parameter calculating unit 314.

[Configuration of Weight Calculating Unit]

The weight calculating unit 313 calculates the weight indicating to what extent to consider the time axis restriction condition, that is, the weight $w_e$ of the time axis restriction condition, when calculating the transformation matrix F on the basis of the minimum error value information and the corresponding point selection information supplied from the error calculating unit 315.

Specifically, the weight calculating unit 313 determines a first weight $w_{e1}$ as the weight $w_e$ of the time axis restriction condition when the error value (the initial value error in a frame), the number of representative vectors $VE_2$ (the number of samples), and the variance of the representative vectors $VE_2$ are in the range (first range) of 0.0 to 3.0, determines a second weight $w_{e2}$ as the weight $w_e$ when the error value, the number of representative vectors $VE_2$, and the variance of the representative vectors $VE_2$ are in the range (second range) of 3.0 to 16.0, and determines a third weight $w_{e3}$ as the weight $w_e$ when the error value, the number of representative vectors $VE_2$, and the variance of the representative vectors $VE_2$ are in the range (third range) equal to or greater than 16.0. The magnitudes of the weights satisfy $w_{e1} > w_{e3} > w_{e2}$. The value of the first weight $w_{e1}$ is, for example, in the range of 10.0 to 1.0, the value of the second weight $w_{e2}$ is, for example, in the range of 1.0 to 0.1, and the value of the third weight $w_{e3}$ is, for example, in the range of 0.1 to 0.01.

Figure 23:
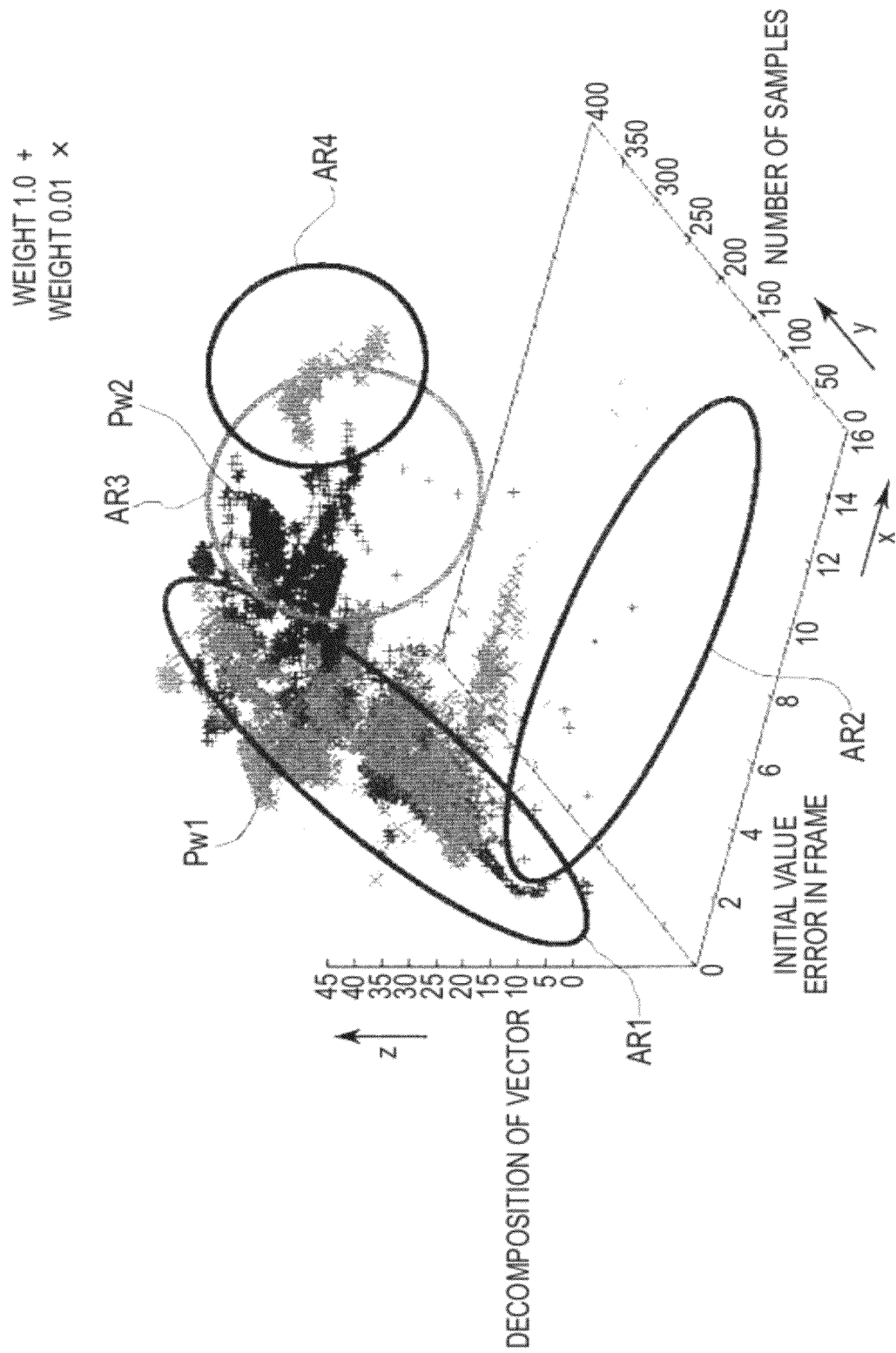
FIG. 23 is a graph used to determine a weight indicating how temporal restriction should be applied to an F-matrix.

The reason for this determination will be described with reference to FIG. 23. FIG. 23 is a graph illustrating the correspondence among the error value, the number of representative vectors $VE_2$, the variance of the representative vectors $VE_2$, the weight of the time axis restriction condition, and the accuracy of the calculated transformation matrix F. That is, points in the graph represent the correspondence among the error value, the number of representative vectors $VE_2$, and the variance of the representative vectors $VE_2$. These points are represented by a point $P_{w1}$ when the accuracy of the transformation matrix F is better with a larger weight (for example, 1), and is represented by a point $P_{w2}$ when the accuracy of the transformation matrix F is better with a smaller weight (for example, 0.01).

In FIG. 23, the weight suitable for calculating the transformation matrix F varies depending on the error value, the number of representative vectors $VE_2$, and the variance of the representative vectors $VE_2$. The points $P_{w1}$ are distributed in areas AR1 and AR2 and the points $P_{w2}$ are distributed in an area AR3. The points $P_{w1}$ are also distributed in an area AR4 away from the areas AR1 and AR2, which is due to lens deformation (blow-fish).

The areas AR1 and AR2 represent the above-mentioned first range and the area AR3 represents the above-mentioned second range. Therefore, the weight calculating unit 313 determines the first weight $w_{e1}$, which is the largest, the weight $w_e$ of the time axis restriction condition when the error value, the number of representative vectors $VE_2$, and the variance of the representative vectors $VE_2$ belong to the area AR1 or AR2, that is, the first range. The weight calculating unit 313 determines the second weight $w_{e2}$, which is the smallest, as the weight $w_e$ of the time axis restriction condition when the error value, the number of representative vectors $VE_2$, and the variance of the representative vectors $VE_2$ belong to the area AR3, that is, the second range. For example, the points included in the area AR1 indicate that the representative points of the current frame are geometrically corrected with high accuracy by the use of the small error values, that is, the homography matrixes $HL_{n-1}$ and $HR_{n-1}$ of the previous frame. Therefore, when the error value, the number of representative vectors $VE_2$, and the variance of the representative vectors $VE_2$ belong to the area AR1, it can be said that the transformation matrix $F_n$ of the current frame approaches the transformation matrix $F_{n-1}$ of the previous frame (that is, the transformation matrix F converges). On the other hand, the points included in the area AR3 indicate that the accuracy is poor even when the feature points of the current frame is geometrically corrected by the use of the large error values, that is, the homography matrixes $HL_{n-1}$ and $HR_{n-1}$ of the previous frame. Therefore, when the error value, the number of representative vectors $VE_2$, and the variance of the representative vectors $VE_2$ belong to the area AR3, it can be said that the transformation matrix $F_n$ of the current frame does not approach the transformation matrix $F_{n-1}$ of the previous frame (that is, the transformation matrix F does not converge).

On the other hand, when the error value, the number of representative vectors $VE_2$, and the variance of the representative vectors $VE_2$ belong to the area AR4, the lens deformation occurs and thus it is considered that the weight $w_e$ of the time axis restriction condition is preferably set to be different from the first weight $w_{e1}$ and the second weight $w_{e2}$. Therefore, when the error value, the number of representative vectors $VE_2$, and the variance of the representative vectors $VE_2$ belong to the area AR4, that is, the third range, the weight calculating unit 313 determines the third weight $w_{e3}$ between the first weight $w_{e1}$ and the second weight $w_{e2}$ as the weight $w_e$ of the time axis restriction condition.

The weight calculating unit 313 creates time axis restriction weight information on the determined weight $w_e$ of the time axis restriction condition and outputs the created time axis restriction weight information to the linear geometric parameter calculating unit 314.

[Configuration of Linear Geometric Parameter Calculating Unit]

Figure 24:
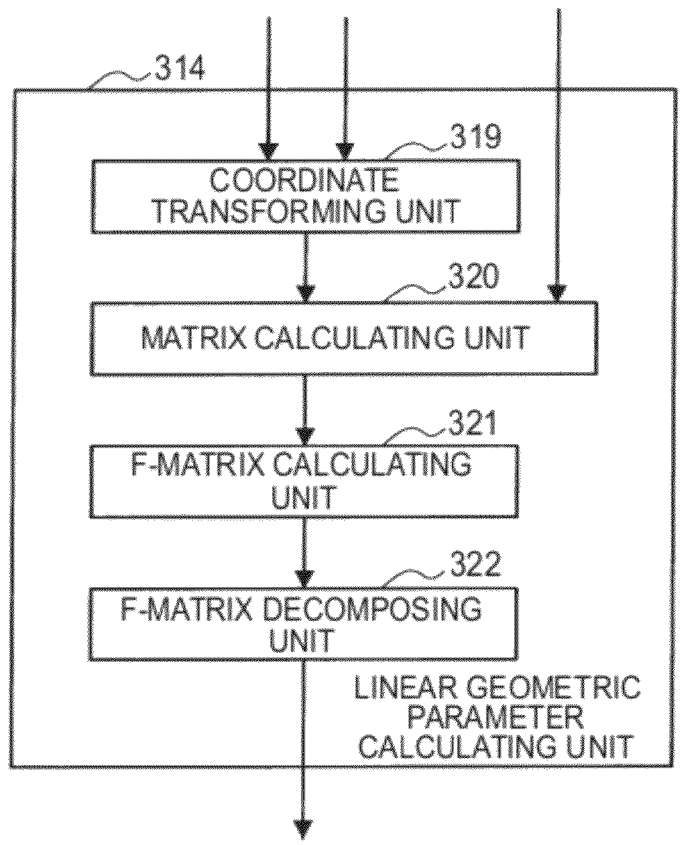
FIG. 24 is a block diagram illustrating the configuration of a linear geometric parameter calculating unit.

The linear geometric parameter calculating unit 314 includes a coordinate transforming unit 319, a matrix calculating unit 320, an F-matrix calculating unit 321, and an F-matrix decomposing unit 322, as shown in FIG. 24.

The coordinate transforming unit 319 transforms the coordinates of the representative point pairs on the basis of the information supplied from the initialization unit 315. Specifically, the coordinate transforming unit 319 transforms the coordinates of the left representative points by the use of the initial parameter, that is, the homography matrixes $HL_{n-1}$ of the previous frame or the unit matrix I, and transforms the coordinates of the right representative points by the use of the initial parameter, that is, the homography matrixes $HR_{n-1}$ of the previous frame or the unit matrix I. The unit matrix I is not actually transformed in coordinates.

The central points and the coordinate ranges of the color-calibrated images $V_{L-1}$ and $V_{R-1}$ may vary by this coordinate transformation. Accordingly, the coordinate transforming unit 319 normalizes the coordinates of the representative point pairs and the initial parameters after the coordinate transformation. Specifically, for example, the coordinate transforming unit 319 multiplies the three-dimensional coordinates of the representative point pairs and the initial parameters by a transformation matrix for normalization. Hereinafter, the normalized three-dimensional coordinates are also referred to as normalized coordinates and the normalized initial parameters are also referred to as normalized homography matrixes WL and WR.

The coordinate transforming unit 319 creates coordinate transformation information on the normalized coordinates of the representative point pairs and the normalized homography matrixes WL and WR and outputs the created coordinate transformation information to the matrix calculating unit 320.

The matrix calculating unit 320 calculates an operation matrix $M_2$ expressed by Expression (34) on the basis of the coordinate transformation information.

$$M_2 = \sum \frac{(u'_L u'_R \ v'_L u'_R \ u'_R \ u'_L v'_R \ v'_L v'_R \ v'_R \ u'_L \ v'_L \ 1)^T \cdot}{(u'_L u'_R \ v'_L u'_R \ u'_R \ u'_L v'_R \ v'_L v'_R \ v'_R \ u'_L \ v'_L \ 1) + w_e \cdot C^T \cdot C} \quad (34)$$

$$M_2 = \Sigma(u'_L u'_R v'_L u'_R u'_R u'_L v'_R v'_L v'_R v'_R u'_L v'_L 1)^T \cdot (u'_L u'_R v'_L u'_R u'_R u'_L v'_R v'_L v'_R v'_R u'_L v'_L 1) + w_0 \cdot C^T \cdot C \quad (34)$$

Here, $\Sigma$ means the summation with respect to all the representative point pairs, and the matrix C is obtained by synthesizing the above-mentioned orthogonal vector group $F'_0$ and is expressed by Expression (35).

$$C = \begin{pmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & \sqrt{2} & 0 & -\sqrt{2} & 0 \\ 0 & 0 & 0 & 0 & 0 & 0 & 1 & 0 & 0 \\ 0 & 0 & 0 & 0 & 0 & 0 & 0 & 0 & 1 \end{pmatrix} \quad (35)$$

The matrix calculating unit 320 creates operational matrix information on the calculated operational matrix $M_2$ and outputs the created operational matrix information to the F-matrix calculating unit 321.

The F-matrix calculating unit 321 calculates the minimum eigenvector $v_{min}$ of the operational matrix $M_2$. The method of calculating the minimum eigenvector $v_{min}$ is not particularly limited, but, for example, singular value decomposition is preferably used.

The F-matrix calculating unit 321 singularly decomposes the minimum eigenvector $v_{min}$ into 3×3 matrixes so that the minimum singular value of the minimum eigenvector $v_{min}$ falls in 0. The F-matrix calculating unit 321 calculates the transformation matrix F on the basis of the calculated matrix $SVD(V_{min})$ and Expression (36).

$$F = WL \cdot SVD(v_{min}) \cdot WR \quad (36)$$

The F-matrix calculating unit 321 calculates the transformation matrix F by swinging the value of the weight $w_e$ to several values such as $2^2 \times w_e$, $2 \times w_e$, $2^{-1} \times w_e$, and $2^{-2} \times w_e$. The F-matrix calculating unit 321 calculates the error values of the calculated transformation matrixes F using Expression (32). The F-matrix calculating unit 321 selects the smallest error value, creates transformation matrix information on the selected transformation matrix F, and outputs the created transformation matrix information to the F-matrix decomposing unit 322 along with the coordinate transformation information.

The F-matrix decomposing unit 322 decomposes the transformation matrix F into the homography matrixes HL and HR and the matrix $F_0$ on the basis of the transformation matrix information. In practice, the F-matrix decomposing unit 322 calculates matrixes causing the epipolar lines to be parallel as the homography matrixes HL and HR.

Specifically, the F-matrix decomposing unit 322 calculates the coordinate of an epipolar point by performing epipolar calculation. The epipolar point is an intersection of the epipolar lines. When it is assumed that a light beam incident on an imaging device is concentrated on one point, the straight lines obtained by projecting the light beam onto the color-calibrated images $V_{L-1}$ and $V_{R-1}$, that is, the epipolar lines, intersect each other at the epipolar point. The epipolar point is in any epipolar line and thus the inner product with respect to any epipolar line is 0.

Therefore, the F-matrix decomposing unit 322 calculates the coordinate of the epipolar point at which the square of the inner product of the epipolar lines and the coordinate of the epipolar point is the minimum. Specifically, the F-matrix decomposing unit 322 calculates the square of the transformation matrix F. Then, the F-matrix decomposing unit 322 sets the minimum eigenvector of the calculated matrix as the coordinate of the epipolar point. Since the epipolar point is present in each of the color-calibrated images $V_{L-1}$ and $V_{R-1}$, the coordinates of the epipolar points are calculated. That is, the F-matrix decomposing unit 322 calculates the minimum eigenvector e1 of the matrix FL expressed by Expression (37) and sets the calculated minimum eigenvector as the coordinate of the epipolar point, that is, the left epipolar point, in the color-calibrated image $V_{L-1}$.

$$FL = F \cdot t \cdot F \tag{37}$$

Here, t represents a transpose.

Similarly, the F-matrix decomposing unit 322 calculates the minimum eigenvector eR of the matrix FR expressed by Expression (38) and sets the calculated minimum eigenvector as the coordinate of the epipolar point, that is, the right epipolar point, in the color-calibrated image $V_{R-1}$.

$$FR = t \cdot F \cdot F \tag{38}$$

The F-matrix decomposing unit 322 calculates a matrix for shifting the left epipolar point to infinity (that is, causing the epipolar lines in the color-calibrated image $V_{L-1}$ to be parallel to each other) as the homograph matrix HL, and calculates a matrix for shifting the right epipolar point to infinity (that is, causing the epipolar lines in the color-calibrated image $V_{R-1}$ to be parallel to each other) as the homograph matrix HR.

Specifically, the F-matrix decomposing unit 322 calculates a projection component matrix Hp of the homography matrixes HL and HR using Expressions (39) and (40).

$$Hp = \begin{pmatrix} 1 & 0 & 0 \\ 0 & 1 & 0 \\ a & 0 & 1 \end{pmatrix} \tag{39}$$

$$a = -e(2)/e(0) \tag{40}$$

Here, e(2) represents the epipolar x coordinate and e(0) represents the epipolar z coordinate.

The F-matrix decomposing unit 322 calculates a rotation component matrix Hr of the homography matrixes HL and HR using calc Rotation Of Rectify of Rectification. cpp and calculates a distortion (translation) component matrix Hsh of the homography matrixes HL and HR using calc Shearing Of Rectify of Rectification. cpp. The F-matrix decomposing unit 322 calculates a vertical scale component matrix Hs of the homography matrixes HL and HR on the basis of Expressions (41) and (42).

$$Hs = \begin{pmatrix} 1 & 0 & 0 \\ 0 & s & 0 \\ 0 & 0 & 1 \end{pmatrix} \tag{41}$$

$$s = Vertical\_Torerance/(Average\_Error + \sigma) \tag{42}$$

Here, "Vertical_Torerance" represents the amount of horizontal translational movement, "Average_Error" represents the difference average of the movement, and σ represents the standard deviation.

The F-matrix decomposing unit 322 calculates the homography matrix HL by crossing the projection component matrix Hp, the rotation component matrix Hr, the distortion component matrix Hsh, and the vertical scale component matrix Hs of the homography matrix HL.

Similarly, the F-matrix decomposing unit 322 calculates the homography matrix HR by crossing the projection component matrix Hp, the rotation component matrix Hr, the distortion component matrix Hsh, and the vertical scale component matrix Hs of the homography matrix HR.

The F-matrix decomposing unit 322 creates linear correction coefficient information on the calculated homography matrixes HL and HR and outputs the created linear correction coefficient information to the nonlinear geometric parameter fitting unit 304 and the parameter selecting unit 305.

[Configuration of Nonlinear Geometric Parameter Fitting Unit]

Figure 25:
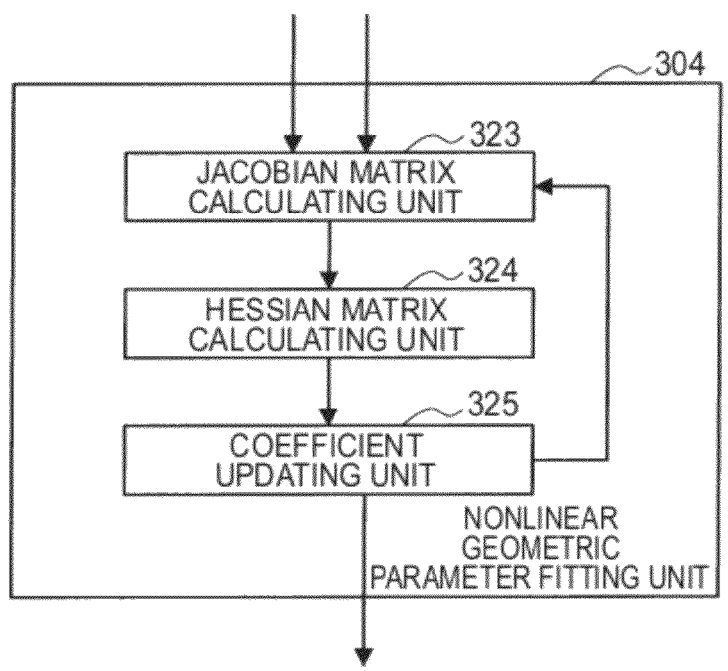
FIG. 25 is a block diagram illustrating the configuration of a nonlinear geometric parameter fitting unit.

The nonlinear geometric parameter fitting unit 304 includes a Jacobian matrix calculating unit 323, a Hessian matrix calculating unit 324, and a coefficient updating unit 325, as show in FIG. 25.

The Jacobian matrix calculating unit 323 calculates the Jacobian matrix $J_2$ expressed by Expression (43) on the basis of the feature quantity vector information supplied from the feature quantity matching unit 301 and the linear correction coefficient information supplied from the linear geometric parameter fitting unit 303.

$$\begin{aligned} J_2 &= f_{e2}(u, u', coef(F)) \cdot d_{coef} f_{e2}(u, u', coef(F)) \\ &= f_{e2}(u, u', coef(F)) \cdot \begin{pmatrix} \partial f_{e20}/\partial f_0 & \partial f_{e20}/\partial f_1 & \cdots & \partial f_{e20}/\partial f_8 \\ \cdots & \cdots & \cdots & \cdots \\ \partial f_{e2m}/\partial f_0 & \partial f_{e2m}/\partial f_1 & \cdots & \partial f_{e2m}/\partial f_8 \end{pmatrix} \end{aligned} \tag{43}$$

Here, u is a vector representing the three-dimensional coordinates of the left feature points, u' is a vector representing the three-dimensional coordinates of the right feature points, and coef(F) represents the components of the transformation matrix F. $f_{e2}(u, u', coef(F))$ is a so-called error function and is expressed by Expression (44). $f_{e20}$ to $f_{e2m}$ are obtained by substituting different feature quantity vector information into the error functions $f_{e2}(u, u', coef(F))$.

$$f_{e2}(u,u',coef(F)) = RobustFunc(g_2(u,coef(F)) - g_2(u', coef(F))) \tag{44}$$

Here, $g_2(u, coef(F))$ is a value obtained by multiplying the three-dimensional coordinates of the left feature points by the transformation matrix F and $g_2(u', coef(F))$ is a value obtained by multiplying the three-dimensional coordinates of the right feature points by the transformation matrix F.

RobustFunc represents a function expressed by Expression (16).

The Jacobian matrix calculating unit 323 creates Jacobian matrix information on the calculated Jacobian matrix $J_2$ and outputs the created Jacobian matrix information to the Hessian matrix calculating unit 324.

When the nonlinear correction coefficient information is supplied from the coefficient updating unit 325 to be described later, the Jacobian matrix calculating unit 323 calculates the Jacobian matrix $J_2$ on the basis of the nonlinear correction coefficient coef(nonlinear) indicated by the nonlinear correction coefficient information and the feature quantity vector information. The Jacobian matrix calculating unit 323 creates Jacobian matrix information on the calculated Jacobian matrix $J_2$ and outputs the created Jacobian matrix information to the Hessian matrix calculating unit 324.

The Hessian matrix calculating unit 324 calculate the Hessian matrix $H_2$ expressed by Expression (45) on the basis of the information supplied from the Jacobian matrix calculating unit 323.

$$H_2 = d_{coef} f_{e2}(u,u',\text{coef}(F)) \cdot d_{coef} f_{e2}(u,u',\text{coef}(F)) \quad (45)$$

Then, the Hessian matrix calculating unit 324 creates Hessian matrix information on the calculated Hessian matrix $H_2$ and outputs the created Hessian matrix information to the coefficient updating unit 325 along with the information supplied from the Jacobian matrix calculating unit 323.

The coefficient updating unit 325 calculates the components of the transformation matrix F as the nonlinear correction coefficients coef(nonlinear) on the basis of the information supplied from the Hessian matrix calculating unit 324 and Expression (46).

$$\text{coef(nonlinear)} = (H_2 + w_f I)^{-1} \cdot J_2 + \text{coef}(F) \quad (46)$$

Here, I represent the unit matrix and $w_f$ represents a coefficient (weight), for example, which is 0.1.

The coefficient updating unit 325 calculates the homography matrixes HL and HR by decomposing the nonlinear correction coefficients coef(nonlinear) through the use of the same process as performed by the F-matrix decomposing unit 322. The coefficient updating unit 325 creates nonlinear correction coefficient information on the calculated homography matrixes HL and HR. The coefficient updating unit 325 determines whether the homography matrixes HL and HR converge on a constant value, outputs the nonlinear correction coefficient information to the parameter selecting unit 306 when it is determined that the homography matrixes HL and HR converge on the constant value, and outputs the nonlinear correction coefficient information to the Jacobian matrix calculating unit 323 when it is determined that the homography matrixes HL and HR do not converge. Thereafter, the homography matrixes HL and HR are calculated again. Accordingly, the nonlinear geometric parameter fitting unit 304 calculates the homography matrixes HL and HR with the homography matrixes HL and HR calculated by the linear geometric parameter fitting unit 303 as the initial values through the use of a nonlinear operation method, and repeatedly performs the nonlinear operation until the homography matrixes HL and HR converge on a constant value.

[Configuration of Parameter Selecting Unit]

The parameter selecting unit 305 shown in FIG. 16 calculates the error values of the linear correction coefficient information supplied from the linear geometric parameter fitting unit 303 and the nonlinear correction coefficient information supplied from the nonlinear geometric parameter fitting unit 304 using Expression (32) for each group of pixel blocks $B_{L-2}$ and $B_{R-2}$. The parameter selecting unit 305 selects the information having the smaller error value as the parameter information. The parameter selecting unit 305 selects the parameter information for each group of pixel blocks $B_{L-2}$ and $B_{R-2}$ and outputs the parameter information to the geometric calibration executing unit 306 and the linear geometric parameter fitting unit 303.

[Configuration of Geometric Calibration Executing Unit]

The geometric calibration executing unit 306 performs the geometric calibration on the color-calibrated images $V_{L-1}$ and $V_{R-1}$ on the basis of the parameter information. Specifically, the geometric calibration executing unit 306 transforms the coordinates of the coordinate points of the color-calibrated image $V_{L-1}$ by the use of the homography matrix HL and transforms the coordinates of the coordinate points of the color-calibrated image $V_{R-1}$ by the use of the homography matrix HR. The geometric calibration executing unit 306 outputs the geometrically-calibrated images as the color-calibrated images $V_{L-2}$ and $V_{R-2}$ to the parallax detecting unit 4 shown in FIG. 5.

Figure 26A:
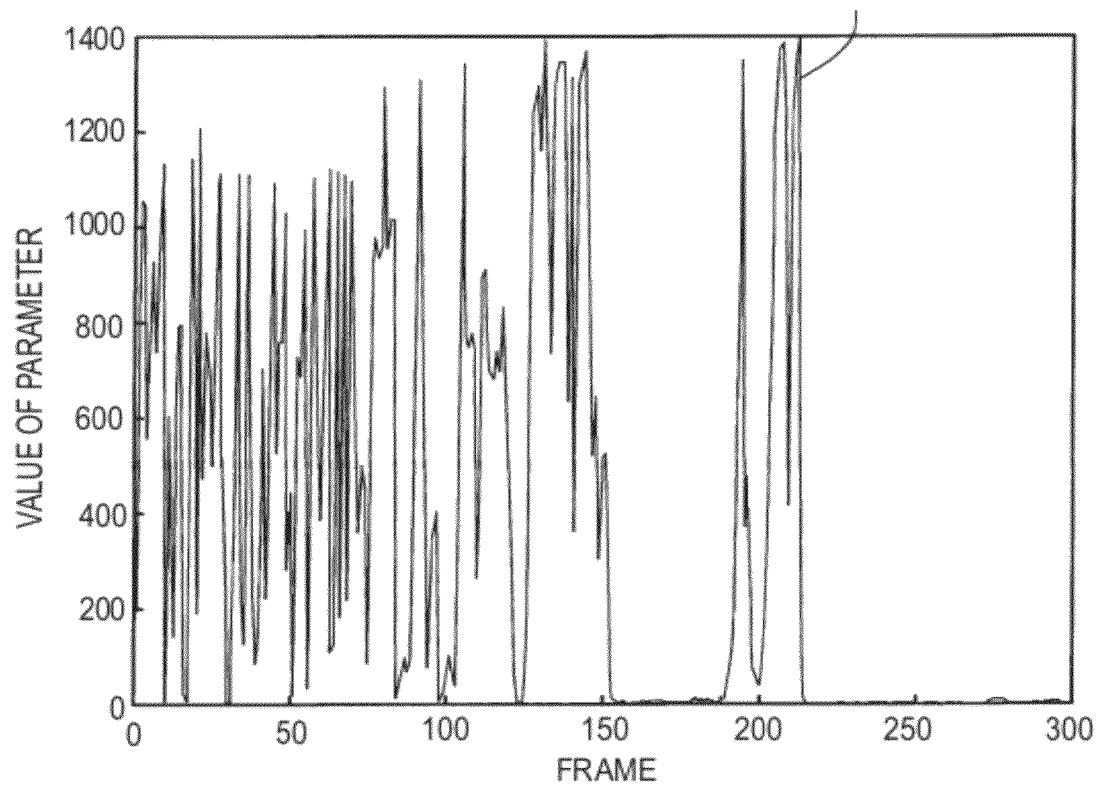
FIGS. 26A and 26B are graphs illustrating situations where a parameter of an F-matrix not temporally restricted and a parameter of an F-matrix temporally restricted vary with the lapse of time.
Figure 26B:
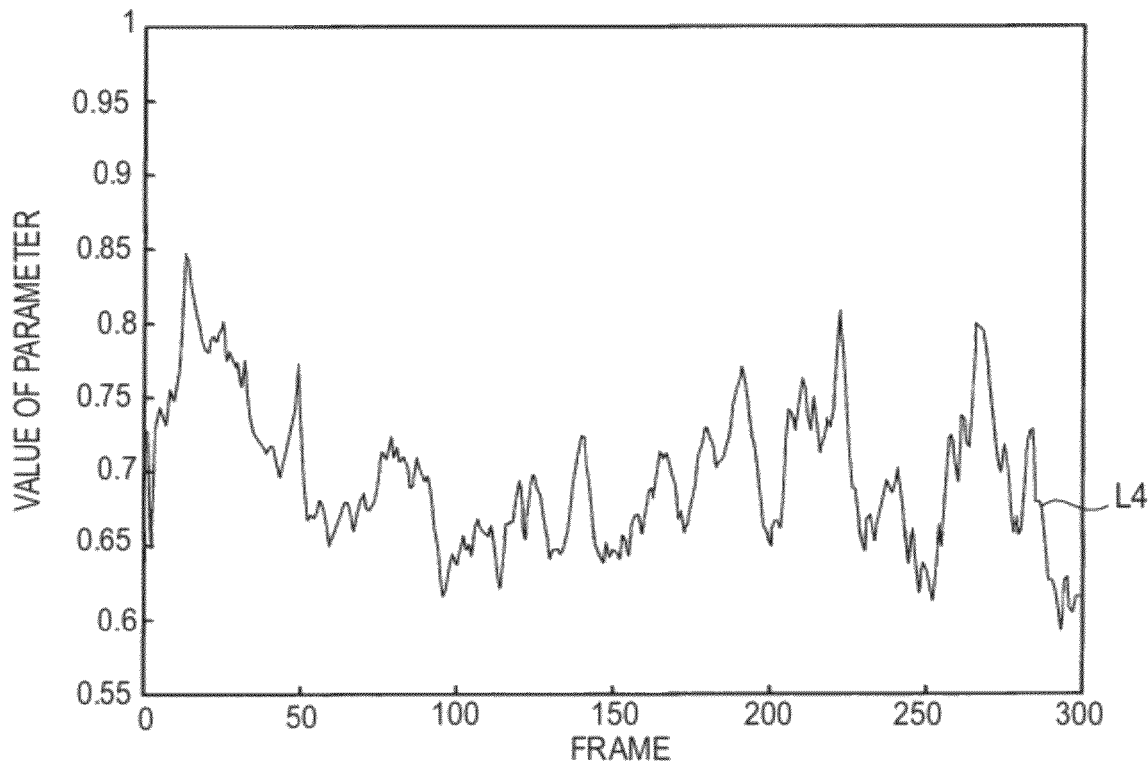

FIGS. 26A and 26B show a situation where the jag of the transformation matrix F is reduced using the time axis restriction condition. The curve L3 shown in FIG. 26A represents the variation in component of the transformation matrix F calculated without using the time axis restriction condition and the curve L4 shown in FIG. 26B represents the variation in component of the transformation matrix F calculated using the time axis restriction condition. As shown in FIGS. 26A and 26B, the transformation matrix F calculated using the time axis restriction condition is greatly reduced in the jagged value.

Figure 27:
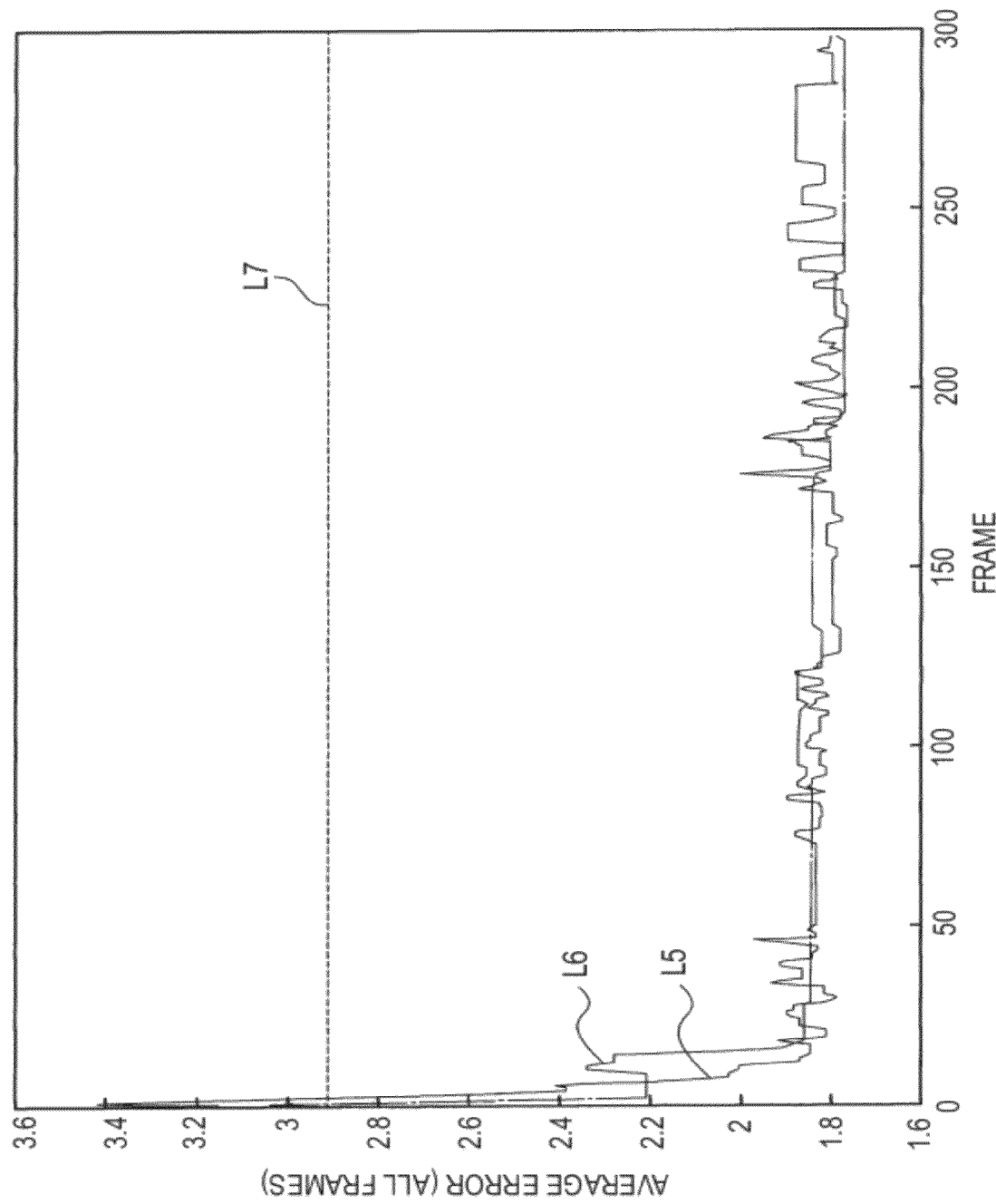
FIG. 27 is a graph illustrating a situation where an F-matrix converges with the lapse of time.

FIG. 27 shows a situation where the transformation matrix F converges with the lapse of time. The curves L5 and L6 represent the situations where the error value of Expression (32) converges with the lapse of time. The curve L5 shows the case where the transformation matrix F is calculated using the corresponding point selection information corresponding to a frame and the curve L6 shows the case where the transformation matrix F is calculated using the corresponding point selection information corresponding to five frames. The curve L7 represents the error value of Expression (33). As shown in FIG. 27, the transformation matrix F greatly converges with the lapse of time. It can be said that the transformation matrix F calculated using the corresponding point selection information corresponding to five frames converges more greatly than the transformation matrix F calculated using the corresponding point selection information corresponding to a frame and the error value thereof is more stabilized.

[Advantages Due to Geometric Calibration Unit]

The advantages due to the geometric calibration unit 3 will be described below.

Since the geometric calibration unit 3 calculates the transformation matrix F and performs the geometric calibration (geometric correction) on the basis of the transformation matrix F, it is possible to perform the geometric calibration without an existing pattern (existing model). The transformation matrix F satisfies the epipolar restriction condition and can thus be applied to more various images than the existing pattern. Since the geometric calibration unit 3 solves the epipolar restriction condition using Expression (19), it is possible to calculate the transformation matrix F with high accuracy.

Since the geometric calibration unit 3 calculates the transformation matrix F satisfying the time axis restriction condition in addition to the epipolar restriction condition, it is possible to calculate the transformation matrix F which has high accuracy and which is robust in the time axis direction (which has high temporal robustness). Accordingly, the geometric calibration unit 3 can perform the geometric calibration robust with the time. The inventor of the present disclosure studied a nonlinear estimation method such as RANSAC estimation and M estimation (for example, referring to the details of the estimation methods to Mahamud and Hebert 2000, "Iterative projective reconstruction from multiple views", and Hartley and Zisserman 2000, "Multiple view geometry in computer vision") as the geometric calibration method. As a result, it was proved in the RANSAC estimation that the parameters of the transformation matrix F is apt to be jagged (uneven) in the time axis direction. In the M estimation, it was proved that the processing load of the image processing device is very heavy. On the contrary, the transformation matrix F calculated in this embodiment is not apt to be jagged in the time axis direction and the processing load is also lighter.

Since the geometric calibration unit 3 restricts the correlation with the transformation matrix F calculated in the previous frame to the time axis restriction, it is possible to calculate the transformation matrix F with high accuracy and to perform the geometric calibration with high accuracy.

Since the geometric calibration unit 3 changes the greatest-square problem that the correlation with the transformation matrix $F_{n-1}$ calculated in the previous frame is maximized to the least-square problem that the correlation with the orthogonal vector group $F'_{n-1}$ of the transformation matrix $F_{n-1}$ calculated in the previous frame, it is possible to solve the epipolar restriction condition and the time axis restriction condition as a single least-square problem.

Since the geometric calibration unit 3 weights the time axis restriction and changes the weight we of the time axis restriction depending on the situations of the representative point pairs (the number of samples and the like), it is possible to calculate the transformation matrix F with high accuracy and to bring forward the convergence of the transformation matrix F.

Since the geometric calibration unit 3 swings the weight $w_e$ of the time axis restriction to some values, calculates the transformation matrix F using the weights we, and selects the transformation matrix F having the smallest error value, it is possible to calculate the transformation matrix F with high accuracy.

Since the geometric calibration unit 3 sets the feature point pair having a high frequency out of the feature point pairs as the representative point pair and calculates the transformation matrix F on the basis of the representative point pair, it is possible to calculate the transformation matrix F with high accuracy.

Since the geometric calibration unit 3 calculates the coordinates of the representative vectors $VE_2$ through the use of the mean shift process, it is possible to calculate the coordinates of the representative vectors $VE_2$ with high accuracy.

Since the geometric calibration unit 3 transforms the coordinates of the left representative points and the right representative points by the use of the initial parameters such as the homography matrixes $HL_{n-1}$ and $HR_{n-1}$ before calculating the transformation matrix $F_n$, it is possible to easily calculate the transformation matrix F. Specifically, the geometric calibration unit 3 can transform the orthogonal vector group $F'_{n-1}$ to fixed values.

Since the geometric calibration unit 3 performs the nonlinear operation with the transformation matrix F calculated through the linear operation as the initial value, it is possible to calculate the transformation matrix F with high accuracy.

Since the geometric calibration unit 3 calculates the error values of the transformation matrix F calculated through the linear operation and the transformation matrix F calculated through the nonlinear operation and performs the geometric calibration using the transformation matrix F having the smaller error value, it is possible to perform the geometric calibration with high accuracy.

[First Modification of Linear Geometric Parameter Fitting Unit]

Figure 28:
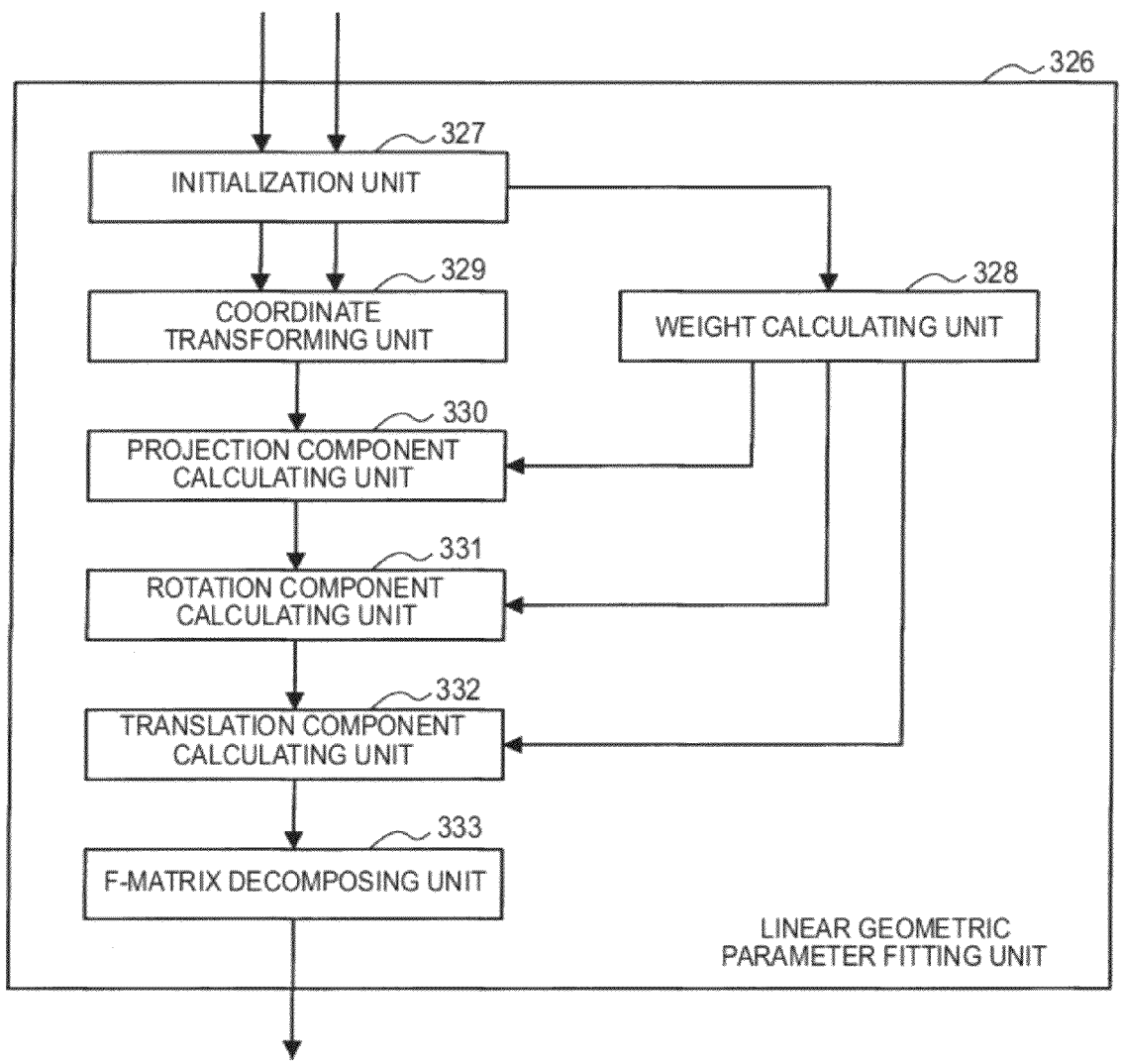
FIG. 28 is a block diagram illustrating another example of the linear geometric parameter fitting unit.

A first modification of the linear geometric parameter fitting unit will be described below. As shown in FIG. 28, the linear geometric parameter fitting unit 326 includes an initialization unit 327, a weight calculating unit 328, a coordinate transforming unit 329, a projection component calculating unit 330, a rotation component calculating unit 331, a translation component calculating unit 332, and an F-matrix decomposing unit 333. The linear geometric parameter fitting unit 326 is different from the linear geometric parameter fitting unit 303, in that the transformation matrix F is calculated for each component, that is, for each of the projection component, the rotation component, and the translation component and the other calculated components is considered to calculate the respective components.

The initialization unit 327, the weight calculating unit 328, and the coordinate transforming unit 329 perform the same processes as the initialization unit 312, the weight calculating unit 313, and the coordinate transforming unit 319. However, the weight calculating unit 328 outputs the time axis restriction weight information to the projection component calculating unit 330, the rotation component calculating unit 331, and the translation component calculating unit 332.

Figure 29:
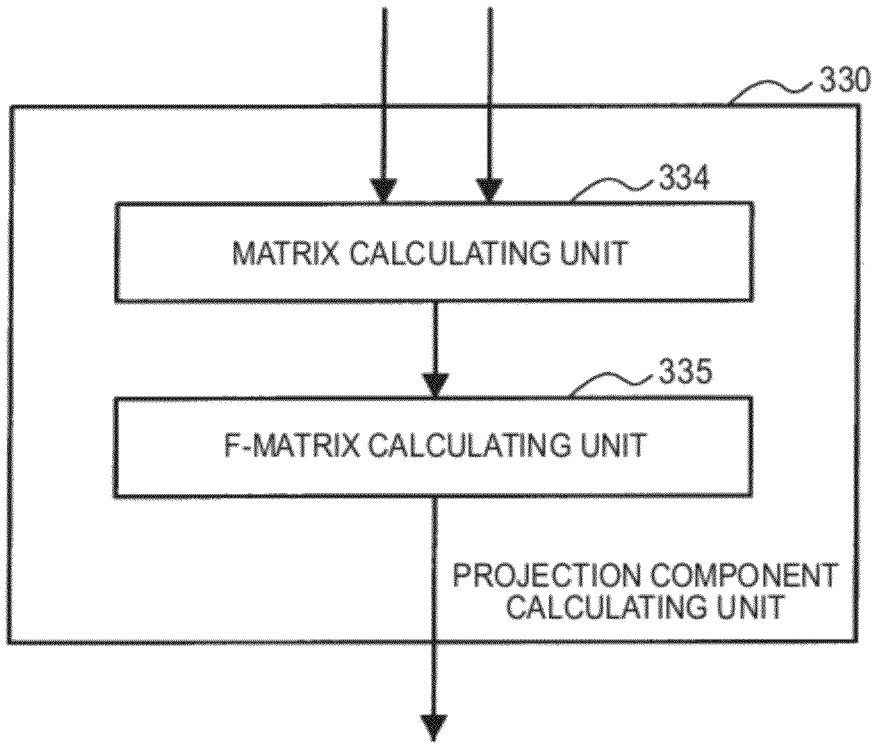
FIG. 29 is a block diagram illustrating the configuration of a projection component calculating unit.

As shown in FIG. 29, the projection component calculating unit 330 includes a matrix calculating unit 334 and an F-matrix calculating unit 335. The matrix calculating unit 334 performs the same process as the matrix calculating unit 320. However, the matrix calculating unit 334 calculates an operational matrix $M_3$ expressed by Expression (47).

$$M_3 = \Sigma (v'_L u'_R u'_L v'_R v'_L v'_R v'_R v'_L)^T \cdot (v'_L u'_R u'_L v'_R v'_L v'_R v'_R v'_L) + w_e C_1^T \cdot C_1 \quad (47)$$

Here, $\Sigma$ means the summation with respect to all the representative point pairs, and the matrix $C_1$ is obtained by synthesizing a part of the above-mentioned orthogonal vector group $F'_0$ and is expressed by Expression (48).

$$C_1 = \begin{pmatrix} 1 & 0 & 0 & 0 & 0 \\ 0 & 1 & 0 & 0 & 0 \\ 0 & 0 & 1 & 0 & 0 \\ 0 & 0 & 0 & \sqrt{2} & -\sqrt{2} \end{pmatrix} \quad (48)$$

The matrix calculating unit 334 creates operational matrix information on the calculated operational matrix $M_3$ and outputs the created operational matrix information to the F-matrix calculating unit 335.

The F-matrix calculating unit 335 performs the same process as the F-matrix calculating unit 321 on the basis of the operational matrix information. Accordingly, a projection component transformation matrix $F_p$ expressed by Expression (49) is calculated.

$$F_P = \begin{pmatrix} 1 & 0 & 0 \\ 0 & 1 & 0 \\ Pj1 & Pj2 & 1 \end{pmatrix}^T \cdot \begin{pmatrix} 0 & 0 & 0 \\ 0 & 0 & -1 \\ 0 & 1 & 0 \end{pmatrix} \cdot \begin{pmatrix} 1 & 0 & 0 \\ 0 & 1 & 0 \\ Pj3 & Pj4 & 1 \end{pmatrix} = \begin{pmatrix} 0 & Pj1 & 0 \\ -Pj3 & Pj5 & -1 \\ 0 & 1 & 0 \end{pmatrix} \quad (49)$$

Here, Pj1 to Pj5 represent an arbitrary numerical value. The F-matrix calculating unit 335 creates projection component transformation matrix information on the projection component transformation matrix Fp and outputs the created projection component transformation matrix information to the rotation component calculating unit 331 along with the coordinate transformation information.

Figure 30:
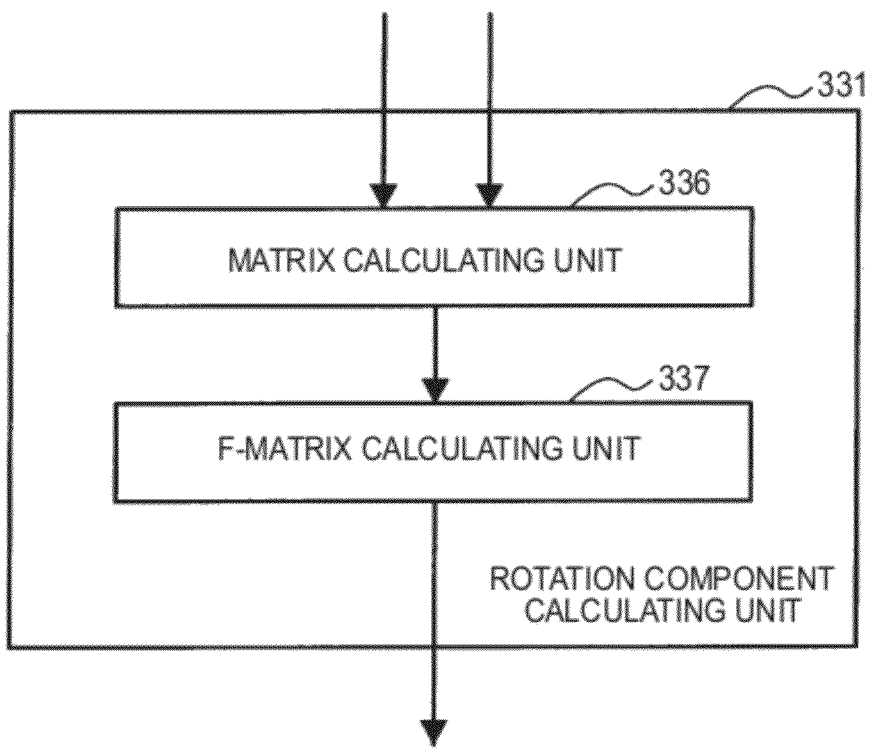
FIG. 30 is a block diagram illustrating the configuration of a rotation component calculating unit.

The rotation component calculating unit 331 includes a matrix calculating unit 336 and an F-matrix calculating unit 336, as shown in FIG. 30. The matrix calculating unit 336 performs the same process as the matrix calculating unit 320. However, the matrix calculating unit 336 calculates an operational matrix $M_4$ expressed by Expression (50).

$$M_4 = \Sigma (u'_R v'_R u'_R v'_L)^T \cdot (u'_R v'_R u'_R v'L) + w_e(C_2^T \cdot C_2 + F_P^T \cdot F_P) \qquad (50)$$

Here, $\Sigma$ means the summation with respect to all the representative point pairs, and the matrix $C_2$ is obtained by synthesizing the above-mentioned orthogonal vector group $F'_0$ and is expressed by Expression (51).

$$C_2 = \begin{pmatrix} 1 & 0 & 0 & 0 \\ 0 & 1 & 0 & 0 \\ 0 & 0 & \sqrt{2} & -\sqrt{2} \end{pmatrix} \qquad (51)$$

The matrix calculating unit 336 creates operational matrix information on the calculated operational matrix $M_4$ and outputs the created operational matrix information to the F-matrix calculating unit 337. As shown in Expression (50), the operational matrix $M_4$ includes the projection component transforming matrix $F_P$. That is, the operation matrix $M_4$ considers the projection component transforming matrix $F_P$.

The F-matrix calculating unit 337 performs the same process as the F-matrix calculating unit 321 on the basis of the operational matrix information. Accordingly, a rotation component transformation matrix $F_R$ expressed by Expression (52) calculates. Here, since the operational matrix $M_4$ includes the projection component transformation matrix $F_P$, the F-matrix calculating unit 337 can calculate the transformation matrix $F_R$ restricted to the projection component transformation matrix $F_P$.

$$F_R = \begin{pmatrix} Rot1 & Rot2 & 0 \\ -Rot2 & Rot1 & 0 \\ 0 & 0 & 1 \end{pmatrix}^T \cdot \begin{pmatrix} 0 & 0 & 0 \\ 0 & 0 & -1 \\ 0 & 1 & 0 \end{pmatrix} \cdot \begin{pmatrix} Rot3 & Rot4 & 0 \\ -Rot4 & Rot3 & 0 \\ 0 & 0 & 1 \end{pmatrix} = \begin{pmatrix} 0 & 0 & Rot2 \\ 0 & 0 & -Rot1 \\ -Rot4 & Rot3 & 0 \end{pmatrix} \qquad (52)$$

Here, Rot1 to Rot4 represent an arbitrary numerical value. The F-matrix calculating unit 337 creates rotation component transformation matrix information on the rotation component transformation matrix $F_R$ and outputs the rotation component transformation matrix information to the translation component calculating unit 332 along with the coordinate transformation information.

Figure 31:
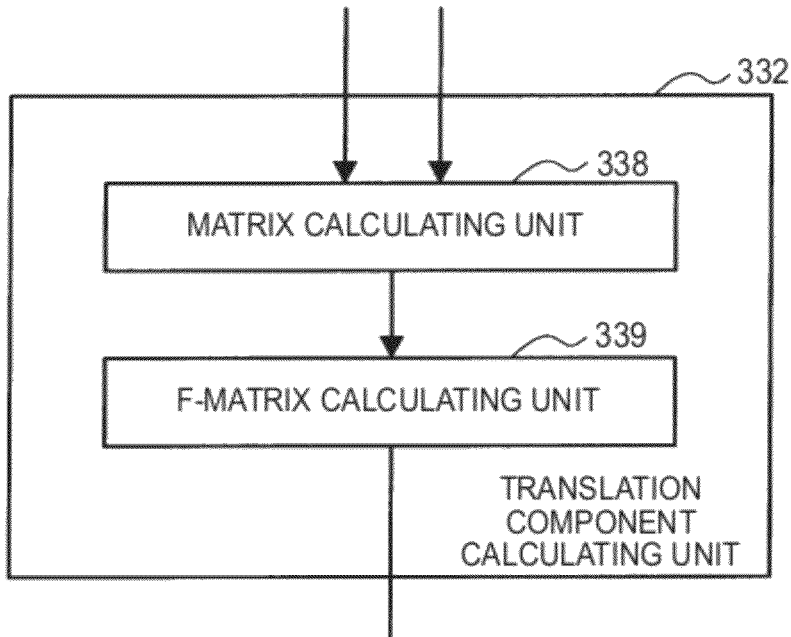
FIG. 31 is a block diagram illustrating the configuration of a translation component calculating unit.

The translation component calculating unit 332 includes a matrix calculating unit 338 and an F-matrix calculating unit 339, as shown in FIG. 31. The matrix calculating unit 338 performs the same process as the matrix calculating unit 320. However, the matrix calculating unit 338 calculates an operational matrix $M_5$ expressed by Expression (53).

$$M_5 = \Sigma (v'_R v'_R 1)^T \cdot (v'_R v'_R 1) + w_e(C_3^T \cdot C_3 + F_R^T \cdot F_R) \qquad (53)$$

Here, $\Sigma$ means the summation with respect to all the representative point pairs, and the matrix $C_3$ is obtained by synthesizing a part of the above-mentioned orthogonal vector group $F'_0$ and is expressed by Expression (54).

$$C_3 = \begin{pmatrix} \sqrt{2} & -\sqrt{2} & 0 \\ 0 & 0 & 1 \end{pmatrix} \qquad (54)$$

The matrix calculating unit 336 creates operational matrix information on the calculated operational matrix $M_5$ and outputs the created operational matrix information to the F-matrix calculating unit 339. As shown in Expression (53), the operational matrix $M_5$ includes the rotation component transforming matrix $F_R$. That is, the operation matrix $M_5$ considers the rotation component transforming matrix $F_R$. Since the transformation matrix $F_R$ is restricted to the projection component transformation matrix $F_P$, the operational matrix $M_5$ substantially considers the projection component transformation matrix $F_P$.

The F-matrix calculating unit 339 performs the same process as the F-matrix calculating unit 321 on the basis of the operational matrix information. Accordingly, a translation component transformation matrix $F_{Sh}$ expressed by Expression (55). Here, since the operational matrix $M_5$ includes the projection component transformation matrix $F_P$ and the rotation component matrix $F_R$, the F-matrix calculating unit 339 can calculate the transformation matrix $F_{Sh}$ restricted to the projection component transformation matrix $F_P$ and the rotation component transformation matrix $F_R$.

$$F_{Sh} = \begin{pmatrix} 1 & 0 & v1 \\ 0 & 1 & v2 \\ 0 & 0 & 1 \end{pmatrix}^T \cdot \begin{pmatrix} 0 & 0 & 0 \\ 0 & 0 & -1 \\ 0 & 1 & 0 \end{pmatrix} \cdot \begin{pmatrix} 1 & 0 & v3 \\ 0 & 1 & v4 \\ 0 & 0 & 1 \end{pmatrix} = \begin{pmatrix} 0 & 0 & 0 \\ 0 & 0 & -1 \\ 0 & 1 & v4-v2 \end{pmatrix} \qquad (55)$$

Here, v1 to v4 represent an arbitrary numerical values. The F-matrix calculating unit 339 calculates the transformation matrix F by crossing the transformation matrixes $F_P$, $F_R$, and $F_{Sh}$ of the projection component, the rotation component, and the translation component. The F-matrix calculating unit 339 creates the transformation matrix information on the calculated transformation matrix F and outputs the created transformation matrix information to the F-matrix decomposing unit 322 along with the coordinate transformation information.

The F-matrix decomposing unit 333 shown in FIG. 28 performs the same process as the F-matrix decomposing unit 322.

Since the linear geometric parameter fitting unit 326 according to this modification calculates the transformation matrix F for each component, it is possible to calculate the transformation matrix F with high robustness and high accuracy. Since the linear geometric parameter fitting unit 326 considers the previously-calculated component (uses as a restriction condition) to calculate the components, it is also possible to calculate the transformation matrix F with high accuracy.

[Second Modification of Linear Geometric Parameter Fitting Unit]

Figure 32:
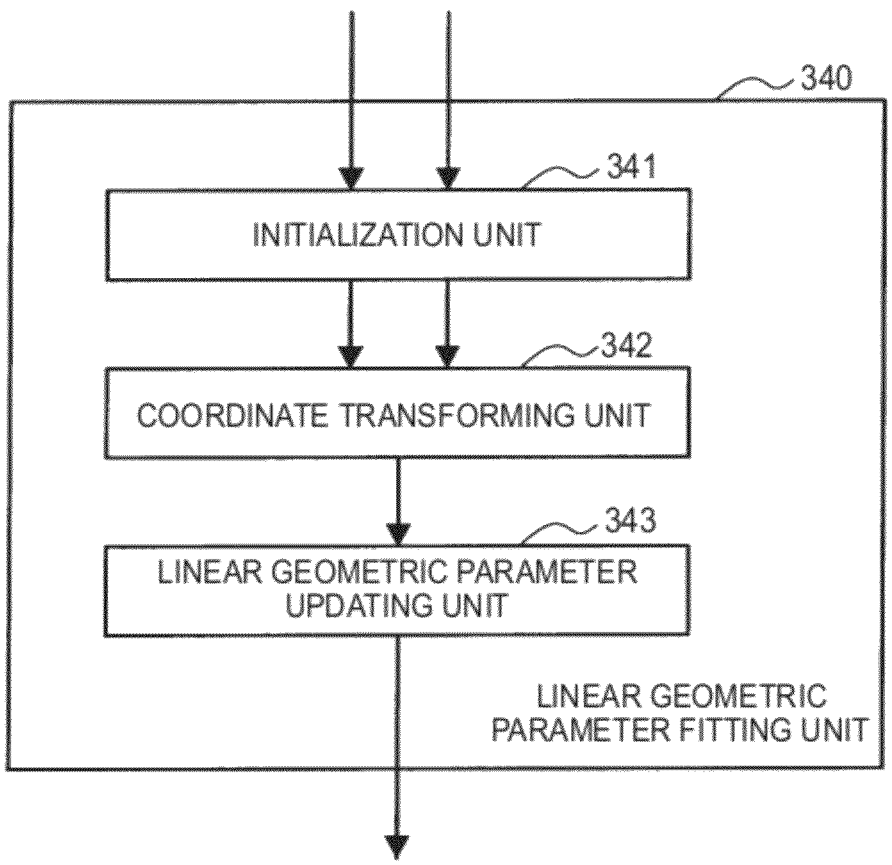
FIG. 32 is a block diagram illustrating another example of the linear geometric parameter fitting unit.

A second modification of the linear geometric parameter fitting unit will be described below. As shown in FIG. 32, the linear geometric parameter fitting unit 340 according to the second modification includes an initialization unit 341, a coordinate transforming unit 342, and a linear geometric parameter updating unit 343. The linear geometric parameter fitting unit 340 is different from the linear geometric parameter fitting unit 303, in that the course of calculating the transformation matrix F is simplified.

The initialization unit 341 and the coordinate transforming unit 342 perform the same processes as the initialization unit 312 and the coordinate transforming unit 319.

The linear geometric parameter updating unit 343 stores a translation component updating table, a rotation component updating table, and a projection component updating table.

Figure 33:
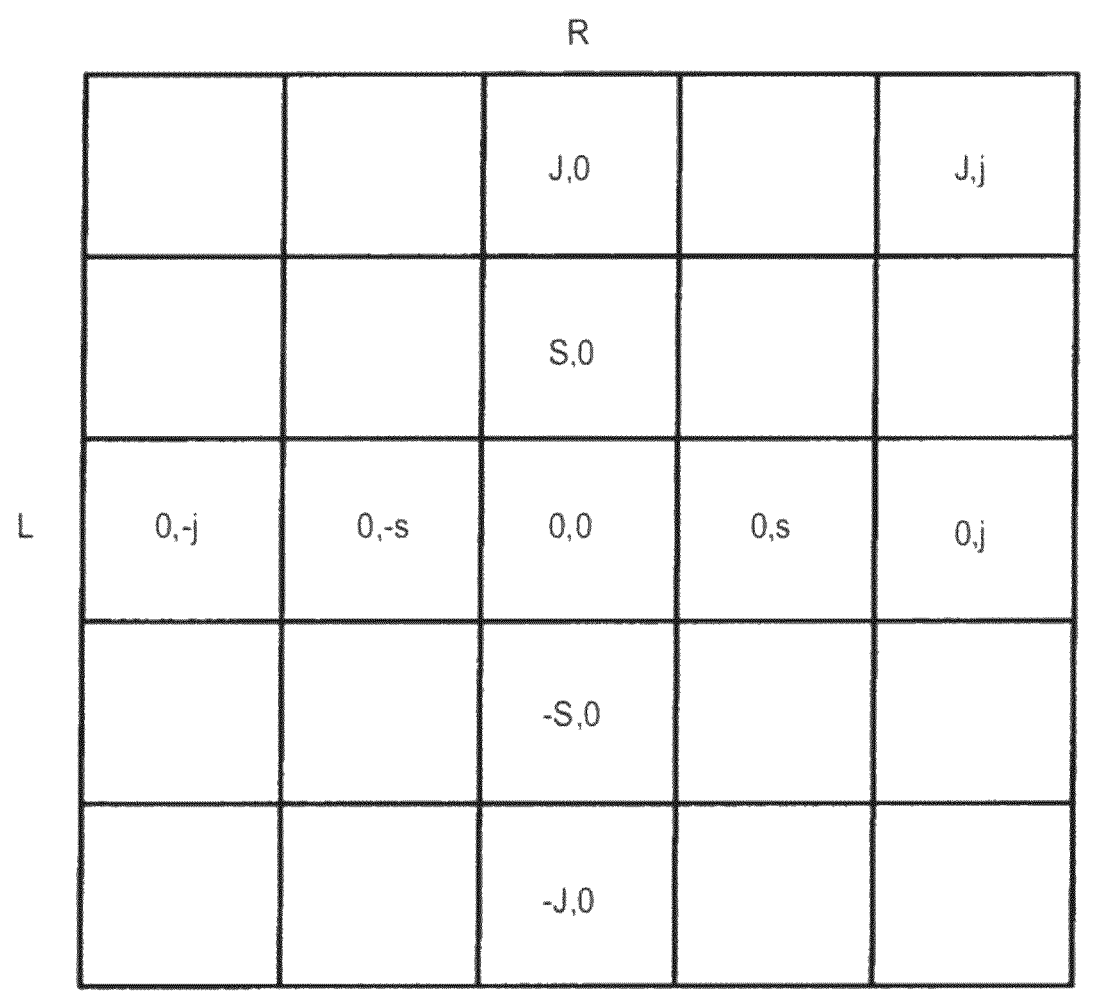

The translation component updating table stores the values of −5 to +5 by 0.5. The rotation component updating table and the projection component updating table have a 5×5 matrix shape, as shown in FIG. 33. The respective blocks of the rotation component updating table and the projection component updating table store a parameter combination (Ta, Tb) necessary for transforming the color-calibrated images $V_{L-1}$ and $V_{R-1}$. Here, Ta is 0, S, or J and Tb is 0, s, or j. "s" and "S" represent a value (notch) round 0 and "j" and "J" represent a value (jump) apart from 0. That is, the different between "s" or "S" and "j" or "J" is greater than different between 0 and "s" or "S".

Specifically, in the rotation component updating table, Ta represents the rotation angle of the color-calibrated image $V_{L-1}$ and Tb represents the rotation angle of the color-calibrated image $V_{R-1}$. That is, "S" represents that, for example, the color-calibrated image $V_{L-1}$ is rotated in the clockwise direction by 0.01 degree and "J" represents that, for example, the color-calibrated image $V_{L-1}$ is rotated in the clockwise direction by 0.1 degree. "-" means the counterclockwise direction.

Similarly, "s" represents that, for example, the color-calibrated image $V_{R-1}$ is rotated in the clockwise direction by 0.01 degree and "j" represents that, for example, the color-calibrated image $V_{R-1}$ is rotated in the clockwise direction by 0.1 degree. "-" means the counterclockwise direction.

On the other hand, in the projection component updating table, Ta represents the magnitude of projection transformation of the color-calibrated image $V_{L-1}$ and Tb represents the magnitude of projection transformation of the color-calibrated image $V_{R-1}$. That is, "S" represents a combination of Pj1 and Pj2 in Expression (49) or a value corresponding thereto and "J" represents a combination of Pj1 and Pj2 in Expression (49) or a value corresponding thereto. The values of Pj1 and Pj2 represented by "J" are larger than the values of Pj1 and Pj2 represented by "S".

Similarly, "s" represents a combination of Pj3 and Pj4 in Expression (49) or a value corresponding thereto and "j" represents a combination of Pj3 and Pj4 in Expression (49) or a value corresponding thereto. The values of Pj3 and Pj4 represented by "j" are larger than the values of Pj3 and Pj4 represented by "s".

When it is intended to store all the values which can be taken by the respective components of the homography matrixes HL and HR, that is, the translation component, the rotation component, and the projection component thereof in the tables, the capacities of the tables are exploded. Therefore, in this embodiment, the capacity of the respective tables is restricted as described above. The capacities are only an example and the tables may have different capacities.

The linear geometric parameter updating unit 343 calculates homography updating matrixes DL and DR expressed by Expressions (56) and (57) with respect to all the combinations of the values of the translation component updating table, the values of the rotation component updating table, and the values of the projection component updating table.

$$DL = \text{Homography}(v_L, r_L, p_L) = \begin{pmatrix} 1 & 0 & 0 \\ 0 & 1 & v_L \\ 0 & 0 & 1 \end{pmatrix} \cdot \begin{pmatrix} Rot1 & Rot2 & 0 \\ -Rot2 & Rot1 & 0 \\ 0 & 0 & 1 \end{pmatrix} \cdot \begin{pmatrix} 1 & 0 & 0 \\ 0 & 1 & 0 \\ Pj1 & Pj2 & 1 \end{pmatrix} \quad (56)$$

$$DL = \text{Homography}(v_R, r_R, p_R) = \begin{pmatrix} 1 & 0 & 0 \\ 0 & 1 & v_R \\ 0 & 0 & 1 \end{pmatrix} \cdot \begin{pmatrix} Rot3 & Rot4 & 0 \\ -Rot4 & Rot3 & 0 \\ 0 & 0 & 1 \end{pmatrix} \cdot \begin{pmatrix} 1 & 0 & 0 \\ 0 & 1 & 0 \\ Pj3 & Pj4 & 1 \end{pmatrix} \quad (57)$$

Here, $v_L$ and $v_R$ represent the values stored in the translation component updating table. $r_L$ represent Ta of the rotation component updating table and $v_R$ represents Tb of the rotation component updating table. $p_L$ represents Ta of the projection component updating table and $p_R$ represents Tb of the projection component updating table.

The linear geometric parameter updating unit 343 updates the homography matrixes HL and HR on the basis of Expressions (58) and (59).

$$HL_n = HL_{n-1} \cdot DL \quad (58)$$

$$HR_n = HR_{n-1} \cdot DR \quad (59)$$

The linear geometric parameter updating unit 343 calculates the error values of all the calculated homography matrixes HL and HR by the use of Expression (32) and selects the homography matrixes HL and HR having the smaller error value. The linear geometric parameter updating unit 343 creates linear correction coefficient information on the selected homography matrixes HL and HR and outputs the created linear correction coefficient information to the non-linear geometric parameter fitting unit 304 and the parameter selecting unit 305.

Figure 34:
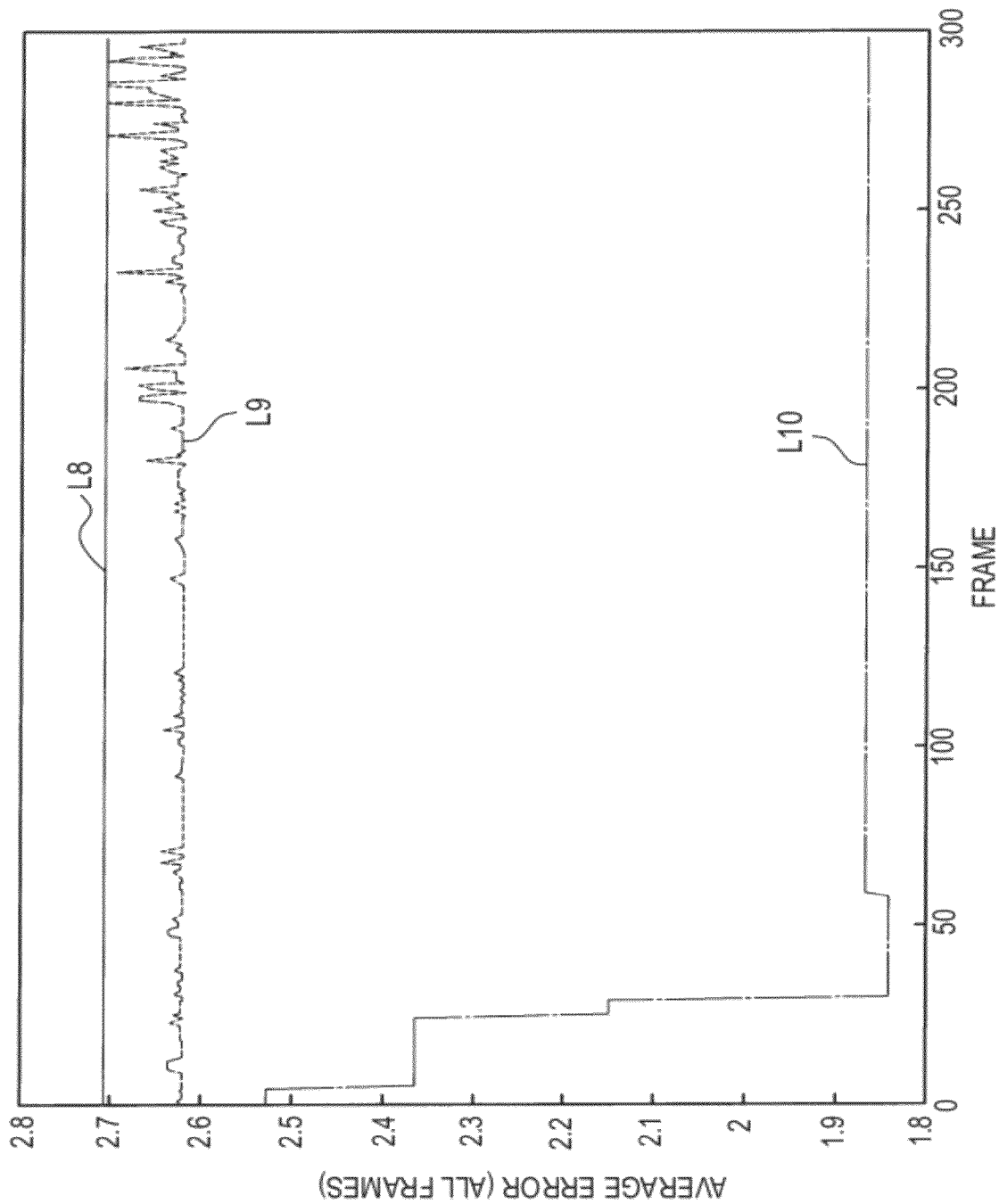
FIG. 34 is a graph illustrating a situation where the F-matrix updated with the update table converges with the lapse of time.

FIG. 34 shows a situation where the homography matrixes HL and HR converge. The curve L8 represents the situation where the error value in Expression (33) varies with the lapse of time, the curve L9 represents the situation where the error value varies with the lapse of time when the translation component of the homography matrixes HL and HR is updated, and the curve L10 represents the situation where the error value varies with the lapse of time when the translation component and the rotation component of the homography matrixes HL and HR are updated. As shown in FIG. 34, the homography matrixes HL and HR converge on a very small value by updating the translation component and the rotation component of the homography matrixes HL and HR.

Figure 35:
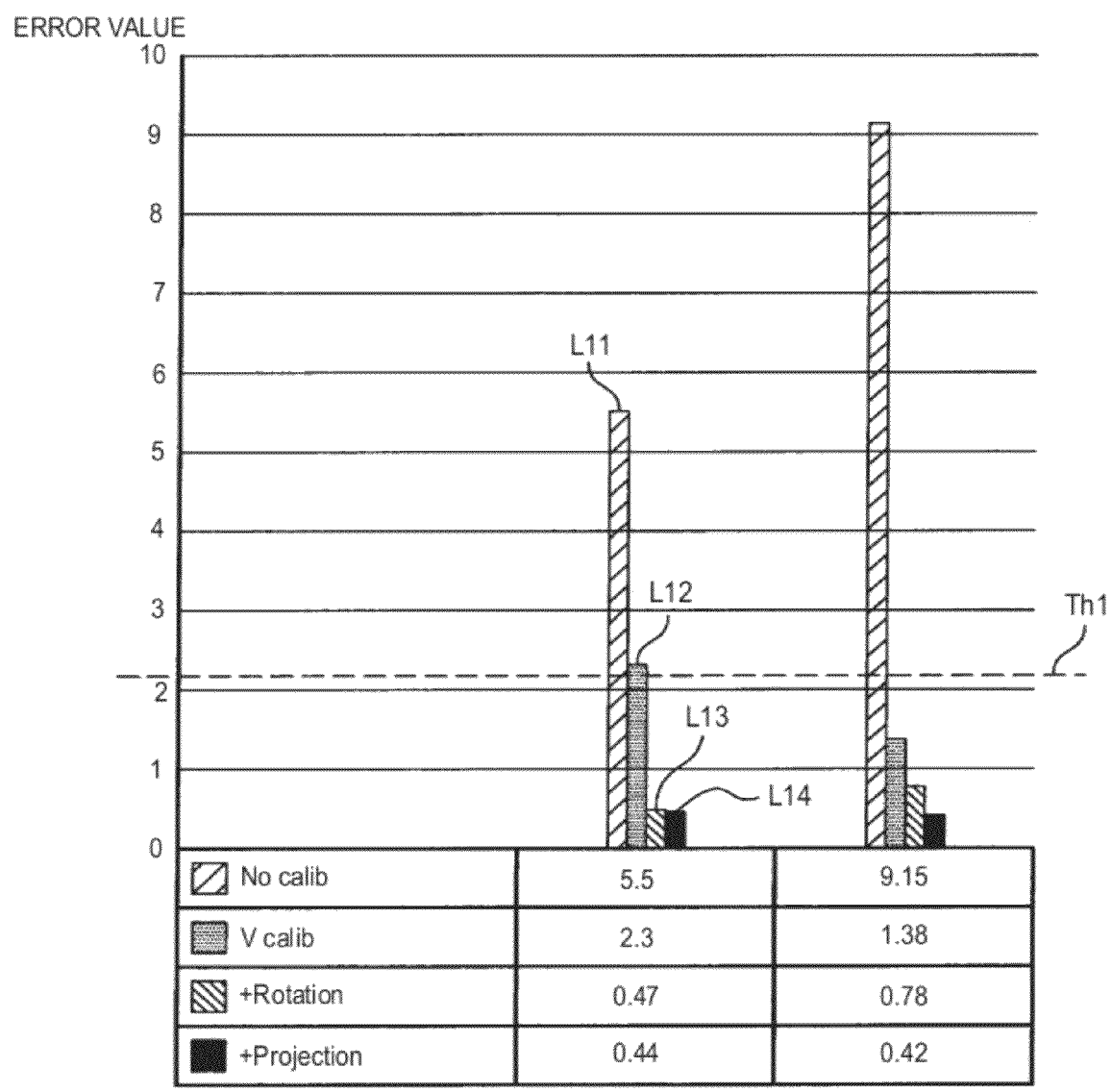
FIG. 35 is a graph illustrating the correspondence between components of an F-matrix subjected to geometric calibration and error values.

FIG. 35 shows values when the homography matrixes HL and HR converge. The bar graph L11 represents the value on which the error value in Expression (33) converges and the bar graph L12 represents the value on which the error value converges when the translation component of the homography matrixes HL and HR is updated. The bar graph L13 represents the value on which the error value converges when the translation component and the rotation component of the homography matrixes HL and HR are updated and the bar graph L14 represents the value on which the error value converges when the translation component, the rotation component, and the projection component of the homography matrixes HL and HR are updated. The threshold value Th1 represents the upper limit of the error value when the parallax detection to be described later is performed well. That is, in order to perform the parallax detection to be described later well, it is necessary to set the error value to be equal to or less than the threshold value Th1. As shown in FIG. 35, the parallax detection is performed well by updating at least the translation component and the rotation component of the homography matrixes HL and HR.

The linear geometric parameter fitting unit 340 according to the second modification calculates the transformation matrix F using the update table. Accordingly, the linear geometric parameter fitting unit 340 can reduce the processing load for calculating the transformation matrix F. Since the jag of the parameters is suppressed with the reduction of the processing load, the linear geometric parameter fitting unit 340 can calculate the robust transformation matrix F.

Since the linear geometric parameter fitting unit 340 limits the capacity of the update table, it is possible to prevent the explosion of the capacity of the update table.

[Modification of Parameter Selecting Unit]

A modification (transformation matrix adjusting unit) of the parameter selecting unit 305 will be described below. The parameter selecting unit 305 according to this modification performs the following image adjusting process after selecting the homography matrixes HL and HR through the use of the above-mentioned process.

Figure 36:
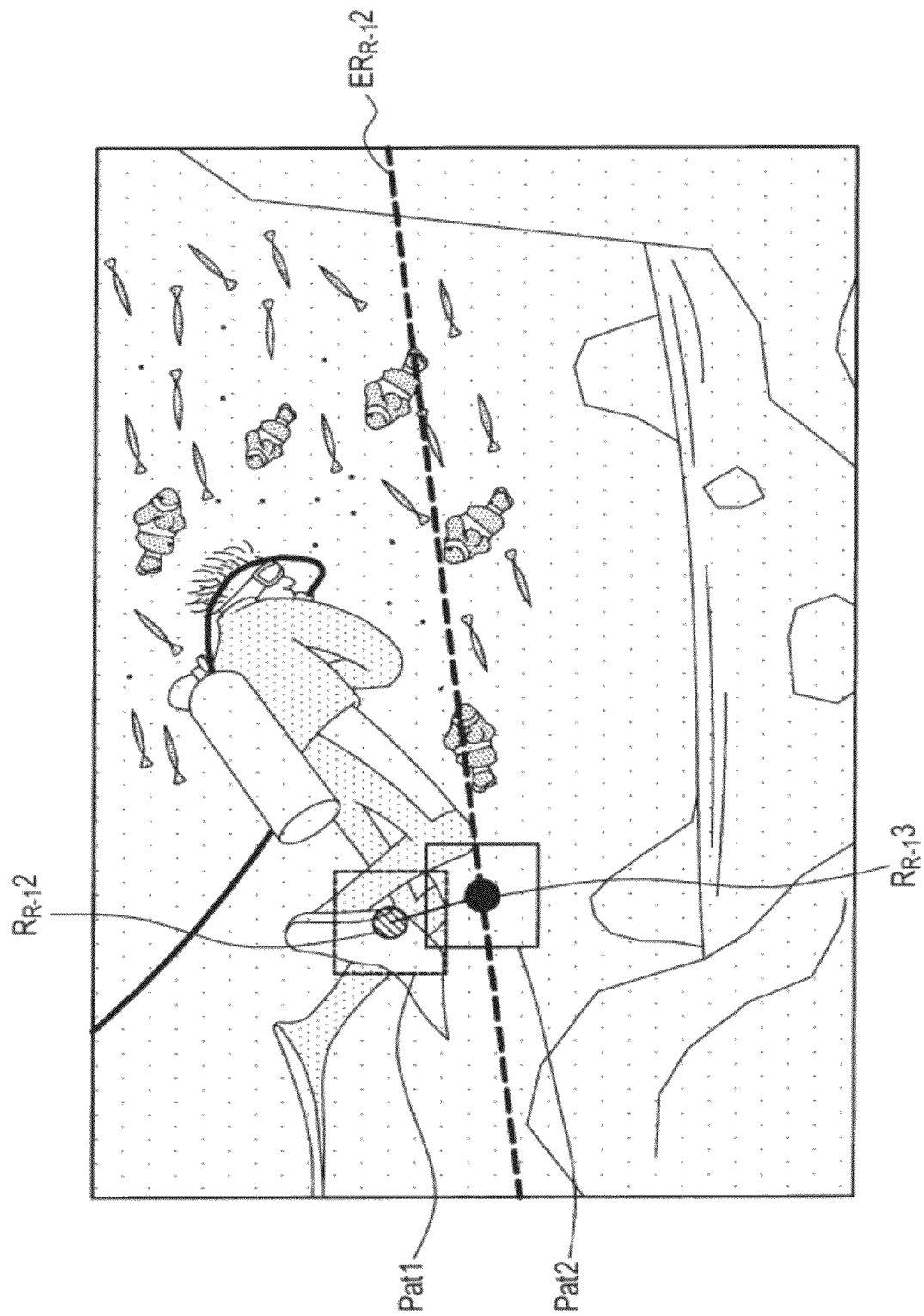
FIG. 36 is a diagram illustrating a situation of geometric calibration in an image adjustment.

That is, as shown in FIG. 36, the parameter selecting unit 305 calculates the transformation matrix F on the basis of the homography matrixes HL and HR and transforms the left representative points by the use of the transformation matrix F to set an epipolar line $EP_{R-1}2$. The parameter selecting unit 305 draws a vertical line from the right representative point $P_{R-1}2$ to the epipolar line $EP_{R-1}2$ to acquire an intersection $P_{R-1}3$. The parameter selecting unit 305 extracts a first peripheral patch (for example, a patch of 10×10 pixels) Pat1 centered on the right representative point $P_{R-1}2$ and a second peripheral patch (for example, a patch of 10×10 pixels) Pat2 centered on the intersection $P_{R-1}3$. The parameter selecting unit 305 adjusts the homography matrixes HL and HR so that the correlation between the patches is maximized. Specifically, the parameter selecting unit 305 adjusts the homography matrixes HL and HR so that the value of Expression (60) is minimized.

$$\frac{\sum_j a_j^2 \cdot \sum_k b_k^2}{\left(\sum_i a_i b_i\right)^2} \propto \frac{\sum_k b_k^2}{\left(\sum_i a_i b_i\right)^2} = \sum_k \left(\frac{b_k}{\sum_i a_i \cdot b_i}\right)^2 \equiv \sum_k f(b_k)^2 \quad (60)$$

Here, $a_j$ and $a_i$ represent the brightness of the pixels in the first patch Pat1 and bi and bk represents the brightness of the pixels in the second patch Pat2.

The parameter selecting unit 305 repeatedly performs the above-mentioned process by the use of the adjusted homography matrixes HL and HR and other representative pairs. After performing the above-mentioned process on all the representative pairs, the parameter selecting unit 305 creates parameter information on the homography matrixes HL and HR and outputs the created parameter information to the linear geometric parameter fitting unit 303 and the geometric calibration executing unit 306.

Therefore, the parameter selecting unit 305 can calculate the transformation matrix F in addition to the homography matrixes HL and HR with high accuracy.

The above-mentioned modifications may be arbitrarily combined. For example, all the modifications may be combined. In this case, the linear geometric parameter fitting unit 303 creates the homography matrixes HL and HR through the use of plural methods. The parameter selecting unit 305 selects the optimal out of these homography matrixes HL and HR and the homography matrixes HL and HR created by the nonlinear geometric parameter fitting unit 304 and improves the accuracy of the homography matrixes HL and HR through the processes in the third modification. The homography matrixes Hl and HR are considered as initial parameters for calculation in the next frame.

<2.3. Configuration of Parallax Detecting Unit>

Figure 37:
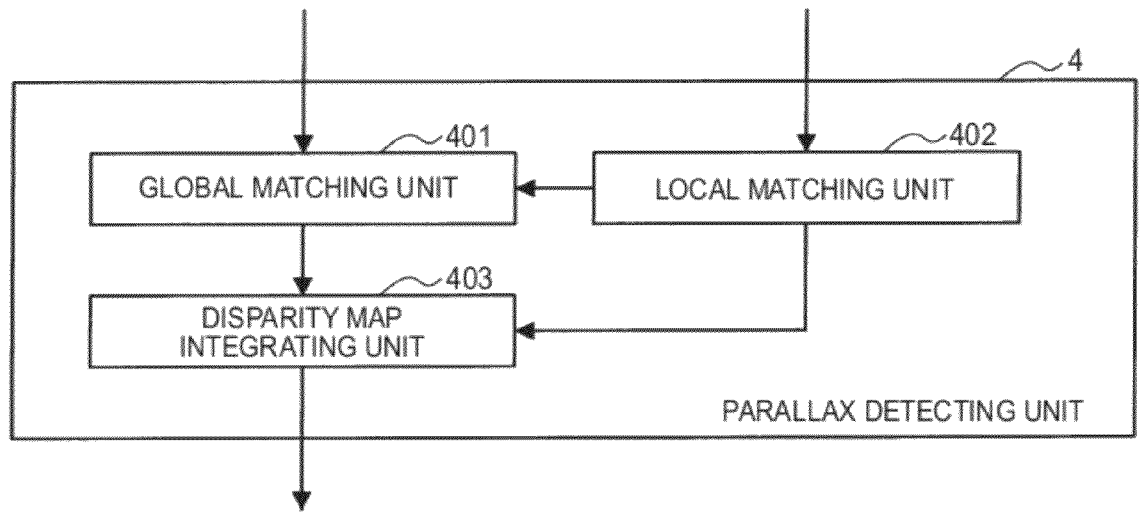
FIG. 37 is a block diagram illustrating the configuration of a parallax detecting unit.

The configuration of the parallax detecting unit 4 shown in FIG. 5 will be described below. The parallax detecting unit 4 includes a global matching unit 401, a local matching unit 402, and a disparity map integrating unit 403, as shown in FIG. 37. That is, the parallax detecting unit 4 performs the global matching process and the local matching process in parallel. Here, the local matching has a merit that the accuracy does not depend on the result of the calibration or the model (for example, a model formula or a modification matrix F expressing the correspondence between the brightness of an input image $V_L$ and the brightness of an input image $V_R$), but has a demerit that it is weak to occlusion and the stability is poor (the accuracy is apt to be uneven). On the other hand, the global matching has a merit that it is strong to occlusion and is stable, but has a demerit that the accuracy is apt to depend on the result of the calibration or the model. Therefore, the parallax detecting unit 4 performs both in combination, compares the resultant parallax maps, and selects a better parallax map.

[Configuration of Global Matching Unit]

Figure 38:
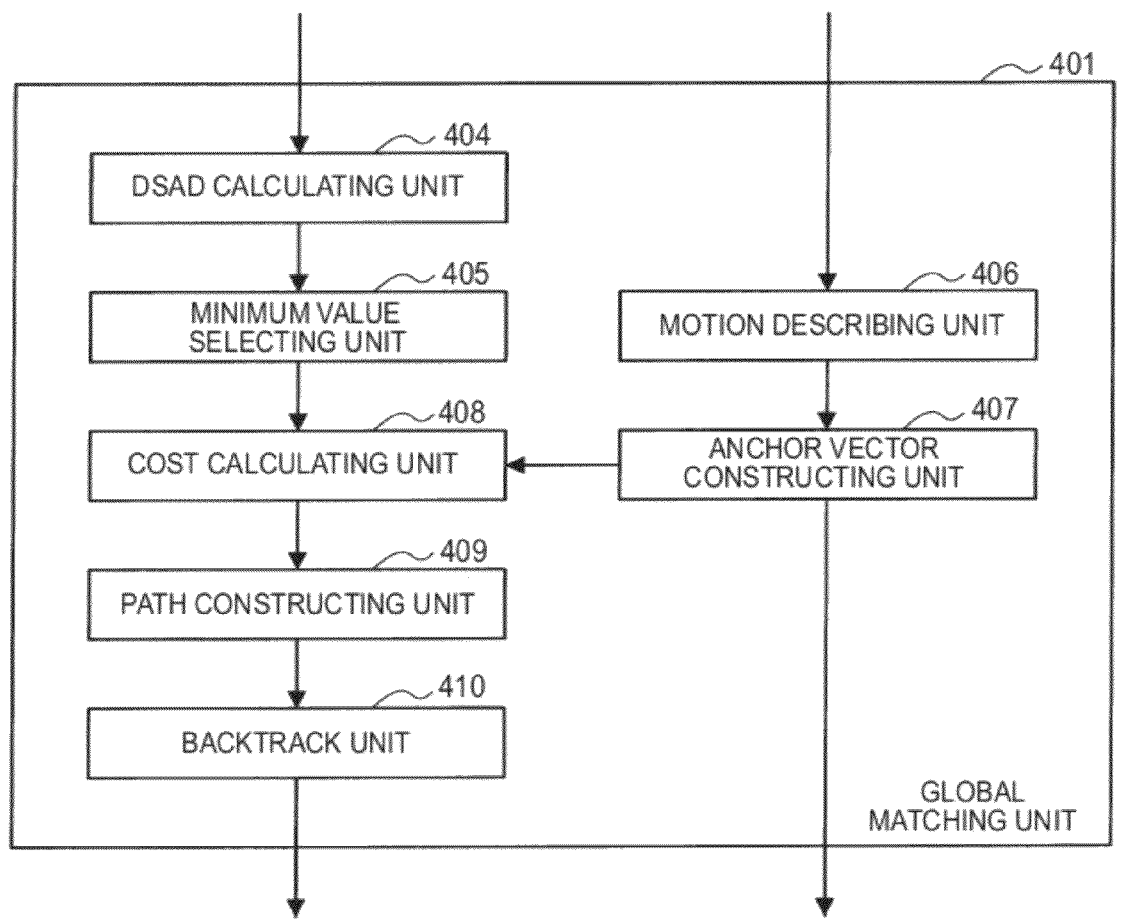
FIG. 38 is a block diagram illustrating the configuration of a global matching unit.

The global matching unit 401 (the first horizontal parallax detecting unit) includes a DSAD (Dynamic Sum of Absolute Difference) calculating unit 404, a minimum value selecting unit 405, a motion describing unit 406, an anchor vector constructing unit 407, a cost calculating unit 408, a path constructing unit 409, and a backtrack unit 410, as shown in FIG. 38.

[Configuration of DSAD Calculating Unit]

The DSAD calculating unit 404 performs the following processes for each left coordinate point on the basis of the calibrated images $V_{L-2}$ and $V_{R-2}$ and the reliability map information supplied from the color calibration unit 2. That is, the DSAD calculating unit 404 extracts all the right coordinate points having the same height (the same y coordinate) as the left coordinate points as a reference coordinate point with the left coordinate points as a standard coordinate point. The DSAD calculating unit 404 subtracts the x coordinate of the standard coordinate point from the x coordinate of each reference coordinate point and sets the resultant value as the horizontal parallax d1 of the respective standard coordinate point. The DSAD calculating unit 404 calculates DSAD(j) (where j is an integer of −2 to 2) expressed by Expression (61) for the horizontal parallax d1 of all the standard coordinate points (that is, all the reference coordinate points).

$$DSAD(j) = \left| \sum_i ((L(i, j) - R(i, j)) - (L(0, j) - R(0, j)) \times \alpha 1) \right| \quad (61)$$

Here, i is an integer of −2 to 2, L(i, j) represents the brightness of the left coordinate point different by (i+j) in y coordinate from the standard coordinate point, and R(i, j) represents the brightness of the right coordinate point different by (i+j) in y coordinate from the reference coordinate point. α1 represents a value obtained by normalizing the reliability of the standard coordinate point indicated by the color calibration reliability map to the value between 0 to 1 and becomes closer to 1 as the reliability becomes greater. In this way, it is possible to detect the parallax with high robustness with the color disparity by using the values of the color calibration reliability map to calculate the DSAD value. The normalization can be performed by substituting the reliability into Expression 16.

Therefore, the DSAD calculating unit 404 calculates several DSAD values by swinging the y coordinate of the standard coordinate point and the reference coordinate point. Accordingly, the parallax detecting unit 3 can create the parallax map considering the vertical difference between the left coordinate points and the right coordinate points. The DSAD calculating unit 404 sets the swinging of the y coordinate of the reference coordinate point to two pixels upward and downward with respect to the y coordinate of the standard coordinate point, but this range is arbitrarily changed depending on the balance between robustness and accuracy.

The DSAD calculating unit 404 creates DSAD information on the calculated DSAD(−2) to DSAD(+2) and outputs the created DSAD information to the minimum value selecting unit 405.

[Configuration of Minimum Value Selecting Unit]

Figure 43:
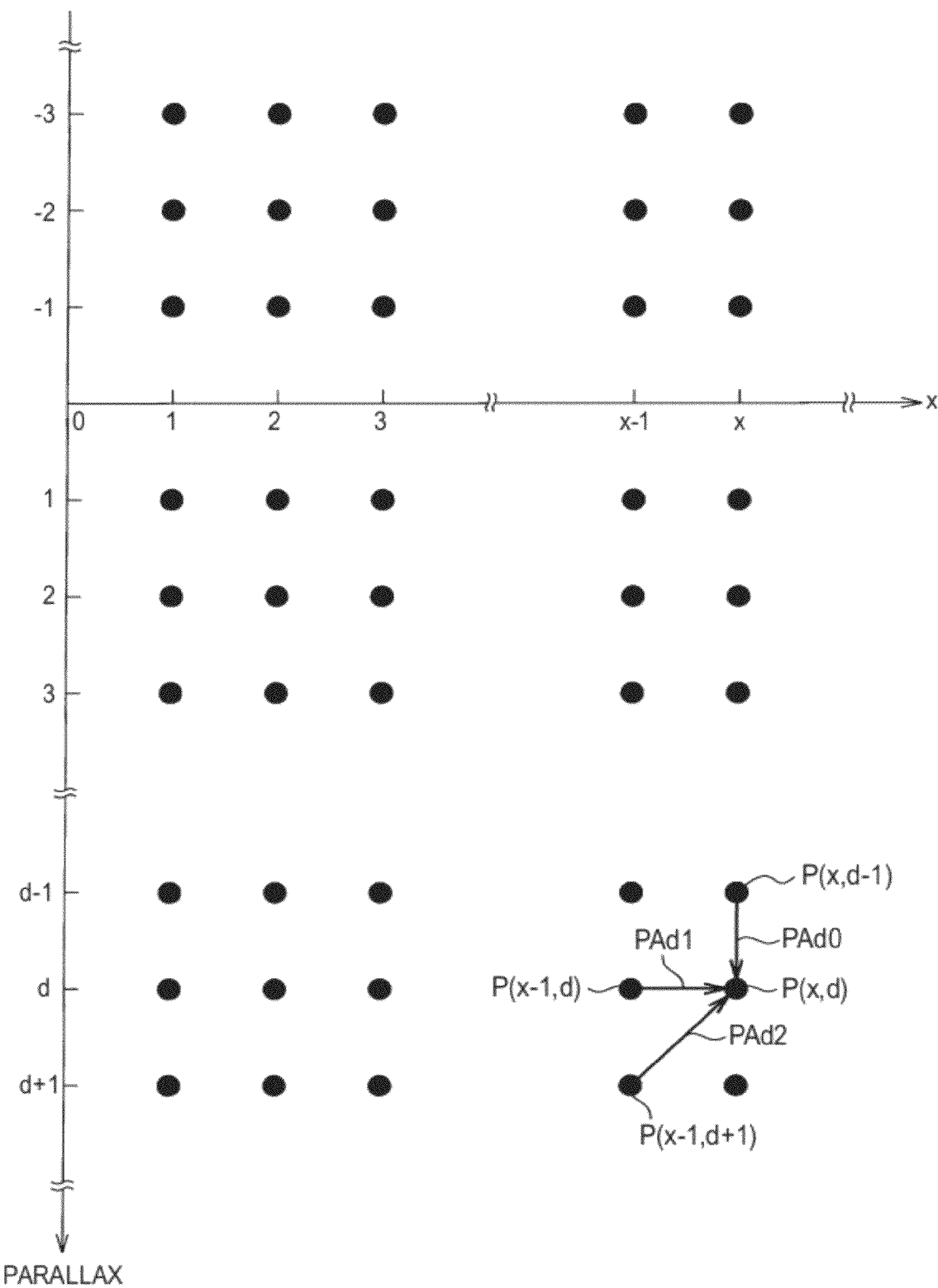
FIG. 43 is a diagram illustrating a DP map used for parallax matching.

The minimum value selecting unit 405 selects the minimum DSAD with respect to all the left coordinate points and horizontal parallaxes d1 on the basis of the DSAD information. The minimum value selecting unit 405 stores the selected DSAD in the respective node P(x, d) of the parallax detecting DP map shown in FIG. 43. Accordingly, the minimum DSAD is the score of the node P(x, d). The parallax detecting DP map includes plural nodes P(x, d) in which the horizontal axis represents the x coordinate of the left coordinate point and the vertical axis represents the horizontal parallax d1. The parallax detecting DP map is used to calculate the horizontal parallax d1 of the left coordinate points. The parallax detecting DP map is created for each y coordinate of the left coordinate points. Therefore, any of the nodes P(x, d) of any of the parallax detecting DP maps correspond to any of the left coordinate points.

[Configuration of Motion Describing Unit]

Figure 39:
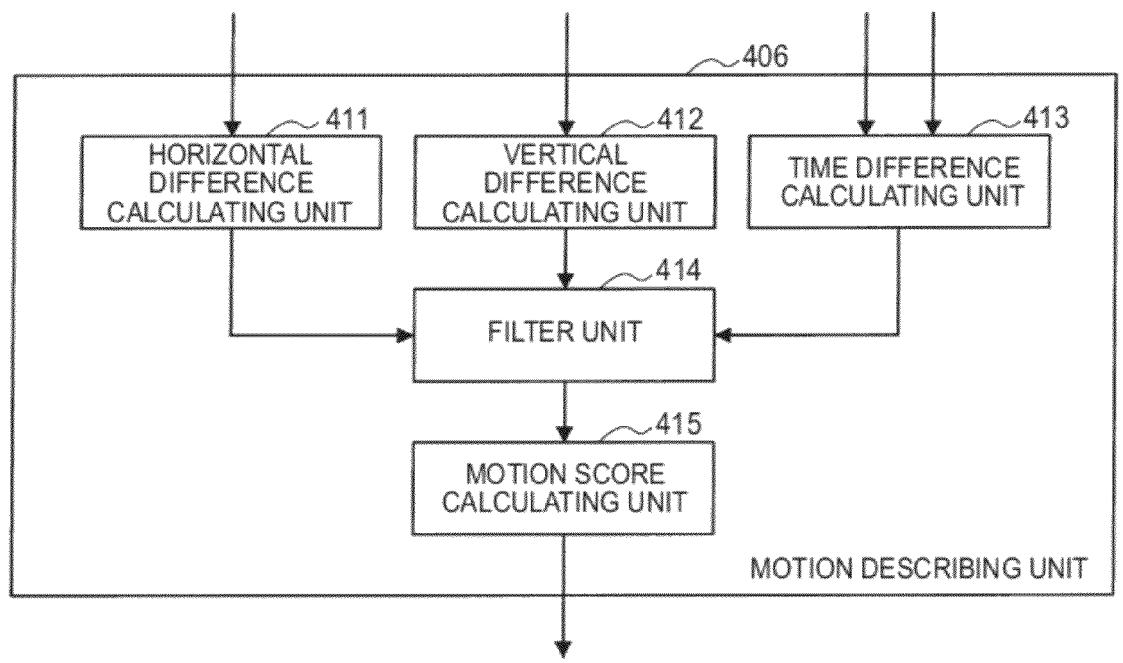
FIG. 39 is a block diagram illustrating the configuration of a motion describing unit.

As shown in FIG. 39, the motion describing unit 406 includes a horizontal difference calculating unit 411, a vertical difference calculating unit 412, a time difference calculating unit 413, a filter unit 414, and a motion score calculating unit 415.

The horizontal difference calculating unit 411 acquires the calibrated image $V_{L-2}$ and performs the following process on the pixels of the calibrated image $V_{L-2}$, that is, the respective left coordinate points. That is, the horizontal difference calculating unit 411 sets the respective left coordinate points as a standard coordinate point and subtracts the brightness of the reference coordinate point having an x coordinate greater by 1 than the standard coordinate point from the brightness of the standard coordinate point. The horizontal difference calculating unit 411 sets the resultant value as a horizontal difference dx, creates horizontal difference information on the horizontal difference dx, and outputs the created horizontal difference information to the filter unit 414.

The vertical difference calculating unit 412 acquires the calibrated images $V_{R-2}$ and performs the following process on the respective pixels of the calibrated image $V_{L-2}$, that is, the respective left coordinate points. That is, the vertical difference calculating unit 412 sets each left coordinate point as a standard coordinate point and subtracts the brightness of the reference coordinate point having a y coordinate greater by 1 than the standard coordinate point from the brightness of the standard coordinate point. The vertical difference calculating unit 412 sets the resultant value as a vertical difference dy, creates vertical difference information on the calculated vertical difference dy, and outputs the created vertical difference information to the filter unit 414.

The time difference calculating unit 413 acquires the calibrated image $V_{L-2}$ and the calibrated image $V'_{L-2}$ of the previous frame and performs the following process on the respective pixels of the calibrated image $V_{L-2}$, that is, the respective left coordinate points. That is, the time difference calculating unit 413 sets each left coordinate point as a standard coordinate point and sets a pixel having the same coordinate as the standard coordinate point as the reference coordinate point out of the pixels of the calibrated image $V'_{L-2}$ of the previous frame. The time difference calculating unit 413 subtracts the brightness of the reference coordinate point from the brightness of the standard coordinate point. The time difference calculating unit 413 sets the resultant value as a time different dt, creates time difference information on the calculated time difference dt, and outputs the created time difference information to the filter unit 414.

The filter unit 414 applies a low-pass filter to the horizontal difference information, the vertical difference information, and the time difference information. Thereafter, the filter unit 414 outputs such information to the motion score calculating unit 415.

The motion score calculating unit 415 determines the motion for each left coordinate point on the basis of the horizontal difference information, the vertical difference information, and the time difference information and determines the motion score based on the determination result.

Specifically, the motion score calculating unit 415 calculates the temporal derivative of the brightness variation (dx/dt+dy/dt) (brightness variation per unit time) for each left coordinate point and normalizes the calculated derivative to a value between 0 and 1 by substituting the calculated derivative into a sigmoid function. The motion score calculating unit 415 sets the normalized value as a motion score and outputs motion score information on the motion score to the anchor vector constructing unit 407. The motion score becomes smaller as the variation in brightness of the left coordinate point becomes greater (that is, as the motion of an image becomes greater).

The motion score calculating unit 415 may calculate the motion score as follows.

That is, the motion score calculating unit 415 creates a mosaic image $V''_{L-2}$ by lowering the resolution of the calibrated image $V_{L-2}$. The motion score calculating unit 415 sets the respective left coordinate points of the calibrated image $V_{L-2}$ as a standard coordinate point and sets the coordinate point having the same coordinate as the standard coordinate point in the mosaic image $V''_{L-2}$ as a reference coordinate point. The motion score calculating unit 415 subtracts the brightness of the reference coordinate point from the brightness of the standard coordinate point. The motion score calculating unit 415 normalizes the calculated difference value to a value between 0 and 1 by substituting the calculated difference value into a sigmoid function. The motion score calculating unit 415 sets the normalized value as a motion score. In this case, the motion score becomes larger in a plain part of the calibrated image $V_{L-2}$. In this technique, it is possible to reduce the processing load and to obtain a robust motion score.

[Configuration of Anchor Vector Constructing Unit]

Figure 40:
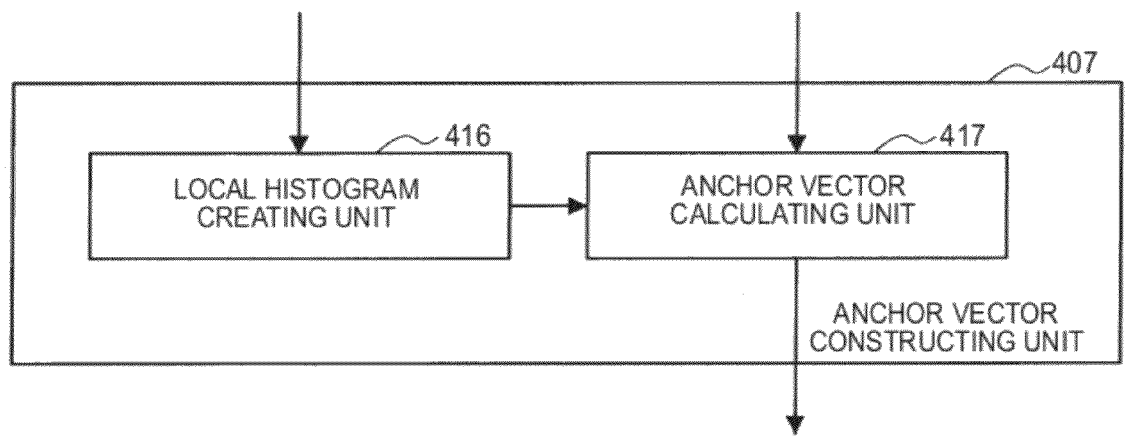
FIG. 40 is a block diagram illustrating the configuration of an anchor vector constructing unit.

The anchor vector constructing unit 407 shown in FIG. 38 includes a local histogram creating unit 416 and an anchor vector calculating unit 417, as shown in FIG. 40.

The local histogram creating unit 416 acquires a parallax map $DM_{n-1}$ prepared in the previous frame. The local histogram creating unit 416 performs the following process on the respective coordinate points of the parallax map (corresponding to the respective left coordinate points). Specifically, the local histogram creating unit 416 sets each coordinate point of the parallax map as the standard coordinate point and extracts the horizontal parallax information from the peripheral area (for example, an area of 5×5 pixels centered on the standard coordinate point) of the standard coordinate point. The local histogram creating unit 416 creates a local histogram DH shown in FIG. 41 on the basis of the horizontal parallax information. The local histogram DH represents the correspondence between the value of the horizontal parallax d1 and the number of pixels (frequency) having the value of the parallax.

The local histogram creating unit 416 creates local histogram information on the local histogram DH and outputs the created local histogram information to the anchor vector calculating unit 417.

Figure 41:
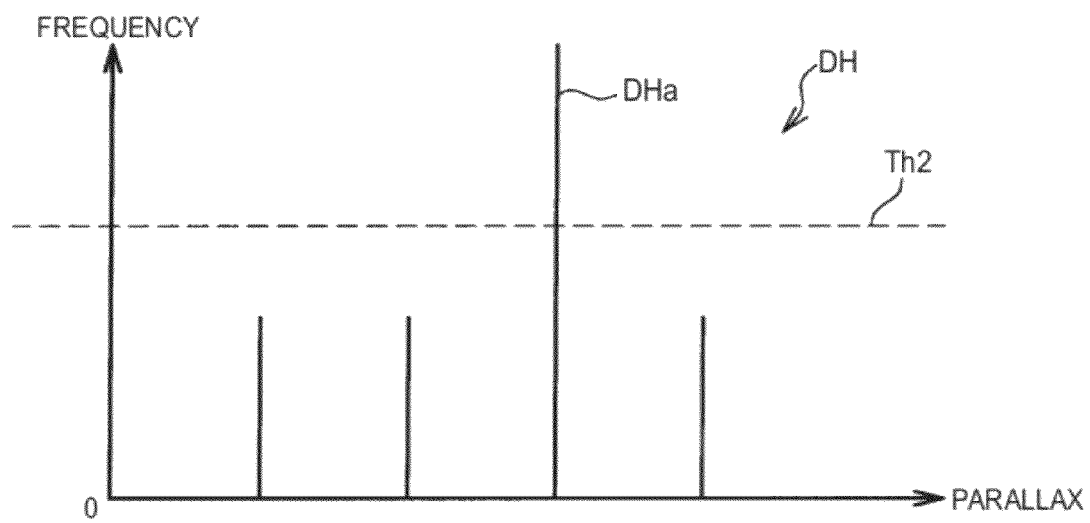
FIG. 41 is a local histogram illustrating parallax frequencies.

The anchor vector calculating unit 417 performs the following process on the respective left coordinate points on the basis of the local histogram information. That is, the anchor vector calculating unit 417 searches for the horizontal parallax d1 of which the frequency is equal to or higher than a predetermined threshold value Th2, that is, a high-frequency parallax d1', as shown in FIG. 41. The anchor vector calculating unit 417 creates anchor vector information indicating a bonus value obtained by multiplying the motion score by a predetermined value and the high-frequency parallax d1' and outputs the created anchor vector information to the cost calculating unit 408. The anchor vector information is expressed, for example, by Expression (67).

$$\text{Anchor} = \alpha 2 \times (0 \ldots 1\ 0 \ldots 0) = \alpha 2 \times M_d \quad (67)$$

Here, $\alpha 2$ represents the bonus value and the matrix $M_d$ represents the position of the high-frequency parallax d1'. That is, the columns of the matrix $M_d$ represent different horizontal parallaxes d1 and the column having a component of 1 represents that the horizontal parallax d1 corresponding to the column is a high-frequency parallax d1'. When the high-frequency parallax d1' is not present, all the components of the matrix $M_d$ are 0.

[Configuration of Cost Calculating Unit]

The cost calculating unit 408 shown in FIG. 38 updates the values of the nodes P(x, d) of the parallax detecting DP map on the basis of the anchor vector information. That is, the cost calculating unit 408 specifies the node (x, d(=d1')) corresponding to the high-frequency parallax d1' for each left coordinate point and subtracts the bonus value $\alpha 2$ from the score of the node. Accordingly, the node having the same parallax as the parallax having a high frequency in the previous frame is apt to pass through the shortest path. In other words, the parallax having a high frequency in the previous frame is apt to be selected in the current frame.

[Configuration of Path Constructing Unit]

Figure 42:
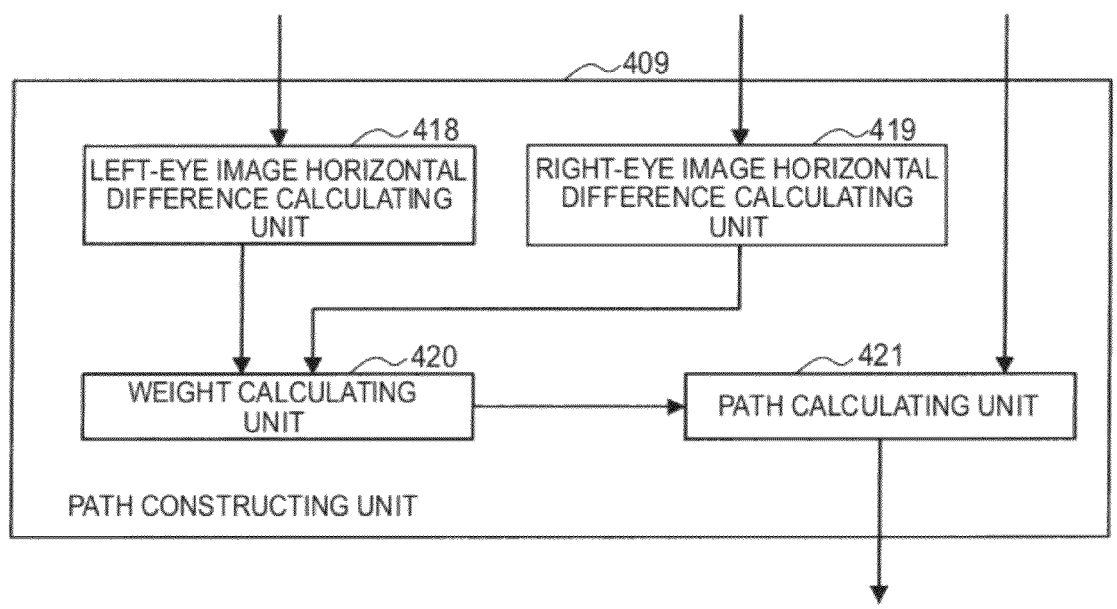
FIG. 42 is a block diagram illustrating the configuration of a path constructing unit.

The path constructing unit 409 shown in FIG. 38 includes a left-eye image horizontal difference calculating unit 418, a right-eye image horizontal difference calculating unit 419, a weight calculating unit 420, and a path calculating unit 421, as shown in FIG. 42.

The left-eye image horizontal difference calculating unit 418 performs the same process as performed by the horizontal difference calculating unit 411. The left-eye image horizontal difference calculating unit 418 outputs horizontal difference information created through the process to the weight calculating unit 420.

The right-eye image horizontal difference calculating unit 419 acquires a calibrated image $V_{R-2}$. The right-eye image horizontal difference calculating unit 419 performs the same process as performed by the horizontal difference calculating unit 411 on the calibrated image $V_{R-2}$. The right-eye image horizontal difference calculating unit 419 outputs horizontal difference information created through the process to the weight calculating unit 420.

The weight calculating unit 420 calculates the weight $wt_L$ of the left coordinate point and the weight $wt_R$ of the right coordinate point for all the coordinate points on the basis of the horizontal difference information. Specifically, the weight calculating unit 420 normalizes the horizontal difference $dw_L$ to a value between 0 and 1 by substituting the horizontal difference $dw_L$ of the left coordinate point into a sigmoid function and sets the resultant value as the weight $wt_L$. Similarly, the weight calculating unit 420 normalizes the horizontal difference $dw_R$ to a value between 0 and 1 by substituting the horizontal difference $dw_R$ of the right coordinate point into a sigmoid function and sets the normalized value as the weight $wt_R$. The weight calculating unit 420 creates weight information on the calculated weights $wt_L$ and $wt_R$ and outputs the created weight information to the path calculating unit 421. The weights $wt_L$ and $wt_R$ become smaller in an edge part (outline) of an image and become larger in a plain part.

The path calculating unit 421 calculates an accumulated cost up to the respective nodes P(x, d) of the parallax detecting DP map on the basis of the weight information supplied from the weight calculating unit 420. Specifically, the path calculating unit 421 defines the accumulated cost from the start point to the node P(x, d) with a node (0, 0) as the start point and a node ($x_{max}$, 0) as the end point as follows. Here, xmax is the maximum value of the x coordinate of the left coordinate point.

$$DFI(x,d)_0 = DFI(x,d-1) + \text{occCost}_0 + \text{occCost}_1 \times wt_R \quad (68)$$

$$DFI(x,d)_1 = DFI(x-1,d) + DFD(x,d) \quad (69)$$

$$DFI(x,d)_2 = DFI(x-1,d+1) + \text{occCost}_0 + \text{occCost}_2 \times wt_L \quad (70)$$

Here, $DFI(x, d)_0$ represents the accumulated cost up to the node P(x, d) via the path $PA_d 0$, $DFI(x, d)_1$ represents the accumulated cost up to the node P(x, d) via the path $PA_d 1$, and $DFI(x, d)_2$ represents the accumulated cost up to the node P(x, d) via the path $PA_d 2$. DFI(x, d−1) represents the accumulated cost from the start point to the node P(x, d−1). DFI(x−1, d) represents the accumulated cost from the start point to the node P(x−1, d). DFI(x−1, d+1) represents the accumulated cost from the start point to the node P(x−1, d+1). Each of $\text{occCost}_0$ and $\text{occCost}_1$ is a predetermined value representing a cost value and is, for example, 4.0. $wt_L$ represents the weight of the left coordinate point corresponding to the node P(x, d) and $wt_R$ represents the weight of the right coordinate point having the same coordinate as the left coordinate point.

The path calculating unit 421 selects the minimum out of the calculated accumulated costs $DFI(x, d)_0$ to $DFI(x, d)_2$, and sets the selected value as the accumulated cost DFI(x, d) of the node P(x, d). The path calculating unit 421 calculates the accumulated cost DFI(x, d) for all the nodes P(x, d) and stores the calculated accumulated costs in the parallax detecting DP map.

The backtrack unit 410 calculates the shortest path, that is, the path in which the accumulated cost from the start point to the end point is the minimum, by tracking back the path of which the accumulated cost is the minimum from the end point to the start point. The node in the shortest path is the horizontal parallax d1 of the corresponding left coordinate point.

The backtrack unit 410 creates a parallax map $DM_1$ on the basis of the calculated the shortest path and the vertical parallax information supplied from the local matching unit to be described later. The parallax map $DM_1$ represents the horizontal parallax d1 and the vertical parallax d2 for each left coordinate point. The backtrack unit 410 creates parallax map information on the created parallax map $DM_1$ and outputs the created parallax map information to the disparity map integrating unit 403 shown in FIG. 37. Here, the parallax map $DM_1$ stores the difference between the y coordinate of the left coordinate point and the y coordinate of the right coordinate point having the same x coordinate as the left coordinate, that is, the vertical parallax d2 determined as the optimal by the local matching unit 402.

[Configuration of Local Matching Unit]

The local matching unit 402 (the second horizontal parallax detecting unit) calculates a parallax map $DM_2$ for each pixel block by performing a so-called block matching process. The parallax map $DM_2$ represents the horizontal parallax d1 and the vertical parallax d2 for each left coordinate point.

Specifically, the local matching unit 402 divides each of the calibrated images $V_{L-2}$ and $V_{R-2}$ into plural pixel blocks. For example, the local matching unit 402 divides each of the calibrated images $V_{L-2}$ and $V_{R-2}$ into 64 pixel blocks, as in the geometric calibration unit 3. The local matching unit 402 performs the same process as performed by the global matching unit 401 on the respective pixel blocks (hereinafter, also referred to as "left pixel blocks") of the calibrated image $V_{L-2}$. Here, the local matching unit 402 also calculates the vertical parallax d2 for each left coordinate point. The method of calculating the vertical parallax d2 is the same as performed by the global matching unit 401. For example, the local matching unit 402 calculates the DSAD in the y axis direction by setting the right coordinate point having the same x coordinate as the standard coordinate point as the reference coordinate point in the process of calculating the DSAD. Thereafter, the local matching unit 402 creates the parallax detecting DP map for calculating the vertical parallax d2, calculates the shortest path of the parallax detecting DP map, and calculates the vertical parallax d2 for each left coordinate point on the basis of the shortest path.

The local matching unit 402 output parallax map information on the created parallax map $DM_2$ to the disparity map integrating unit 403, creates vertical parallax information on the vertical parallax d2, and outputs the created vertical parallax information to the global matching unit 401.

[Configuration of Disparity Map Integrating Unit]

The disparity map integrating unit 403 first estimates the parallax map $DM_1$ created by the global matching unit 401 and the parallax map $DM_2$ created by the local matching unit 402 on the basis of the parallax map information.

Specifically, the disparity map integrating unit 403 creates a first difference map representing the difference between the parallax map $DM_1$ of the current frame and the parallax map $DM_1$ of the previous frame. The first difference map represents the value obtained by subtracting the horizontal parallax d1 of the parallax map $DM_1$ of the previous frame from the horizontal parallax d1 of the parallax map $DM_1$ of the current frame for each left coordinate point. The disparity map integrating unit 403 creates a first binary difference map by binarizing the first difference map. The disparity map integrating unit 403 creates a first difference score map by multiplying the values of the first binary difference map by a predetermined weight (for example, 8).

The disparity map integrating unit 403 creates edge images of the parallax map $DM_1$ of the current frame and the calibrated image $V_{L-2}$ of the current frame and creates a correlation map representing the correlation therebetween. The edge image of the parallax map $DM_1$ of the current frame indicates an edge part (the outline part of an image drawn in the parallax map $DM_1$ of the current frame) of the parallax map $DM_1$ of the current frame. Similarly, the edge image of the calibrated image $V_{L-2}$ indicates an edge part (the outline part of an image drawn in the calibrated image $V_{L-2}$) of the calibrated image $V_{L-2}$. A method of calculating the correlation such as NCC is arbitrarily used as the method of calculating the correlation between the edge images. The disparity map integrating unit 403 creates a binary correlation map by binarizing the correlation map. The disparity map integrating unit 403 creates a correlation score map by multiplying the values of the binary correlation map by a predetermined weight (for example, 26).

The disparity map integrating unit 403 creates a global matching reliability map $EM_G$ by integrating the first different score map and the correlation score map and applying the IIR filter thereto. The value of the respective left coordinate points of the global matching reliability map $EM_G$ means the larger value of the value of the first difference score map and the value of the correlation score map.

On the other hand, the disparity map integrating unit 403 creates a second difference map representing the difference between the parallax map $DM_2$ of the current frame and the parallax map $DM_2$ of the previous frame. The second difference map represents the value obtained by subtracting the horizontal parallax d1 of the parallax map $DM_1$ of the previous frame from the horizontal parallax d1 of the parallax map $DM_1$ of the current frame for each left coordinate point. The disparity map integrating unit 403 creates a second binary difference map by binarizing the second difference map. The disparity map integrating unit 403 creates a second difference score map by multiplying the values of the second binary difference map by a predetermined weight (for example, 16).

The disparity map integrating unit 403 creates the edge image of the calibrated image $V_{L-2}$ of the current frame. The edge image indicates the edge part (the outline part of an image drawn in the calibrated image $V_{L-2}$) of the calibrated image $V_{L-2}$. The disparity map integrating unit 403 creates a binary edge map by binarizing the edge image. The disparity map integrating unit 403 creates an edge score map by multiplying the values of the binary edge map by a predetermined weight (for example, 8).

The disparity map integrating unit 403 creates a local matching reliability map $EM_L$ by integrating the second different score map and the edge score map and applying the IIR filter thereto. The value of the respective left coordinate points of the local matching reliability map $EM_L$ means the larger value of the value of the second difference score map and the value of the edge score map.

In this way, the disparity map integrating unit 403 creates the global matching reliability map $EM_G$ by estimating the parallax map $DM_1$ created by the global matching unit 401 through the use of different estimation methods and integrating the estimation results. Similarly, the disparity map integrating unit 403 creates the local matching reliability map $EM_L$ by estimating the parallax map $DM_2$ created by the local matching unit 402 through the use of different estimation methods and integrating the results. Here, the estimation method of the parallax map $DM_1$ and the estimation method of the parallax map $DM_2$ are different from each other. The different weightings are performed depending on the estimation methods.

The disparity map integrating unit 403 determines which of the parallax map $DM_1$ and the parallax map $DM_2$ is higher for each left coordinate point by comparing the global matching reliability map $EM_G$ with the local matching reliability map $EM_L$. The disparity map integrating unit 403 creates the parallax detecting reliability map EM representing the parallax map having a higher reliability for each left coordinate point on the basis of the determination result.

FIGS. 44A and 44B shows an example of the parallax detecting reliability map EM. That is, FIG. 44A shows the parallax detecting reliability map EM1 created when the geometric calibration is not performed and FIG. 44B shows the parallax detecting reliability map EM2 created when the geometric calibration is performed. An area EM11 represents an area in which the parallax map $DM_1$ has a higher reliability than the parallax map $DM_2$ and an area EM12 represents an area in which the parallax map $DM_2$ has a higher reliability than the parallax map $DM_1$.

Since the local matching does not depend on the calibration result as described above, the area EM12 in the parallax detecting reliability map EM1 is wider than the area EM12 in the parallax detecting reliability map EM2.

On the contrary, the global matching can achieve good parallax detection when the geometric calibration with high accuracy is performed as in this embodiment. Accordingly, the area EM11 in the parallax detecting reliability map EM2 is wider than the area EM11 in the parallax detecting reliability map EM1.

The disparity map integrating unit 403 creates the parallax map DM on the basis of the created parallax detecting reliability map. Here, the horizontal parallax d1 of each left coordinate point in the parallax map DM indicates the value having the higher reliability of the parallax map $DM_1$ and the parallax map $DM_2$.

Figure 45C:
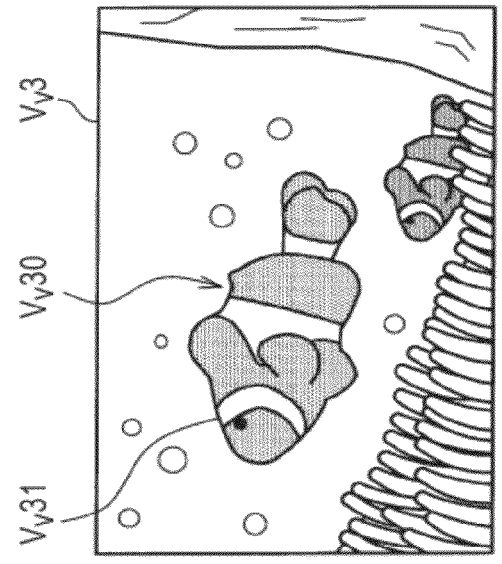
FIGS. 45A, 45B, and 45C are diagrams illustrating a multi-view image created on the basis of various parallax maps.
Figure 45B:
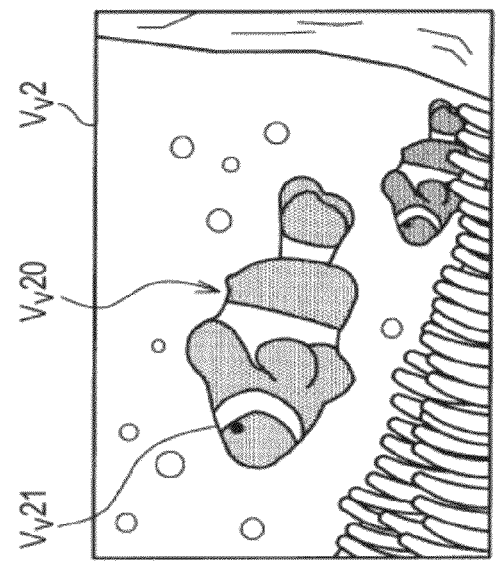
Figure 45A:
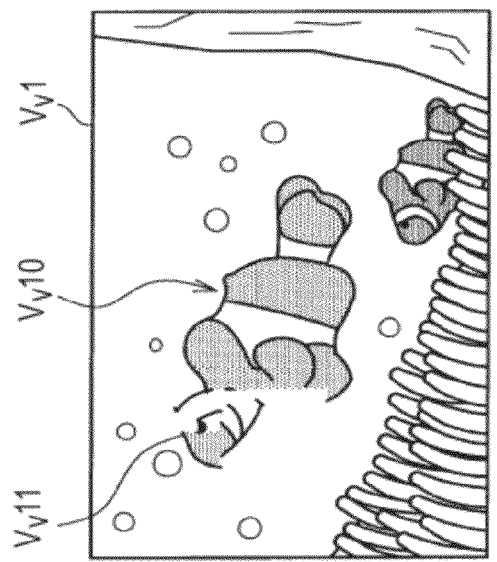

FIGS. 45A, 45B, and 45C are diagrams illustrating the advantages due to the parallax map. FIG. 45A shows a multi-view image $V_P1$ created on the basis of the parallax map $DM_1$, FIG. 45B shows a multi-view image $V_P2$ created on the basis of the parallax map $DM_2$, and FIG. 45C shows a multi-view image $V_P3$ created on the basis of the parallax map DM. Subject images $V_P10$ to $V_P30$ are drawn in the multi-view images $V_P1$ to $V_P3$. The tips $V_P11$ to $V_P31$ of the subject images $V_P10$ to $V_P30$ are areas for which the above-mentioned model is not suitable.

Since the accuracy of the global matching depends on the model, the tip $V_P11$ is ruptured. However, since the accuracy of the local matching does not depend on the model, the tip $V_P21$ is not ruptured. Since the parallax map DM represents one having the higher reliability of the parallax map $DM_1$ and the parallax map $DM_2$, the values of the parallax map $DM_2$ are employed for the area of the tip $V_P31$. Accordingly, the tip $V_P31$ is created on the basis of the parallax map $DM_2$. Therefore, the tip $V_P31$ is also not ruptured.

[Advantages Due to Parallax Detecting Unit]

Advantages due to the parallax detecting unit 4 will be described below.

Since the parallax detecting unit 4 considers the parallax in the y axis direction at the time of calculating the DSAD, it is possible to perform the parallax detection robust with the geometric disparity (vertical disparity). That is, parallax detecting unit 4 can detect the horizontal parallax with higher robustness and higher accuracy. Since the parallax detecting unit 4 limits the range in which the parallax in the y axis direction is considered (here, two pixels upward and downward about the standard coordinate point), it is possible to prevent the explosion of the optimization problem.

Since the parallax detecting unit 4 considers the reliability calculated through the color calibration at the time of calculating the DSAD, it is possible to perform the parallax detection considering the balance between the robustness and the accuracy.

Since the parallax detecting unit 4 uses the DSAD as the score of the parallax detecting DP map, it is possible to calculate the score of the parallax detecting DP map with higher accuracy, compared with the case where only the SAD is used as the score, and thus to perform the parallax detection with higher accuracy.

Since the parallax detecting unit 4 allocating a bonus to the scores of the parallax detecting DP map on to basis of the motion determination result, it is possible to calculate the scores of the parallax detecting DP map with high accuracy. The parallax detecting unit 4 may create a mosaic image $V''_{L-2}$ by lowering the resolution of the calibrated image $V_{L-2}$ and may calculate the motion score on the basis of the mosaic image $V''_{L-2}$. In this case, it is possible to reduce the processing load and to acquire the robust motion score.

Since the parallax detecting unit 4 considers the weights $wt_L$ and $wt_R$ based on the horizontal difference at the time of calculating the accumulated cost of the respective nodes P(x, d), it is possible to calculate the accumulated cost with high accuracy. Since the weights $wt_L$ and $wt_R$ become smaller in the edge part and become larger in the plain part, the smoothing is appropriately performed depending on the images.

Since the parallax detecting unit 4 causes the parallax map $DM_1$ calculated through the global matching to include the vertical parallax d2 calculated through the local matching, it is possible to improve the accuracy of the parallax map $DM_1$. For example, the parallax map $DM_1$ is robust even when the input images $V_L$ and $V_R$ are not aligned.

Since the parallax detecting unit 4 creates the correlation map representing the correlation between the edge images of the parallax map $DM_1$ and the calibrated image $V_{L-2}$ and calculates the reliability of the parallax map $DM_1$ on the basis of the correlation map, it is possible to calculate the reliability in a so-called streaking area of the parallax map $DM_1$. Accordingly, to the parallax detecting unit 4 can perform the parallax detection with high accuracy in the streaking area.

Since the parallax detecting unit 4 estimates the parallax map $DM_1$ and the parallax map $DM_2$ through the use of different estimation methods at the time of estimating the parallax map $DM_1$ and the parallax map $DM_2$, it is possible to perform estimation in consideration of these characteristics.

Since the parallax detecting unit 4 creates the global matching reliability map $EM_G$ and the local matching reliability map $EM_L$ by applying the IIR filter to the map obtained through the use of the estimation methods, it is possible to create a reliability map which is temporally stable.

Since the parallax detecting unit 4 creates the parallax map DM using one having the higher reliability of the parallax map $DM_1$ and the parallax map $DM_2$, it is possible to detect an accurate parallax in an area in which the accurate parallax is not hardly detected through the global matching and an area in which the accurate parallax is hardly detected through the local matching.

Since the parallax detecting unit 4 considers the created parallax map DM in the next frame, it is possible to perform the parallax detection with higher accuracy, compared with the case where plural matching methods are simply performed in parallel.

<3. Processes of Image Processing Device>

The processes of the image processing device 1 will be described below.

[Process of Color Calibration Unit]

Figure 46:
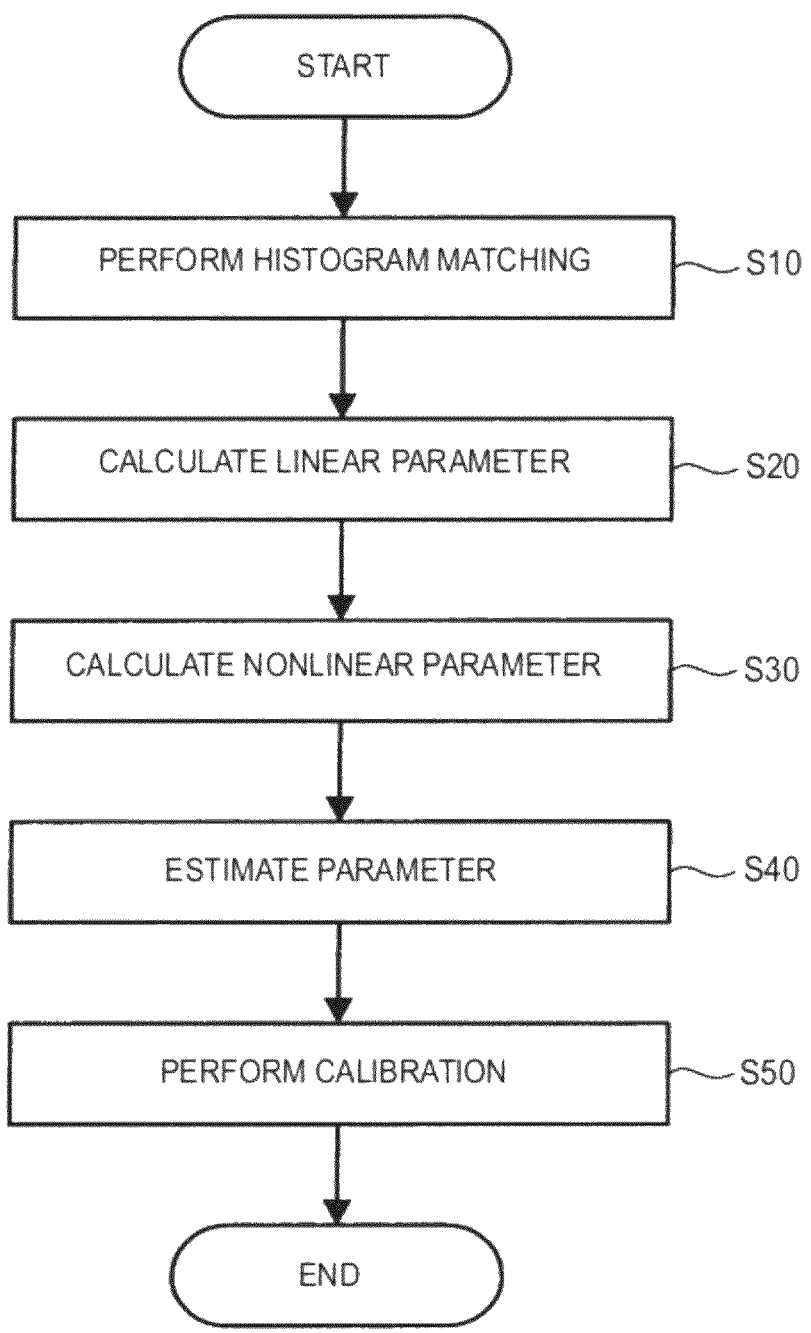
FIG. 46 is a flowchart illustrating the procedure of color calibration.

First, the processes performed by the color calibration unit 2 will be described with reference to the flowchart shown in FIG. 46.

In step S10, the block dividing unit 207 divides an input image $V_L$ into eight pixel blocks $B_{L-1}$, as shown in FIG. 8A. Similarly, the block dividing unit 207 divides an input image $V_R$ into eight pixel blocks $B_{R-1}$, as shown in FIG. 8B.

Then, the block dividing unit 207 lowers the grayscale of the respective pixel blocks $B_{L-1}$ and $B_{R-1}$ to 64 grayscales. The block dividing unit 207 outputs the block information on the pixel blocks $B_{L-1}$ and $B_{R-1}$ to the histogram creating unit 208.

The histogram creating unit 208 creates a color histogram $CH_L$ shown in FIG. 9A for each pixel block $B_{L-1}$ on the basis of the block information. Similarly, the histogram creating unit 208 creates a color histogram $CH_R$ shown in FIG. 9B for each pixel block $B_{R-1}$. The histogram creating unit 208 correlates the color histogram $CH_L$ and the color histogram $CH_R$ with each other. The histogram creating unit 208 creates the color histogram information on the histograms $CH_L$ and $CH_R$ and outputs the created histogram information to the DP matching unit 209.

The DP matching unit 209 performs the following process for each group of pixel blocks $B_{L-1}$ and $B_{R-1}$ on the basis of the color histogram information. That is, the DP matching unit 209 first creates the color correspondence detecting DP map shown in FIG. 10. Then, the DP matching unit 209 sets the node P(0, 0) as a start point and the node P(63, 63) as an end point and defines the accumulated cost from the start point to the node $P(n_L, n_R)$ as expressed by Expressions (1) to (3).

The DP matching unit 209 calculates the shortest path, that is, the path in which the accumulated cost from the start point to the end point is the minimum, by calculating the accumulated cost from the start point to the respective nodes including the end point and tracking back the path having the minimum accumulated cost from the end point to the start point. The DP matching unit 209 creates the shortest path information on the shortest path calculated for each group of pixel blocks $B_{L-1}$ and $B_{R-1}$ and outputs the created shortest path information to the color pair calculating unit 210.

The color pair calculating unit 210 calculates a color pair for each group of pixel blocks $B_{L-1}$ and $B_{R-1}$ on the basis of the shortest path information. The color pair calculating unit 210 calculates about 250 color pairs for each pixel block $B_{L-1}$ and calculates about 2000 color pairs in total. The color pair calculating unit 210 creates the color pair information on the calculated color pairs and outputs the created color pair information to the linear color parameter fitting unit 202 and the nonlinear color parameter fitting unit 204.

In step S20, the linear color parameter fitting unit 202 calculates a model formula expressing the correspondence between the brightness of the input image $V_L$ and the brightness of the input image $V_R$ on the basis of the color pair information. This model formula is expressed by Expression (7).

Specifically, the addition matrix calculating unit 211 calculates the matrix expressed by Expression (8) for all the color pairs. The addition matrix calculating unit 211 calculates the addition matrix $M_1$ expressed by Expression (9) by adding all the calculated matrixes.

The addition matrix calculating unit 211 creates the addition matrix information on the calculated addition matrix $M_1$ and outputs the created addition matrix information to the coefficient calculating unit 212 along with the color pair information.

The coefficient calculating unit 212 calculates the matrix expressed by Expression (10) for all the color pairs on the basis of the color pair information. The coefficient calculating unit 212 calculates the coefficient calculating matrix A expressed by Expression (11) by adding all the calculated matrixes.

The coefficient calculating unit 212 calculates the first initial value $coef(w)_1$ of the color correction coefficients $w_i$ and $w_a$ on the basis of Expression (12).

The coefficient calculating unit 212 creates the first initial value information on the calculated first initial value $coef(w)_1$ and outputs the created first initial value information to the filter unit 213.

The filter unit 213 calculates the second initial value $coef(w)_2$ of the color correction coefficients $w_i$ and $w_a$ on the basis of the first initial value information supplied from the coefficient calculating unit 212, the linear correction coefficient information of the previous frame supplied from the coefficient storage unit 214, and Expression (13).

The filter unit 213 calculates the color correction coefficients $w_i$ and $w_a$ as the linear correction coefficients coef (linear) by applying the IIR filter to the second initial value $coef(w)_2$. The filter unit 213 outputs the linear correction coefficient information on the calculated linear correction coefficient coef(linear) to the coefficient storage unit 214, the nonlinear color parameter fitting unit 204, the estimation unit 205, and the color calibration executing unit 206.

On the other hand, the feature quantity matching unit 203 extracts the color pairs by matching the brightness of the input images $V_L$ and $V_R$ of the current frame with each other. Then, the feature quantity matching unit 203 creates the color pair information on the extracted color pair and outputs the created color pair information to the nonlinear color parameter fitting unit 204 and the estimation unit 205.

In step S30, the nonlinear color parameter fitting unit 204 calculates the color correction coefficients $w_i$ and $w_a$ as the nonlinear correction coefficient coef(nonlinear) on the basis of the color pair information and the linear correction coefficient information or the nonlinear correction coefficient information.

Specifically, the Jacobian matrix calculating unit 215 calculates the Jacobian matrix $J_1$ expressed by Expression (14) on the basis of the linear correction coefficient information or the nonlinear correction coefficient information and the color pair information supplied from the histogram matching unit 201 and the feature quantity matching unit 203. The Jacobian matrix calculating unit 215 creates the Jacobian matrix information on the calculated Jacobian matrix $J_1$ and outputs the created Jacobian matrix information to the Hessian matrix calculating unit 216.

The Hessian matrix calculating unit 216 calculates the Hessian matrix $H_1$ expressed by Expression (17) on the basis of the information supplied from the Jacobian matrix calculating unit 215. The Hessian matrix calculating unit 216 creates the Hessian matrix information on the Hessian matrix $H_1$ and outputs the created Hessian matrix information to the coefficient updating unit 217 along with the information supplied from the Jacobian matrix calculating unit 215.

The coefficient updating unit 217 calculates the color correction coefficients $w_i$ and $w_a$ as the nonlinear correction coefficient coef(nonlinear) on the basis of the information supplied from the Hessian matrix calculating unit 216 and Expression (18).

Then, the coefficient updating unit 217 creates the nonlinear correction coefficient information on the calculated nonlinear correction coefficient coef(nonlinear) and determines whether the nonlinear correction coefficient coef(nonlinear) converges on a constant value. The coefficient updating unit 217 outputs the nonlinear correction coefficient information to the estimation unit 205 and the color calibration executing unit 206 when it is determined that the nonlinear correction coefficient coef(nonlinear) converges, and outputs the nonlinear correction coefficient information to the Jacobian matrix calculating unit 215 when it is determined that the nonlinear correction coefficient coef(nonlinear) does not converge. Thereafter, the process of step S30 is performed again.

In step S40, the color converter unit 218 acquires the input images $V_L$ and $V_R$ of the current frame. The color converter unit 218 corrects the brightness of the input image $V_R$ on the basis of the input images $V_L$ and $V_R$ and the linear correction coefficient information supplied from the linear color parameter fitting unit 202. The color converter unit 218 sets the corrected value as the new brightness of the input image $V_R$. The color converter unit 218 outputs the input image $V_L$ and the corrected input image $V_R$ as the linear-color-calibrated images $V_{L-1a}$ and $V_{R-1a}$ to the histogram base reliability calculating unit 219.

The histogram base reliability calculating unit 219 divides each of the linear-color-calibrated images $V_{L-1a}$ and $V_{R-1a}$ into eight pixel blocks $B_{L-1}$ and $B_{R-1}$. The histogram base reliability calculating unit 219 creates the corrected color histogram representing the correspondence between the brightness and the number of pixels (frequency) having the brightness for each of the pixel blocks $B_{L-1}$ and $B_{R-1}$.

The histogram base reliability calculating unit 219 calculates the similarity between the corrected color histogram of the pixel block $B_{L-1}$ and the corrected color histogram of the pixel block $B_{R-1}$ by the use of the normalization cross-correlation (NCC).

The histogram base reliability calculating unit 219 calculates the similarity for each pixel block $B_{n-1}$ and normalizes the similarity to a value between 0 and 1 by substituting the similarity into the error of Expression (16). The histogram base reliability calculating unit 219 sets the normalized value as the reliability of the linear correction coefficient coef(linear). The histogram base reliability calculating unit 219 creates the linear correction coefficient reliability information on the calculated reliability of each pixel block $B_{L-1}$ and outputs the created linear correction coefficient reliability information to the reliability map creating unit 221.

On the other hand, the feature point base reliability calculating unit 220 classifies the feature points in the input image $V_L$ into eight pixel blocks $B_{L-1}$ on the basis of the color pair information supplied from the feature quantity matching unit 203. The feature point base reliability calculating unit 220 calculates the reliability of the nonlinear correction coefficient coef(nonlinear) for each pixel block $B_{L-1}$ on the basis of the nonlinear correction coefficient information supplied from the nonlinear color parameter fitting unit 204. The feature point base reliability calculating unit 220 creates the nonlinear correction coefficient reliability information on the calculated reliability of each pixel block $B_{L-1}$ and outputs the created nonlinear correction coefficient reliability information to the reliability map creating unit 221.

The reliability map creating unit 221 creates the color calibration reliability map on the basis of the information supplied from the histogram base reliability calculating unit 219 and the feature point base reliability calculating unit 220. The reliability map creating unit 221 creates the reliability map information on the created color calibration reliability map and outputs the created reliability map information to the color calibration executing unit 206 and the parallax detecting unit 4.

In step S50, the color calibration executing unit 206 acquires the input images $V_L$ and $V_R$ of the current frame. The color calibration executing unit 206 determines which correction coefficient to use for each pixel block $B_{L-1}$ on the basis of the reliability map information. The color calibration executing unit 206 performs the color calibration for each pixel block $B_{L-1}$ on the basis of the linear correction coefficient information and the nonlinear correction coefficient information.

[Processes of Geometric Calibration Unit]

Figure 47:
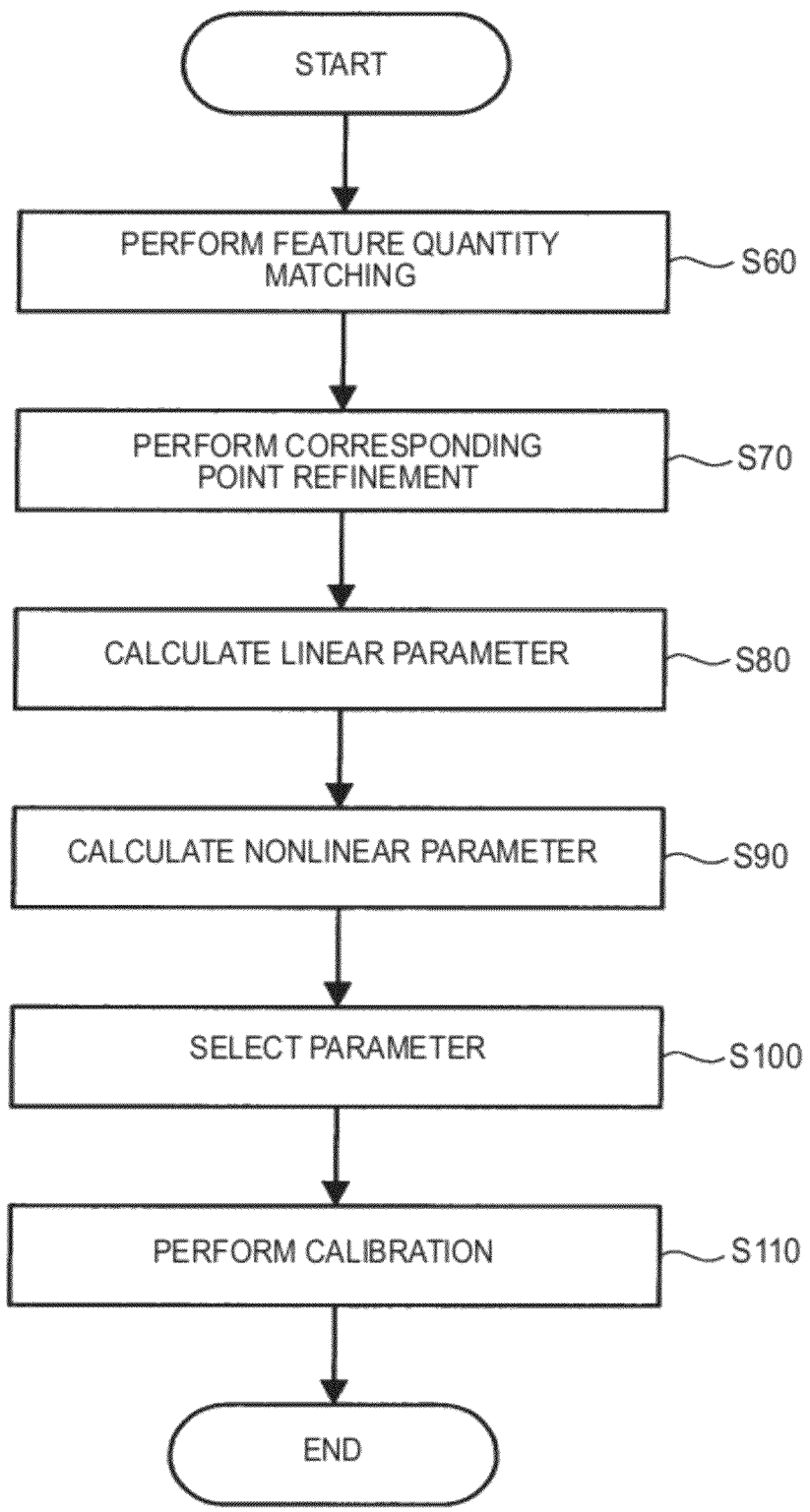
FIG. 47 is a flowchart illustrating the procedure of geometric calibration.

The flow of processes performed by the geometric calibration unit 3 will be described below with reference to the flowchart shown in FIG. 47.

In step S60, the feature quantity matching unit 301 calculates the feature quantity vector $VE_1$ by matching the brightness of the color-calibrated images $V_{L-1}$ and $V_{R-1}$ with each other. The feature quantity matching unit 301 creates the feature quantity vector information on the pixel blocks $B_{L-2}$ and $B_{R-2}$ and the feature quantity vector $VE_1$ and outputs the created feature quantity vector information to the corresponding point refinement unit 302 and the nonlinear geometric parameter fitting unit 304.

In step S70, the histogram creating unit 307 creates the vector component histogram representing the frequency of each component of the feature quantity vector $VE_1$ for each pixel block $B_{L-2}$ on the basis of the feature quantity vector information. The histogram creating unit 307 creates the vector component histogram information on the vector component histogram and outputs the created vector component histogram information to the filter unit 308.

The filter unit 308 smoothes the vector component histogram by applying the Gaussian filter to the vector component histogram information several times. The filter unit 308 creates the smoothed histogram information on the smoothed vector component histogram and outputs the created smoothed histogram information to the maximum frequency detecting unit 309 and the corresponding point selecting unit 311.

The maximum frequency detecting unit 309 specifies the x component and the y component at the maximum frequency from the vector component histograms on the basis of the smoothed histogram information. The feature quantity vector $VE_1$ including the x component and the y component is sets as the representative vector $VE_2$ of the pixel block $B_{L-2}$ to which the feature quantity vector $VE_1$ belongs. Accordingly, the maximum frequency detecting unit 309 calculates the representative vector $VE_2$ for each pixel block $B_{L-2}$. The maximum frequency detecting unit 309 creates the representative vector component information on the components of the representative vector $VE_2$ and outputs the created representative vector component information to the coordinate allocating unit 310.

The coordinate allocating unit 310 determines the coordinate (the coordinate of the start point) of each representative vector $VE_2$ through the use of the mean shift process on the basis of the representative vector component information. The coordinate allocating unit 310 creates the representative vector information on the components and the coordinates of the representative vector $VE_2$ and outputs the created representative vector information to the corresponding point selecting unit 311.

The corresponding point selecting unit 311 deletes the representative vector of which the maximum frequency is less than a predetermined value out of plural representative vectors $VE_2$ on the basis of the representative vector information and the smoothed histogram information (that is, deletes the representative vector of which the maximum frequency is less than a predetermined value). The corresponding point selecting unit 311 creates the corresponding point selection information on the feature point pairs constituting the selected representative vector $VE_2$, that is, the representative pairs, and outputs the created corresponding point selection information to the linear geometric parameter fitting unit 303.

In step S80, the error calculating unit 315 calculates the error values e1 and e2 expressed by Expressions (32) and (33) on the basis of the corresponding point selection information and the parameter information supplied from the parameter selecting unit 305. The error calculating unit 315 creates the error value information on the calculated error values e1 and e2 and outputs the created error value information to the initial parameter selecting unit 316 along with the corresponding point selection information. The error calculating unit 315 selects the smaller error value and creates the minimum error value information on the selected error value. The error calculating unit 315 outputs the minimum error value information and the corresponding point selection information to the weight calculating unit 313.

The initial parameter selecting unit 316 determines which of the homography matrixes $HL_{n-1}$ and $HR_{n-1}$ of the previous frame and the unit matrix I to use as the initial parameter on the basis of the error value information. Specifically, the initial parameter selecting unit 316 sets the matrix having the smaller error value as the homography matrix of the initial parameter.

The initial parameter selecting unit 316 creates the initial parameter information on the selected initial parameter and outputs the created initial parameter information to the linear geometric parameter calculating unit 314. The initial parameter selecting unit 316 outputs the corresponding point selection information to the coordinate pair storage unit 317 and the coordinate pair integrating unit 318. The initial parameter selecting unit 316 outputs the reset information to the coordinate pair storage unit 317 when the unit matrix is selected as the initial parameter.

The coordinate pair integrating unit 318 integrates the corresponding point selection information supplied from the initial parameter selecting unit 316 and the coordinate pair storage unit 317. The coordinate pair integrating unit 318 outputs the integrated corresponding point selection information to the weight calculating unit 313 and the linear geometric parameter calculating unit 314.

The weight calculating unit 313 calculates the weight indicating to what extent the time axis restriction should be considered at the time of calculating the transformation matrix F, that is, the time axis restriction weight $w_e$. The weight calculating unit 313 creates the time axis restriction weight information on the determined time axis restriction weight $w_e$ and outputs the created time axis restriction weight information to the linear geometric parameter calculating unit 314.

The coordinate transformation unit 319 transforms the coordinates of the representative point pairs on the basis of the information supplied from the initialization unit 315. Specifically, the coordinate transforming unit 319 transforms the coordinates of the left representative points by the use of the homography matrix $HL_{n-1}$ of the previous frame or the unit matrix I and transforms the coordinates of the right representative points by the use of the homography matrix $HR_{n-1}$ or the unit matrix I. The coordinate transforming unit 319 normalizes the transformed coordinates of the representative points and the initial parameter. Then, the coordinate transforming unit 319 creates the coordinate transformation information on the normalized coordinates of the respective representative point pairs and the normalized homography matrixes WL and WR and outputs the created coordinate transformation information to the matrix calculating unit 320.

The matrix calculating unit 320 calculates the operational matrix $M_2$ expressed by Expression (34) on the basis of the coordinate transformation information. The matrix calculating unit 320 creates the operational matrix information on the calculated operational matrix $M_2$ and outputs the crated operational matrix information to the F-matrix calculating unit 321.

The F-matrix calculating unit 321 calculates the minimum eigenvector $v_{min}$ of the operational matrix $M_2$ on the basis of the operational matrix information. The F-matrix calculating unit 321 singularly decomposes the minimum eigenvector $v_{min}$ into 3×3 matrixes so that the minimum singular value of the minimum eigenvector $v_{min}$ falls to 0. The F-matrix calculating unit 321 calculates the transformation matrix F on the basis of the calculated matrix $SVD(v_{min})$ and Expression (36). The F-matrix calculating unit 321 calculates the transformation matrix F by swinging the weight $w_e$ into several values such as $2^2 \times w_e$, $2 \times w_e$, $2^{-1} \times w_e$, and $2^{-2} \times w_e$. The F-matrix calculating unit 321 calculates the error value using Expression (32) for each calculated transformation matrix F. The F-matrix calculating unit 321 selects the transformation matrix having the smallest error value, creates the transformation matrix information on the selected transformation matrix F, and outputs the created transformation matrix information to the F-matrix decomposing unit 322 along with the coordinate transformation information.

The F-matrix decomposing unit 322 decomposes the transformation matrix F into the homography matrixes HL and HR and the matrix $F_0$ on the basis of the transformation matrix information. Actually, the F-matrix decomposing unit 322 calculates the matrixes causing the epipolar lines to be parallel to each other as the homography matrixes HL and HR. The F-matrix decomposing unit 322 creates the linear correction coefficient information on the calculated homography matrixes HL and HR and outputs the created linear correction coefficient information to the nonlinear geometric parameter fitting unit 304 and the parameter selecting unit 305.

In step S90, the Jacobian matrix calculating unit 323 calculates the Jacobian matrix $J_2$ expressed by Expression (43) on the basis of the feature quantity vector information and the linear correction coefficient information or the nonlinear correction coefficient information. The Jacobian matrix calculating unit 323 creates the Jacobian matrix information on the calculated Jacobian matrix $J_2$ and outputs the created Jacobian matrix information to the Hessian matrix calculating unit 324 along with the feature quantity vector information and the linear correction coefficient information.

The Hessian matrix calculating unit 324 calculates the Hessian matrix $H_2$ expressed by Expression (45) on the basis of the information supplied from the Jacobian matrix calculating unit 323. The Hessian matrix calculating unit 324 creates the Hessian matrix information on the calculated Hessian matrix $H_2$ and outputs the crated Hessian matrix information to the coefficient updating unit 325 along with the information supplied from the Jacobian matrix calculating unit 323.

The coefficient updating unit 325 calculates components of the transformation matrix F as the nonlinear correction coefficient coef(nonlinear) on the basis of the information supplied from the Hessian matrix calculating unit 324 an Expression (46).

The coefficient updating unit 325 calculates the homography matrixes HL and HR by decomposing the nonlinear correction coefficient coef(nonlinear) through the same process as performed by the F-matrix decomposing unit 322. The coefficient updating unit 325 creates the nonlinear correction coefficient information on the calculated homography matrixes HL and HR. The coefficient updating unit 325 determines whether the homography matrixes HL and HR converge on a constant value, outputs the nonlinear correction coefficient information to the parameter selecting unit 306 when it is determined that the homography matrixes HL and hR converge on a constant value, and outputs the nonlinear correction coefficient information to the Jacobian matrix calculating unit 323 when it is determined that the homography matrixes HL and HR do not converge. Thereafter, the process of step S90 is performed again.

In step S100, the parameter selecting unit 305 shown in FIG. 16 calculates the error values of the linear correction coefficient information supplied from the linear geometric parameter fitting unit 303 and the nonlinear correction coefficient information supplied from the nonlinear geometric parameter fitting unit 304 by the use of Expression (32). The parameter selecting unit 305 selects the information having the smaller error value as the parameter information and outputs the selected information to the geometric calibration executing unit 306 and the linear geometric parameter fitting unit 303.

In step S110, the geometric calibration executing unit 306 performs the geometric calibration on the color-calibrated images $V_{L-1}$ and $V_{R-1}$ on the basis of the parameter information. Specifically, the geometric calibration executing unit 306 transforms the coordinates of the coordinate points of the color-calibrated image $V_{L-1}$ by the use of the homography matrix HL and transforms the coordinates of the coordinate points of the color-calibrated image $V_{R-1}$ by the use of the homography matrix HR. The geometric calibration executing unit 306 outputs the images subjected to the geometric calibration as the calibrated images $V_{L-2}$ and $V_{R-2}$ to the parallax detecting unit 4 shown in FIG. 5.

[Processes of Parallax Detecting Unit]

The flow of processes performed by the parallax detecting unit 4 will be described below with reference to the flowchart shown in FIG. 48.

In step S120, the DSAD calculating unit 404 calculates DSAD(−2) to DSAD(+2) for each left coordinate point and the horizontal parallax d1 on the basis of the calibrated images $V_{L-2}$ and $V_{R-2}$ and the reliability map information supplied from the color calibration unit 2, creates the DSAD information on the calculated DSAD(−2) to DSAD(+2), and outputs the created DSAD information to the minimum value selecting unit 405.

In step S130, the minimum value selecting unit 405 selects the minimum DSAD for all the left coordinate points and the horizontal parallax d1 on the basis of the DSAD information. The minimum value selecting unit 405 stores the selected DSAD in the nodes P(x, d) of the parallax detecting DP map shown in FIG. 43.

On the other hand, the horizontal difference calculating unit 411 acquires the calibrated image $V_{L-2}$, calculates the horizontal difference dx for each pixel of the calibrated image $V_{L-2}$, that is, for each left coordinate point, creates the horizontal difference information on the calculated horizontal difference dx, and outputs the created horizontal difference information to the filter unit 414.

On the other hand, the vertical difference calculating unit 412 acquires the calibrated image $V_{L-2}$, calculates the vertical difference dy for each pixel of the calibrated image $V_{L-2}$, that is, for each left coordinate point, creates the vertical difference information on the calculated vertical difference dy, and outputs the created vertical difference information to the filter unit 414.

On the other hand, the time difference calculating unit 413 acquires the calibrated image $V_{L-2}$ and the calibrated image $V'_{L-2}$ of the previous frame, calculates the time difference dt for each pixel of the calibrated image $V_{L-2}$, that is, for each left coordinate point, creates the time difference information on the calculated time difference dt, and outputs the created time difference information to the filter unit 414.

The filter unit 414 applies the low-pass filter to the horizontal difference information, the vertical difference information, and the time different information. Thereafter, the filter unit 414 outputs the information to the motion score calculating unit 415.

The motion score calculating unit 415 performs the motion of each left coordinate point on the basis of the horizontal difference information, the vertical difference information, and the time different information and determines the motion score corresponding to the determination result. The motion score calculating unit 415 outputs the motion score information on the determined motion score to the anchor vector constructing unit 407. The motion score becomes smaller as the variation in brightness of the left coordinate points becomes greater (that is, as the motion of an image becomes greater).

The local histogram creating unit 416 acquires the parallax map $DM_n\_1$ crated in the previous frame. The local histogram creating unit 416 creates the local histogram DH shown in FIG. 41 for each coordinate point (corresponding to the respective left coordinate points) of the parallax map. The local histogram creating unit 416 creates the local histogram information on the local histogram DH and outputs the created local histogram information to the anchor vector calculating unit 417.

The anchor vector calculating unit 417 performs the following process for each coordinate point on the basis of the local histogram information. That is, the anchor vector calculating unit 417 searches for the horizontal parallax d1 of which the frequency is equal to or higher than a predetermined threshold value Th2, that is, the high-frequency parallax d1', as shown in FIG. 41. The anchor vector calculating unit 417 creates the anchor vector information indicating the bonus value obtained by multiplying the motion score by a predetermined value and the high-frequency parallax d1' and outputs the created anchor vector information to the cost calculating unit 408.

Figure 48:
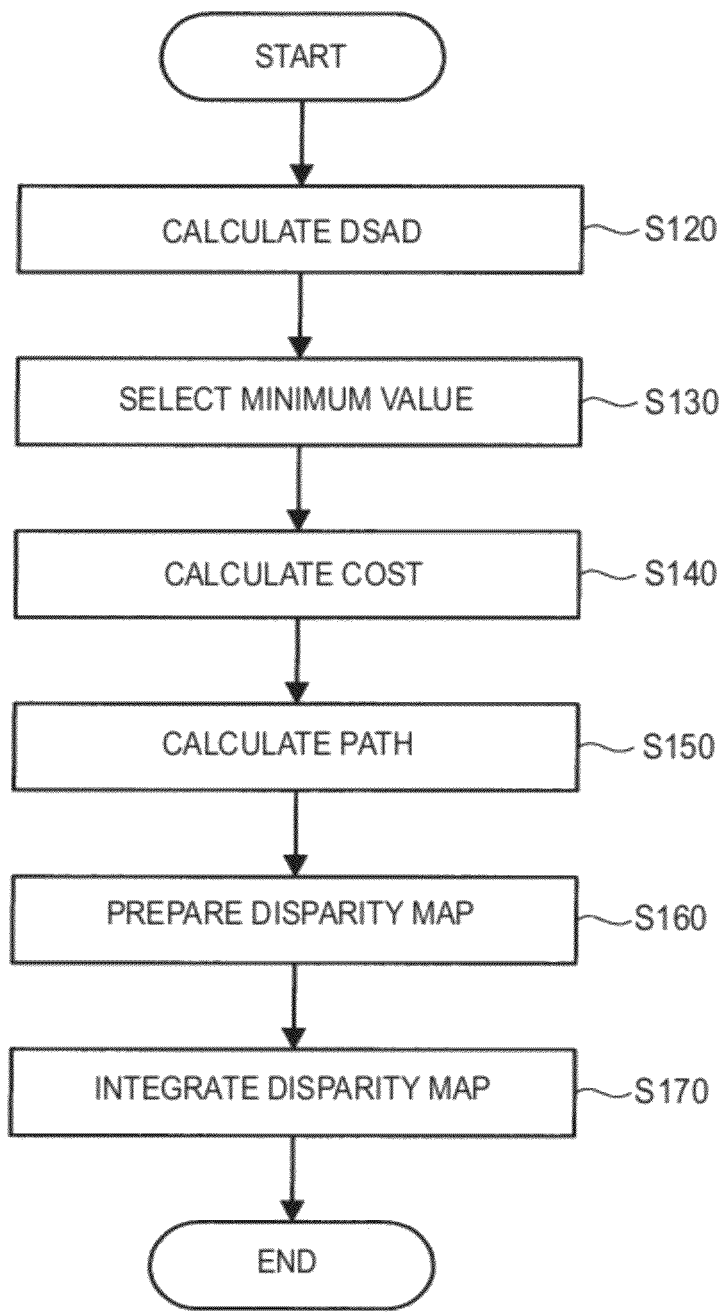
FIG. 48 is a flowchart illustrating the procedure of parallax detection.

In step S140, the cost calculating unit 408 shown in FIG. 48 updates the values of the nodes P(x, d) of the parallax detecting DP map on the basis of the anchor vector information. That is, the cost calculating unit 408 specifies the node (x, d(=d')) corresponding to the high-frequency parallax d1' for each left coordinate point and subtracts the bonus value α2 from the score of the node.

In step S150, the left-eye image horizontal difference calculating unit 418 performs the same process as performed by the horizontal difference calculating unit 411. The left-eye image horizontal difference calculating unit 418 outputs the horizontal difference information created through this process to the weight calculating unit 420.

On the other hand, the right-eye image horizontal difference calculating unit 419 acquires the calibrated image $V_{R-2}$. The right-eye horizontal difference calculating unit 419 performs the same process as performed by the horizontal difference calculating unit 411 on the calibrated image $V_{R-2}$. The right-eye image horizontal difference calculating unit 419 outputs the horizontal difference information created through this process to the weight calculating unit 420.

The weight calculating unit 420 calculates the weight $wt_L$ of the left coordinate point and the weight $wt_R$ of the right coordinate point for all the coordinate points on the basis of the horizontal difference information. The weight calculating unit 420 creates the weight information on the calculated weights $wt_L$ and $wt_R$ and outputs the created weight information to the path calculating unit 421. The weights $wt_L$ and $wt_R$ become smaller in the edge part (the outline) of an image.

The path calculating unit 421 calculates the accumulated cost up to the respective nodes P(x, d) of the parallax detecting DP map on the basis of the weight information supplied from the weight calculating unit 420. Specifically, the path calculating unit 421 sets the node (0, 0) as the start point and the node ($x_{max}$, 0) as the end point and defines the accumulated cost from the start point to the node P(x, d) as expressed by Expressions (68) to (70).

The path calculating unit 421 selects the minimum of the calculated accumulated costs $DFI(x, d)_0$ to $DFI(x, d)_2$ and sets the selected accumulated cost as the accumulated cost DFI(x, d) of the node P(x, d). The path calculating unit 421 calculates the accumulated cost DFI(x, d) for all the nodes P(x, d) and stores the calculated accumulated costs in the parallax detecting DP map.

The backtrack unit 410 calculate the shortest path, that is, the path in which the accumulated cost from the start point to the end point is the minimum, by tracking back the path having the minimum accumulated cost from the end point to the start point.

On the other hand, the local matching unit 402 creates the parallax map $DM_2$ and outputs the parallax map information on the created parallax map $DM_2$ to the disparity map integrating unit 403. The local matching unit 402 creates the vertical parallax information on the vertical parallax d2 and outputs the created vertical parallax information to the global matching unit 401.

In step S160, the backtrack unit 410 creates the parallax map $DM_1$ on the basis of the calculated shortest path and the vertical parallax information supplied from the local matching unit 402. The backtrack unit 410 creates the parallax map information on the created parallax map $DM_1$ and outputs the created parallax map information to the disparity map integrating unit 403 shown in FIG. 37.

In step S170, the disparity map integrating unit 403 estimates the parallax map $DM_1$ created by the global matching unit 401 and the parallax map $DM_2$ created by the local matching unit 402 on the basis of the parallax map information. That is, the disparity map integrating unit 403 creates the global matching reliability map $EM_G$ by estimating the parallax map $DM_1$ created by the global matching unit 401 through the use of different estimation methods and integrating the estimation results. Similarly, the disparity map integrating unit 403 creates the local matching reliability map $EM_L$ by estimating the parallax map $DM_2$ created by the local matching unit 402 through the use of different estimation methods and integrating the estimation results.

The disparity map integrating unit 403 determines which reliability of the parallax map $DM_1$ and the parallax map $DM_2$ is higher for each left coordinate point by comparing the global matching reliability map $EM_G$ and the local matching reliability map $EM_L$ with each other. The disparity map integrating unit 403 creates the parallax detecting reliability map EM in which the parallax map having the higher reliability is defined for each left pixel block on the basis of the determination result.

The disparity map integrating unit 403 creates the parallax map DM on the basis of the created parallax detecting reliability map. Here, the horizontal parallax d1 of each left coordinate point in the parallax map DM has the value having the higher reliability of the parallax map $DM_1$ and the parallax map $DM_2$.

The preferred embodiments of the present disclosure have hitherto been described in detail with reference to the accompanying drawings, but the present disclosure is not limited to the preferred embodiments. The present disclosure can be modified or changed in various forms by those skilled in the art without depart from the technical concept of the appended claims, and it will be understood that these modifications or changes belong to the technical concept of the present disclosure.

What is claimed is:

1. An image processing device comprising:
    a horizontal parallax detecting unit that compares a standard pixel constituting a standard image with a first reference pixel located at the same height position as the standard pixel and a second reference pixel located at a height position different from the first reference pixel out of pixels constituting the reference image in the standard image and the reference image in which the same subject is drawn at horizontal positions different from each other and that detects a horizontal parallax of the standard pixel on the basis of the comparison result, wherein the horizontal parallax detecting unit calculates a first estimation value for estimating a difference between a feature quantity in a standard area including the standard pixel and a feature quantity in a first reference area including the first reference pixel and a second estimation value for estimating a difference between the feature quantity in the standard area and a feature quantity in a second reference area including the second reference pixel and detects the horizontal parallax of the standard pixel on the basis of the first estimation value and the second estimation value;
    a correction executing unit that corrects the standard image and the reference image before detecting the horizontal parallax; and
    a correction reliability calculating unit that calculates a reliability of correction in the correction executing unit, wherein the horizontal parallax detecting unit calculates the first estimation value and the second estimation value on the basis of the reliability calculated by the correction reliability calculating unit.

2. The image processing device according to claim 1, wherein the horizontal parallax detecting unit calculates a variation of the feature quantity of the standard pixel per unit time and calculates the first estimation value and the second estimation value on the basis of the calculated variation.

3. The image processing device according to claim 1, wherein the horizontal parallax detecting unit creates a mosaic image by lowering the resolution of the standard image, calculates a difference between the feature quantity of the standard pixel in the standard image and the feature quantity of the standard pixel in the mosaic image, and calculates the first estimation value and the second estimation value on the basis of the calculated difference.

4. An image processing device comprising:
    a horizontal parallax detecting unit that compares a standard pixel constituting a standard image with a first reference pixel located at the same height position as the standard pixel and a second reference pixel located at a height position different from the first reference pixel out of pixels constituting the reference image in the standard image and the reference image in which the same subject is drawn at horizontal positions different from each other and that detects a horizontal parallax of the standard pixel on the basis of the comparison result, wherein the horizontal parallax detecting unit calculates a first estimation value for estimating a difference between a feature quantity in a standard area including the standard pixel and a feature quantity in a first reference area including the first reference pixel and a second estimation value for estimating a difference between the feature quantity in the standard area and a feature quantity in a second reference area including the second reference pixel and detects the horizontal parallax of the standard pixel on the basis of the first estimation value and the second estimation value, wherein the horizontal parallax detecting unit creates a DP map in which a node includes as its components the horizontal position of the standard pixel and the horizontal parallax of the standard pixel and the node has as its score the estimation value having the smaller absolute value of the difference estimated by the use of the first estimation value and the second estimation value out of the first estimation value and the second estimation value, calculates an accumulated cost from a start point to the corresponding node on the basis of the difference in feature quantity between the standard pixel and a pixel in a peripheral area of the standard pixel, the difference in feature quantity between a standard corresponding pixel located at the same position as the standard pixel and a pixel in a peripheral area of the standard corresponding pixel out of the pixels constituting the reference image, and the score of the node, calculates the shortest path in which the accumulated cost from the start point to an end point is the minimum, and detects the horizontal parallax of the standard pixel on the basis of the calculated shortest path.

5. The image processing device according to claim 1, wherein the difference in height position between the second reference pixel and the first reference pixel is restricted within a predetermined range.

6. The image processing device according to claim 1, further comprising:
a second horizontal parallax detecting unit that detects the horizontal parallax of the standard pixel through the use of a detection method other than the detection method used by the horizontal parallax detecting unit which is a first horizontal parallax detecting unit; and
a disparity map integrating unit that calculates reliabilities of the horizontal parallax of the standard pixel detected by the first horizontal parallax detecting unit and the horizontal parallax of the standard pixel detected by the second horizontal parallax detecting unit and that creates a disparity map indicating the horizontal parallax having the higher reliability for the standard pixel.

7. An image processing device comprising:
a first horizontal parallax detecting unit that compares a standard pixel constituting a standard image with a first reference pixel located at the same height position as the standard pixel and a second reference pixel located at a height position different from the first reference pixel out of pixels constituting the reference image in the standard image and the reference image in which the same subject is drawn at horizontal positions different from each other and that detects a horizontal parallax of the standard pixel on the basis of the comparison result;
a second horizontal parallax detecting unit that detects the horizontal parallax of the standard pixel through the use of a detection method other than the detection method used by the first horizontal parallax detecting unit; and
a disparity map integrating unit that calculates reliabilities of the horizontal parallax of the standard pixel detected by the first horizontal parallax detecting unit and the horizontal parallax of the standard pixel detected by the second horizontal parallax detecting unit and that creates a disparity map indicating the horizontal parallax having the higher reliability for the standard pixel,
wherein the disparity map integrating unit calculates the reliabilities of the horizontal parallax of the standard pixel detected by the first horizontal parallax detecting unit and the horizontal parallax of the standard pixel detected by the second horizontal parallax detecting unit through the use of different estimation methods, respectively.

8. An image processing method comprising:
comparing a standard pixel constituting a standard image with a first reference pixel located at the same height position as the standard pixel and a second reference pixel located at a height position different from the first reference pixel out of pixels constituting the reference image in the standard image and the reference image in which the same subject is drawn at horizontal positions different from each other;
calculating a first estimation value for estimating a difference between a feature quantity in a standard area including the standard pixel and a feature quantity in a first reference area including the first reference pixel;
calculating a second estimation value for estimating a difference between the feature quantity in the standard area and a feature quantity in a second reference area including the second reference pixel;
detecting a horizontal parallax of the standard pixel on the basis of the comparison result;
correcting the standard image and the reference image before detecting the horizontal parallax; and
calculating a reliability of correction in the correction of the standard image and the reference image,
wherein the first estimation value and the second estimation value are calculated on the basis of the reliability.

9. A non-transitory computer readable storage medium having stored thereon, computer executable instructions, the computer executable instructions when executed by a computer causes the computer to perform a horizontal parallax detecting function of:
comparing a standard pixel constituting a standard image with a first reference pixel located at the same height position as the standard pixel and a second reference pixel located at a height position different from the first reference pixel out of pixels constituting the reference image in the standard image and the reference image in which the same subject is drawn at horizontal positions different from each other;
calculating a first estimation value for estimating a difference between a feature quantity in a standard area including the standard pixel and a feature quantity in a first reference area including the first reference pixel;
calculating a second estimation value for estimating a difference between the feature quantity in the standard area and a feature quantity in a second reference area including the second reference pixel;
detecting a horizontal parallax of the standard pixel on the basis of the comparison result;
correcting the standard image and the reference image before detecting the horizontal parallax; and calculating a reliability of correction in the correction of the standard image and the reference image,
wherein the first estimation value and the second estimation value are calculated on the basis of the reliability.

* * * * *